US012490897B1

(12) United States Patent
Lee et al.

(10) Patent No.: US 12,490,897 B1
(45) Date of Patent: Dec. 9, 2025

(54) ASTIGMATISM-DRIVEN MEDIA CONTENT COMPENSATION

(71) Applicant: Zenni Optical, Inc., Novato, CA (US)

(72) Inventors: Steven Lee, Barrington, IL (US); Julia Zhen, Novato, CA (US); ChyrSong Ting, Novato, CA (US); Matthew James Golino, Brookhaven, GA (US); Justin Paul Dempsey, Ottawa (CA); Jeffrey Joseph Fillingham, Dartmouth (CA)

(73) Assignee: Zenni Optical, Inc., Novato, CA (US)

( * ) Notice: Subject to any disclaimer, the term of this patent is extended or adjusted under 35 U.S.C. 154(b) by 0 days.

(21) Appl. No.: 18/791,217

(22) Filed: Jul. 31, 2024

(51) Int. Cl.
| | | |
|---|---|---|
| *G06F 3/01* | (2006.01) | |
| *A61B 3/00* | (2006.01) | |
| *A61B 3/036* | (2006.01) | |
| *G09G 3/00* | (2006.01) | |

(52) U.S. Cl.
CPC ............ *A61B 3/036* (2013.01); *A61B 3/0025* (2013.01); *A61B 3/005* (2013.01); *G09G 3/003* (2013.01); *G09G 3/007* (2013.01); *G09G 2320/0626* (2013.01); *G09G 2320/066* (2013.01); *G09G 2320/08* (2013.01); *G09G 2340/0435* (2013.01); *G09G 2354/00* (2013.01); *G09G 2380/08* (2013.01)

(58) Field of Classification Search
CPC ....... A61B 3/036; A61B 3/0025; A61B 3/005; G09G 3/003; G09G 3/007; G09G 2320/0626; G09G 2320/066; G09G 2320/08; G09G 2340/0435; G09G 2354/00; G09G 2380/08; G06T 19/006
See application file for complete search history.

(56) References Cited

U.S. PATENT DOCUMENTS

| | | |
|---|---|---|
| 2,352,500 A | 6/1944 | Shepard |
| 4,861,156 A | 8/1989 | Terry |
| 5,737,060 A | 4/1998 | Kasha, Jr. |
| 5,767,940 A | 6/1998 | Hayashi et al. |
| 5,880,814 A | 3/1999 | McKnight et al. |
| 6,592,222 B2 | 7/2003 | Massengill et al. |
| 7,784,948 B2 | 8/2010 | Nozawa et al. |
| 10,238,280 B2 | 3/2019 | Maeda et al. |
| 10,610,093 B2 | 4/2020 | Green |
| 11,178,389 B2 | 11/2021 | Sinha et al. |
| 11,432,718 B2 | 9/2022 | Xu et al. |

(Continued)

FOREIGN PATENT DOCUMENTS

| | | |
|---|---|---|
| CN | 2904944 Y | 5/2007 |
| CN | 109431445 A | 3/2019 |

(Continued)

*Primary Examiner* — Abdul-Samad A Adediran
(74) *Attorney, Agent, or Firm* — Morgan, Lewis & Bockius LLP

(57) ABSTRACT

This application is directed to media content compensation at an electronic device having a head-mounted display (HMD). The electronic device obtains the media content to be rendered on the HMD and astigmatism measures of two eyes of a user associated with the HMD. The HMD includes two displays for the two eyes. For each respective eye of the user, the electronic device compensates the media content to generate respective compensated media content for a respective display based on the respective astigmatism of the respective eye. The compensated media content is rendered on the two displays of the HMD for the user. In some embodiments, for each of a plurality of pixels of an image frame of the media content, a pixel position of the respective pixel is updated based on the astigmatism measures of a respective eye.

20 Claims, 45 Drawing Sheets

(56) References Cited

U.S. PATENT DOCUMENTS

| | | |
|---|---|---|
| 11,768,594 B2 | 9/2023 | Cameron |
| 11,793,403 B2 | 10/2023 | Tran et al. |
| 12,011,224 B2 | 6/2024 | Goyal et al. |
| 12,210,149 B2 | 1/2025 | Jin et al. |
| 2019/0008441 A1 | 1/2019 | Guzik |
| 2019/0056780 A1* | 2/2019 | Bombard .............. G06T 19/006 |
| 2019/0298166 A1 | 10/2019 | Smith et al. |
| 2019/0328305 A1 | 10/2019 | Wood et al. |
| 2019/0350452 A1 | 11/2019 | Lewis |

FOREIGN PATENT DOCUMENTS

| | | |
|---|---|---|
| GR | 1005651 B | 9/2007 |
| HU | 185600 B | 2/1985 |
| JP | H0626538 B2 | 4/1994 |
| JP | 2000079095 A | 3/2000 |
| JP | 2001275968 A | 10/2001 |
| JP | 2001286442 A | 10/2001 |
| JP | 3259920 B2 | 2/2002 |
| JP | 2002051981 A | 2/2002 |
| JP | 2003038440 A | 2/2003 |
| JP | 2003079574 A | 3/2003 |
| JP | 2012100758 A | 5/2012 |
| JP | 5007435 B2 | 8/2012 |
| WO | 1994013192 A1 | 6/1994 |
| WO | 2011022428 A2 | 2/2011 |
| WO | 2016165272 A1 | 10/2016 |
| WO | 2017070704 A2 | 4/2017 |
| WO | 2021018224 A1 | 2/2021 |
| WO | 2022111663 A1 | 6/2022 |

* cited by examiner

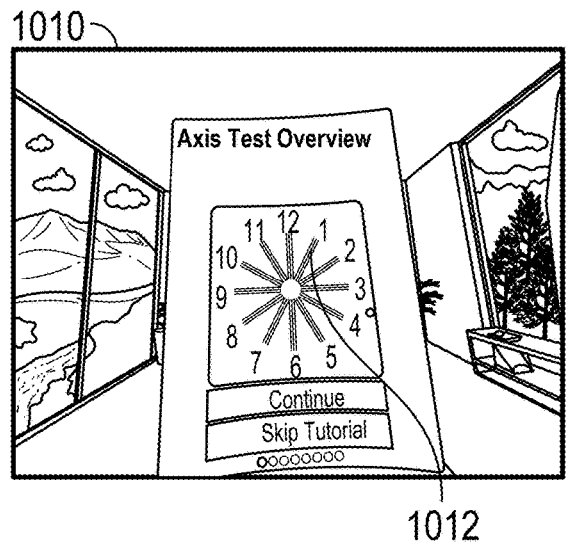
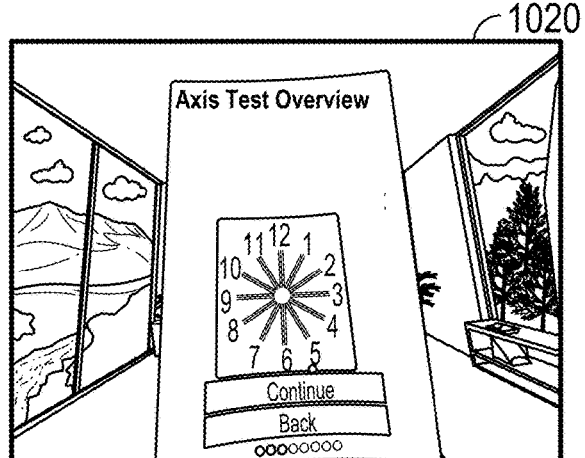
FIG. 10A
FIG. 10B
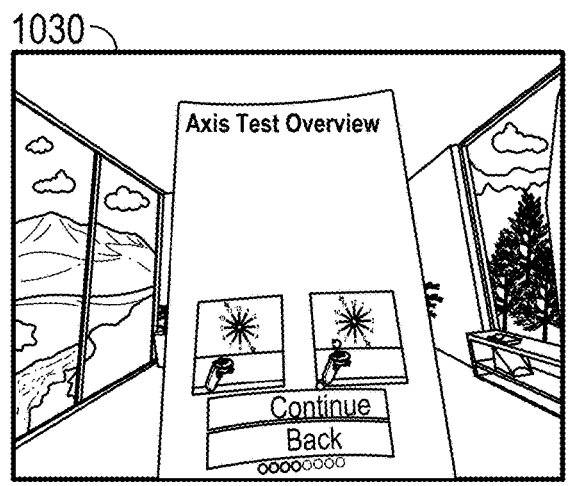
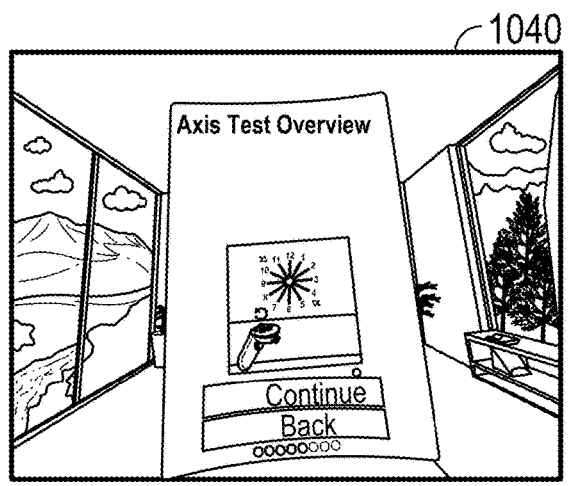
FIG. 10C
FIG. 10D

ASTIGMATISM-DRIVEN MEDIA CONTENT COMPENSATION

TECHNICAL FIELD

The present disclosure relates to vision test technology. More specifically, methods, systems, devices, and non-statutory computer-readable storage media can be applied to adaptively compensate media content based on a user's eye condition, e.g., in an extended reality environment.

BACKGROUND

Traditional methods for visual acuity assessment do not allow for dynamic adjustment of test parameters, leading to less accurate assessments, nor can they be implemented to test eyes and vision at home using household devices in a very environment locked manner.

SUMMARY

The present disclosure relates to innovative methods and systems that can revolutionize vision care, making vision testing and other exams more accessible and affordable for patients. Additionally, it is contemplated that the principles and features of the present disclosure can be implemented in numerous other applications of display technology, including headsets, heads-up displays, and other microdisplays (e.g., microLED and microOLED) to address challenges and limitations inherent in such products and their uses.

Some implementations of the present disclosure are directed to a method of implementing a virtual vision test at an electronic device (e.g., including a display, one or more sensors, and a speaker). The method can comprise while presenting on the display a temporal sequence of visual stimuli, in real time, obtaining a stream of sensor data captured by the one or more sensors, each respective visual stimulus corresponding to a subset of sensor data indicating a user's response to the respective visual stimulus; generating a plurality of vision features based on the temporal sequence of visual stimuli and the stream of sensor data; adaptively generating a sequence of audio instructions based on the plurality of vision features, each respective audio instruction corresponding to a subset of respective vision features; and playing, by the speaker, the sequence of audio instructions successively to guide the user in the virtual eye test.

Some implementations of the present disclosure are directed to a method of implementing a virtual vision test at an electronic device (e.g., including a display, one or more sensors, and a speaker). The method can comprise while presenting on the display a temporal sequence of visual stimuli, in real time, obtaining a stream of image data captured by an eye-tracking camera, each respective visual stimulus corresponding to a subset of image data indicating a user's spontaneous response to the respective visual stimulus; adaptively generating a first audio instruction based on the stream of image data; and playing, by the speaker, the first audio instruction to guide the user in the virtual eye test.

Some implementations of the present disclosure are directed to a method of implementing a virtual vision test at an electronic device (e.g., including a head mounted display (HMD)). The method can comprise executing a user application configured to enable the virtual vision test; generating a virtual reality (VR) user interface corresponding to a three-dimensional (3D) virtual environment; obtaining user information of a user associated with the electronic device; and concurrently displaying an avatar and a sequence of visual stimuli on the VR user interface, including while displaying each respective visual stimulus, determining avatar characteristics based on the user information and the respective visual stimulus, wherein the avatar characteristics including a location of the avatar in the 3D virtual environment; and adjusting display of the avatar based on the avatar characteristics.

Some implementations of the present disclosure are directed to a method of implementing a virtual vision test at an electronic device (e.g., including an HMD). The method can comprise executing a user application configured to enable the virtual vision test; generating a VR user interface corresponding to a three-dimensional (3D) virtual environment; while displaying a sequence of visual stimuli, collecting a spontaneous user response monitored by one or more second sensors of the electronic device; determining a confidence score based on the spontaneous user response; determining avatar characteristics based on the confidence score; and concurrently displaying an avatar and a sequence of visual stimuli on the VR user interface based on the avatar characteristics.

Some implementations of the present disclosure are directed to a method of displaying media content at an electronic device (e.g., including an HMD, one or more processors, and memory). The method can comprise obtaining the media content to be rendered on the HMD, wherein the HMD includes two displays for two eyes of a user associated with the HMD; obtaining astigmatism measures of the two eyes; for each respective eye of the user, compensating the media content to generate respective compensated media content for a respective display based on the respective astigmatism of the respective eye; and rendering the compensated media content on the two displays of the HMD for the user.

Some implementations of the present disclosure are directed to a method of displaying media content at an electronic device (e.g., including an HMD, one or more processors, and memory). The method can comprise obtaining the media content to be rendered on the HMD, wherein the HMD includes two displays for two eyes of a user associated with the HMD; obtaining astigmatism measures of an eye; tracking an eye focus of the eye; generating the respective compensated media content dynamically by applying a media compensation model to process the media content, the astigmatism measures of the eye, and the eye focus; and rendering the compensated media content on a display of the HMD associated with the eye for the user.

Some implementations of the present disclosure are directed to a method of making eyewear at a computer device (e.g., including one or more processors and memory). The method can comprise obtaining personal information and medical history of a user; collecting information of a vision test including information of a sequence of visual stimuli and user responses of a user associated with an electronic device having an HMD; applying a vision assessment model to process the personal information, the medical history, and the information of the vision test and generate a personalized vision plan; and sending an instruction to a machine for making an eyewear of the user based on the personalized vision plan.

Some implementations of the present disclosure are directed to a method of implementing a vision test at a computer device (e.g., including one or more processors and memory). The method includes obtaining personal information and medical history of a user, collecting information of the vision test including information of a sequence of visual stimuli and user responses of a user associated with an electronic device having an HMD, applying a vision assessment model including a large language model (LLM) to process the personal information, the medical history, and the information of the vision test and generate a personalized vision plan, and enabling presentation of the personalized vision plan on a display.

Some implementations of the present disclosure are directed to a method of implementing a vision test at an electronic device (e.g., including an HMD, one or more processors, and memory). The method can comprise executing a user application configured to enable the vision test; obtaining an instruction to implement a target vision test; selecting a target user interface for the target vision test between a VR user interface corresponding to a three-dimensional (3D) virtual environment and an augmented reality (AR) user interface corresponding to a 3D AR environment; and implementing the target vision test on the target user interface.

Some implementations of the present disclosure are directed to a method of implementing a vision test at an electronic device (e.g., including an HMD, one or more processors, and memory). The method can comprise executing a user application configured to enable the vision test; obtaining an instruction to implement a target vision test; in accordance with a determination that the target vision test corresponds to a driver license issuing requirement: loading an AR user interface to create a 3D AR environment; and displaying a plurality of traffic signs at a plurality of distances on a virtual traffic scene.

Some implementations of the present disclosure are directed to a method of presenting media data at an electronic device (e.g., including an HMD, one or more processors, and memory). The method can comprise determining a multifocal eyewear prescription of a user associated with the electronic device, wherein the multifocal eyewear prescription includes a multifocal parameter for a lens having a plurality of focal lengths; obtaining input media content; converting the input media content to corrective media content based on the multifocal eyewear prescription of the user; and rendering, on the HMD, the corrective media content.

Some implementations of the present disclosure are directed to a method of presenting media data at an electronic device (e.g., including an HMD, one or more processors, and memory). The method can comprise obtaining input media content to be rendered on the HMD, wherein the HMD includes two displays for two eyes of a user associated with the HMD; determining a multifocal parameter for a first lens having a plurality of focal lengths; obtaining input media content; applying a media correction model to process the input media content and the multifocal parameter and generate corrective media content; and rendering, on the HMD, the corrective media content for the first eye.

In some embodiments, a user application can be implemented by an electronic device including an HMD and configured to create a customized extended reality (XR) environment for a user engaged on an XR information platform. Products may be rendered for the user in a three-dimension format in the XR environment, thereby facilitating eyewear selection and fitting. The XR can be an umbrella term encapsulating Augmented Reality (AR), Virtual Reality (VR), Mixed Reality (MR), and everything in between. In this application, any embodiments that apply a VR system can be implemented using an AR or MR system as well.

Additional features and advantages of the subject technology will be set forth in the description below, and in part will be apparent from the description, or may be learned by practice of the subject technology. The advantages of the subject technology will be realized and attained by the structure particularly pointed out in the written description and embodiments hereof as well as the appended drawings.

It is to be understood that both the foregoing general description and the following detailed description are exemplary and explanatory and are intended to provide further explanation of the subject technology.

BRIEF DESCRIPTION OF THE FIGURES

Various features of illustrative embodiments of the inventions are described below with reference to the drawings. The illustrated embodiments are intended to illustrate, but not to limit, the inventions.

FIGS. 10A-10F include six diagrams of example graphical user interfaces rendered to determine eye stigmatism in a virtual environment created by a headset device, in accordance with some embodiments.

DETAILED DESCRIPTION

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Moreover, various aspects of the present disclosure can be implemented in combination with aspects of other virtual-reality technology developed by the present applicant, for example, in copending U.S. Patent App. Nos. 63/560,623 (137034-5002), filed on Mar. 1, 2024, 63/569,095 (137034-5005), filed on Mar. 23, 2024, 63/642,571 (137034-5007), filed on May 3, 2024, 63/642,583 (137034-5009), filed on May 3, 2024, 63/642,593 (137034-5010), filed on May 3, 2024, 63/642,604 (137034-5011), filed on May 3, 2024, 63/644,457 (137034-5012), filed on May 8, 2024, and Ser. No. 18/759,641 (137034-5018/1.1), filed on Jun. 28, 2024, the entireties of each of which is incorporated herein by reference. Aspects of these copending cases can be implemented in combination with some embodiments disclosed herein, whether in addition to features thereof or as an alternative to a particular feature of an embodiment disclosed herein.

Figure 1:
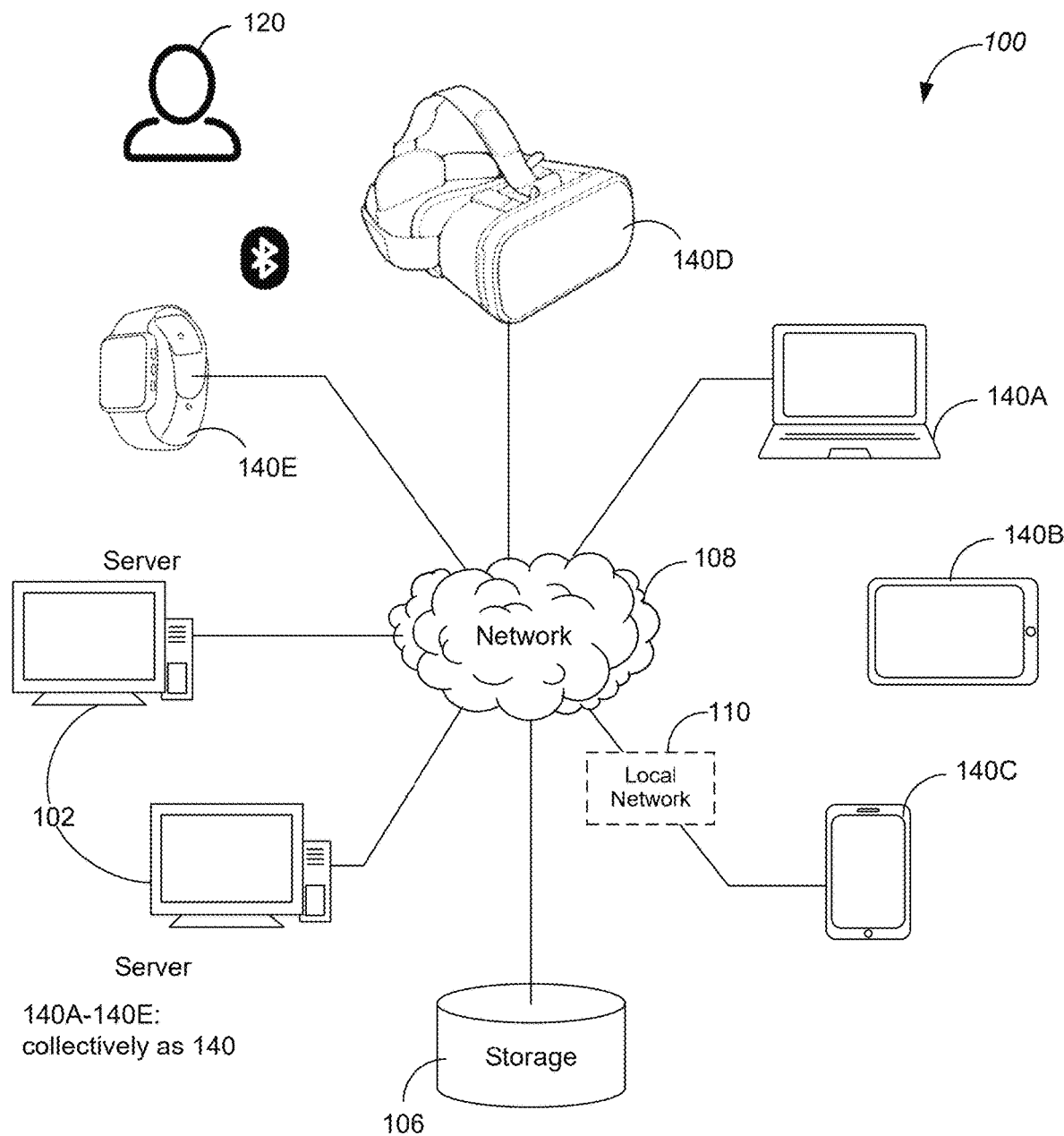
FIG. 1 is an example data processing environment having one or more servers communicatively coupled to one or more computer devices (e.g., a headset device), in accordance with some embodiments.

Referring now to the figures, FIG. 1 is an example data processing environment 100 having one or more servers 102 communicatively coupled to one or more computer devices 140 (e.g., a headset device 140D), in accordance with some embodiments. The one or more computer devices 140 are electronic devices having computational capabilities, and may be, for example, desktop computers 140A, tablet computers 140B, mobile phones 140C, or intelligent, multi-sensing, network-connected home devices (e.g., a depth camera, a visible light camera).

In some implementations, the one or more computer devices 140 can include a headset device 140D (e.g., an HMD device 140D) configured to render extended reality content. In some implementations, the one or more computer devices 140 can include a wireless wearable device 140E (e.g., a smart watch, a fitness band) configured to track health data (e.g., heart rate, quality of sleep) and activity data (e.g., steps walked, stairs climbed) of a user wearing the device 140E. Each computer device 140 can collect data or user inputs, executes user applications, and present outputs on its user interface. The collected data or user inputs can be processed locally at the computer device 140 and/or remotely by the server(s) 102. The one or more servers 102 can provide system data (e.g., boot files, operating system images, and user applications) to the computer devices 140, and in some embodiments, processes the data and user inputs received from the computer device(s) 140 when the user applications are executed on the computer devices 140. In some embodiments, the data processing environment 100 can further include a storage 106 for storing data related to the servers 102, computer devices 140, and applications executed on the computer devices 140. For example, storage 106 may store video content, static visual content, and/or audio data.

The one or more servers 102 can enable real-time data communication with the computer devices 140 that can be remote from each other or from the one or more servers 102. Further, in some embodiments, the one or more servers 102 can implement data processing tasks that are not completed locally by the computer devices 140. For example, the computer devices 140 can include a game console (e.g., the headset device 140D) that executes an interactive online gaming application (e.g., for visual assessment or eyewear fitting). The game console receives a user instruction and sends it to a server 102 with user data. The server 102 generates a stream of video data based on the user instruction and user data, and provides the stream of video data for display on the game console and other computer devices that can be engaged in the same session with the game console.

The one or more servers 102, one or more computer devices 140, and storage 106 can be communicatively coupled to each other via one or more communication networks 108, which are the medium used to provide communications links between these devices and computers connected together within the data processing environment 100. The one or more communication networks 108 may include connections, such as wire, wireless communication links, or fiber optic cables. Examples of the one or more communication networks 108 include local area networks (LAN), wide area networks (WAN) such as the Internet, or a combination thereof. The one or more communication networks 108 are, optionally, implemented using any known network protocol includes various wired or wireless protocols, such as Ethernet, Universal Serial Bus (USB), FIRE-WIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol. A connection to the one or more communication networks 108 may be established either directly (e.g., using 1G/4G connectivity to a wireless carrier), or through a network interface 110 (e.g., using a router, switch, gateway, hub, or an intelligent, dedicated whole-home control node), or through any combination thereof. As such, the one or more communication networks 108 can represent the Internet of a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other electronic systems that route data and messages.

In some embodiments, the headset device 140D can be communicatively coupled to a data processing environment 100. The headset device 140D includes one or more cameras (e.g., a visible light camera, a depth camera), a microphone, a speaker, one or more inertial sensors (e.g., gyroscope, accelerometer), and a display. In some embodiments, the camera may capture hand gestures of a user wearing the headset device 140D. In some embodiments, the microphone records ambient sound includes user's voice commands.

In some embodiments, the headset device 140D may be communicatively coupled to one or more servers 102 and enables a centralized vision test management platform with the one or more servers 102. This vision test management platform may aggregate data (e.g., visual stimuli 338, sensor data 342, vision test results 344) from a plurality of user accounts associated with a plurality of users, analyze the aggregated data, and track vision health trends for individual users or user groups. In some embodiments, data may be communicated between a headset device 140D and a server 102 in an encrypted format. In some embodiments, the vision test management platform is coupled to a global health database storing epidemiological data. The vision test management platform can be configured to cross-reference the data collected from its user accounts with the epidemiological data to identify an emerging pattern and a public health concern. For example, a teenager's vision data may be collected and analyzed during an extended duration of time (e.g., 10 years) to identify an individual vision development trend and was cross-referenced with an average vision development trend extracted from the global health database. A doctor can rely on a cross-referencing result to determine whether the individual vision development trend is normal or whether the teenager's eyesight drops faster than average teenagers. As such, various embodiments of the vision test management platform may integrate biometric data and global health analytics and provides a secure, personalized, and interactive environment for vision testing, which can improve precision and user experience of vision assessments and contributes to broader public health monitoring and research initiatives.

Figure 2:
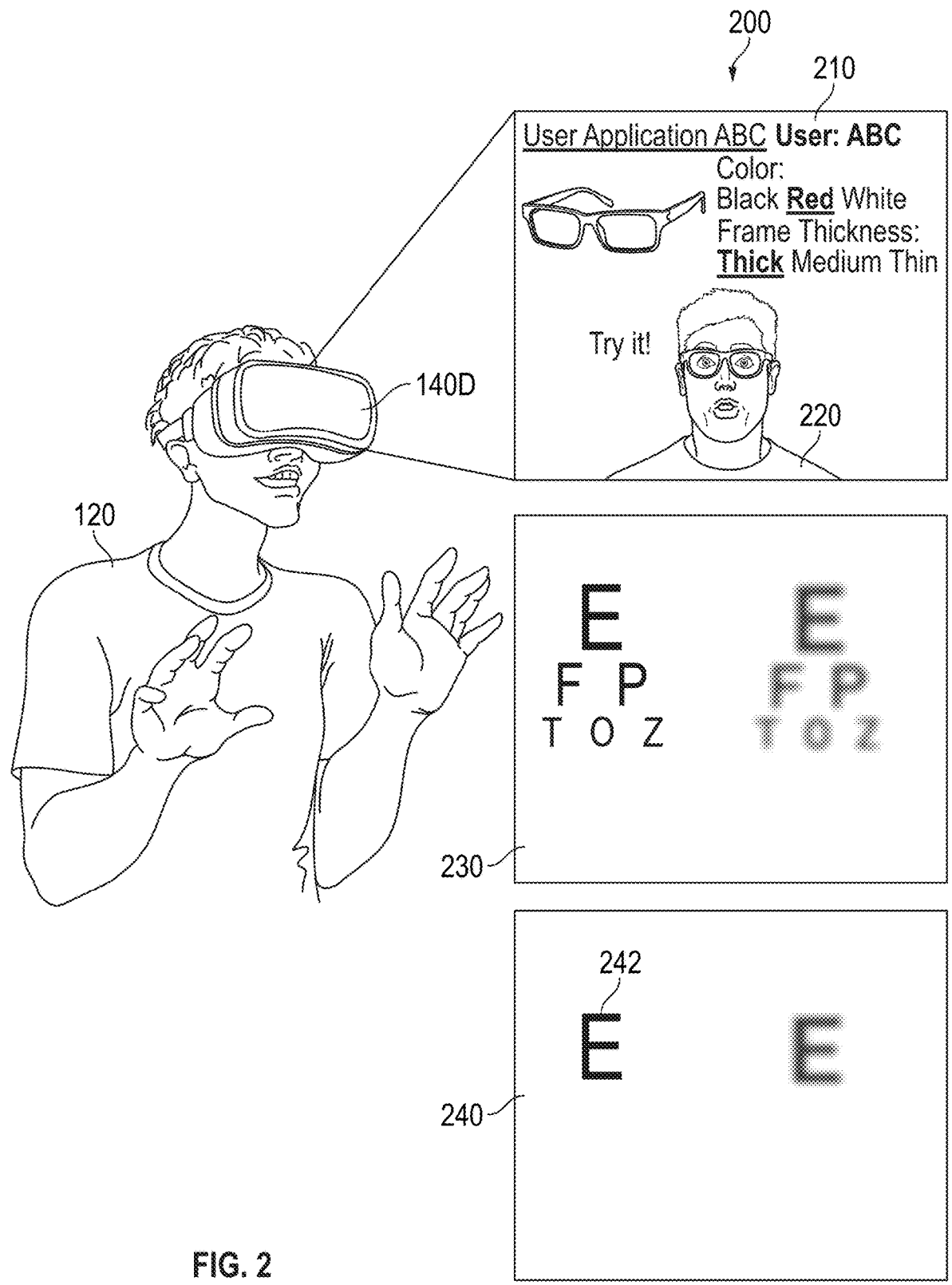
FIG. 2 is an environment in which a computer device (e.g., a headset device) is applied to facilitate visual assessment or eyewear fitting, in accordance with some embodiments.

FIG. 2 is an environment 200 in which a computer device 140 (e.g., a headset device 140D) is applied to facilitate visual assessment or eyewear fitting, in accordance with some embodiments. The XR headset device 140D may be communicatively coupled within the data processing environment 100. The XR headset device 140D may include one or more cameras (e.g., a visible light camera, a depth camera), a microphone, a speaker, one or more inertial sensors (e.g., gyroscope, accelerometer), and a display. In some embodiments, the camera may capture hand gestures of a user wearing the XR headset device 140D. In some embodiments, the microphone may record ambient sound includes user's voice commands. The XR headset device 140D may execute a client-side eyewear fitting application 326 or a client-side visual assessment application 328 (FIG. 3) via a user account associated with a user 120 (e.g., an optometrist user, an optician user, a patient user). In some implementations, a computer device 140 (e.g., a mobile phone 140C) distinct from the XR headset device 140D can be used to implement the client-side eyewear fitting application 326 or visual assessment application 328 (FIG. 3).

In some embodiments, a first user interface 210 can be displayed on a computer device 140 (e.g., the headset device 140D) associated with the user 120. In some embodiments, an eyewear can be tried on or displayed as being worn by a 2D or 3D image 220 of the user 120. The server 102 or computer device 140 may receive, from the first user interface 210, a user feedback message indicating an issue, requesting further improvement, or confirming a fit. In some embodiments, a second user interface 230 can be displayed on a computer device 140 associated with the user 120. The second user interface 230 may include a plurality of optotypes (e.g., six optotypes E, F, P, T, O, and Z) having different sizes. In some embodiments, a third user interface 240 can be displayed on a computer device 140 associated with the user 120. The second user interface 230 can display a temporal sequence of optotypes having respective sizes. Each optotype of a corresponding size can be displayed at one time.

Figure 3:
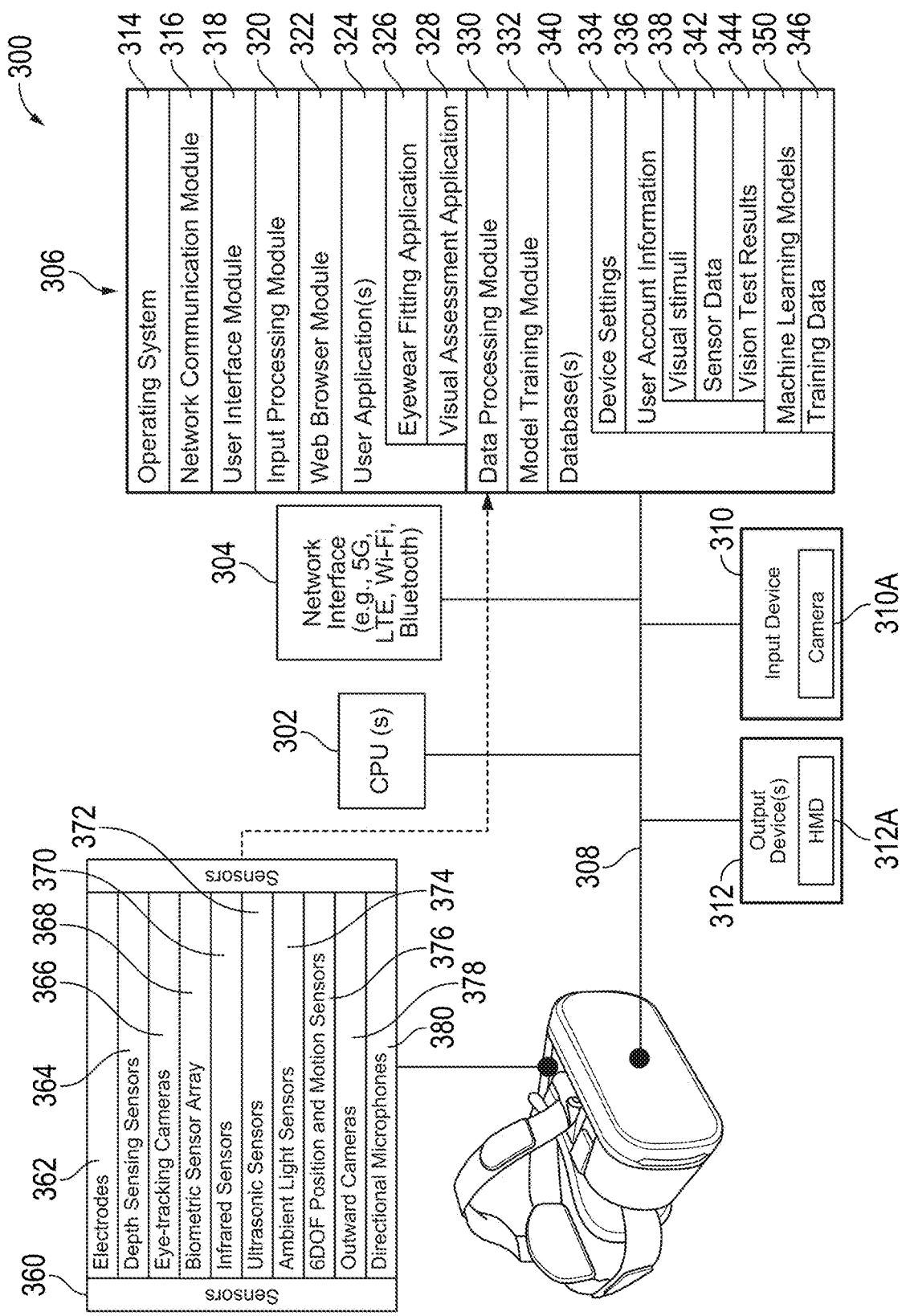
FIG. 3 is a block diagram of a computer system (e.g., including a headset device) configured to implement vision assessment or eyewear fitting, in accordance with some embodiments.

FIG. 3 is a block diagram of a computer system 300 (e.g., including a headset device 140D, a server, or a combination thereof) configured to implement vision assessment or eyewear fitting, in accordance with some embodiments. The computer system 300 can include one or more processing units (CPUs) 302, one or more network interfaces 304, memory 306, and one or more communication buses 308 for interconnecting these components (sometimes called a chipset). The computer system 300 may include one or more input devices 310 that facilitate user input, such as a keyboard, a mouse, a voice-command input unit or microphone, a touch screen display, a touch-sensitive input pad, a gesture capturing camera, or other input buttons or controls. Furthermore, in some embodiments, the computer device 140 of the computer system 300 may use a microphone for voice recognition or an eye tracking camera 366 for tracking eyeball movement. In some implementations, the computer device 140 may include one or more optical cameras (e.g., an RGB camera), scanners, or photo sensor units for capturing images. The computer system 300 may also include one or more output devices 312 that enable presentation of user interfaces 210 and media content. The one or more output devices 312 may include one or more speakers and/or one or more visual displays.

The computer system 300 may include one or more sensors 360, which further may include one or more of: a plurality of electrodes 362, one or more depth sensing sensors 364, one or more eye tracking cameras 366, a biometric sensor array 368, one or more infrared sensors 370, one or more ultrasonic sensors 372, one or more ambient sensors 374, one or more motion sensors (e.g., six degree of freedom (6DOF) position and motion sensors 376), one or more outward camera 378, and one or more directional microphones 380. It is noted that the one or more sensors 360 can also be included in the input device 310 and used to collect data to the computer system 300.

Memory 306 may include high-speed random-access memory, such as DRAM, SRAM, DDR RAM, or other random-access solid state memory devices; and, optionally, may include non-volatile memory, such as one or more magnetic disk storage devices, one or more optical disk storage devices, one or more flash memory devices, or one or more other non-volatile solid state storage devices. Memory 306, optionally, may include one or more storage devices remotely located from one or more processing units 302. Memory 306, or alternatively the non-volatile memory within memory 306, may include a non-transitory computer readable storage medium. In some implementations, memory 306, or the non-transitory computer readable storage medium of memory 306, may store the following programs, modules, and data structures, or a subset or superset thereof:

- Operating system 314 including procedures for handling various basic system services and for performing hardware dependent tasks;
- Network communication module 316 for connecting each server 102 or computer device 140 to other devices (e.g., server 102, computer device 140, or storage 106) via one or more network interfaces 304 (wired or wireless) and one or more communication networks 108, such as the Internet, other wide area networks, local area networks, metropolitan area networks, and so on;
- User interface module 318 for enabling presentation of information (e.g., a graphical user interface for application(s) 324, widgets, websites and web pages thereof, and/or games, audio and/or video content, text, etc.) at each computer device 140 via one or more output devices 312 (e.g., displays, speakers, etc.);
- Input processing module 320 for detecting one or more user inputs or interactions from one of the one or more input devices 310 and interpreting the detected input or interaction;
- Web browser module 322 for navigating, requesting (e.g., via HTTP), and displaying websites and web pages thereof may include a web interface for logging into a user account associated with a computer device 140 or another electronic device, controlling the computer device if associated with the user account, and editing and reviewing settings and data that are associated with the user account;
- One or more user applications 324 for execution by the computer system 300 (e.g., games, social network applications, smart home applications, extended reality application, and/or other web or non-web-based applications for controlling another electronic device and reviewing data captured by such devices), where in some embodiments, an eyewear fitting application 326 can be executed to implement eyewear fitting, and has a plurality of user accounts associated with a plurality of users 120 (e.g., technician users and eyewear users), and in some embodiments, a visual assessment application 328 can be executed to evaluate eyesight of a patient user, and has a plurality of user accounts associated with a plurality of users 120 (e.g., an optometrist user, a patient user);

Data processing module 330 for processing data associated with the user applications 324, e.g., using machine learning models 350;

Model training Module 332 for obtaining training data 346 and training machine learning models 350; and One or more databases 340 for storing at least data including one or more of:

Device settings 334 including common device settings (e.g., service tier, device model, storage capacity, processing capabilities, communication capabilities, etc.) of the computer system 300;

User account information 336 for the one or more user applications 324, e.g., user names, security questions, account history data, user preferences, and predefined account settings, where in some embodiments, the user account information 336 may include facial measurements and one or more virtual fitting parameters associated with associated with a user account of an eye fitting application 326, and in some embodiments, the user account information 336 may include visual stimuli 338, sensor data 342, and vision test results 344 associated with a user account of a visual assessment application 328; and Machine learning models 350 including parameters (e.g., weights, biases) used to implement vision test or select eyewear for eyewear users.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise rearranged in some embodiments. In some embodiments, memory 306, optionally, stores a subset of the modules and data structures identified above. Furthermore, memory 306, optionally, stores additional modules and data structures not described above.

Figure 4:
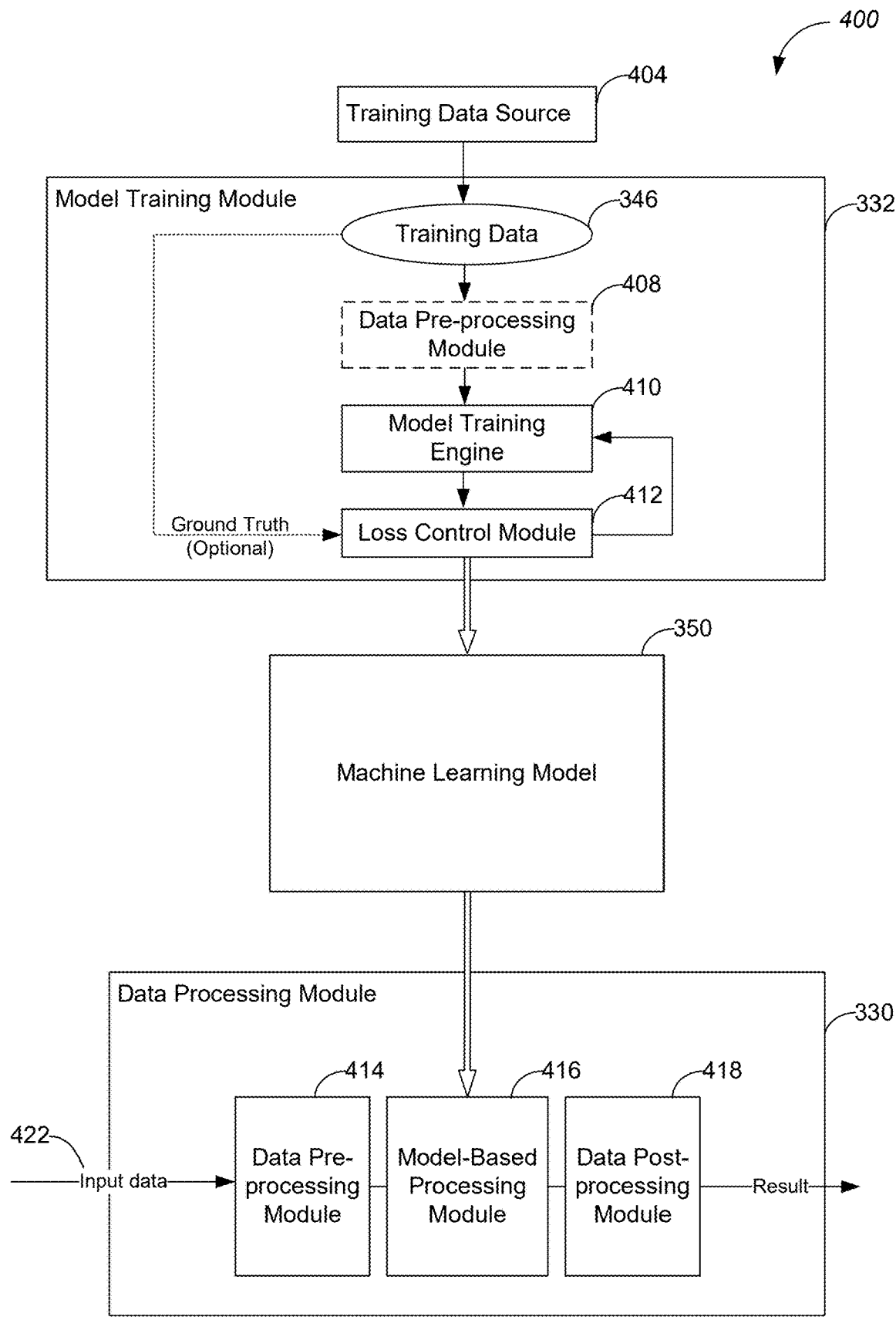
FIG. 4 is a block diagram of a machine learning system for training and applying machine learning models (e.g., for glass making), in accordance with some embodiments.

FIG. 4 is a block diagram of a machine learning system 400 for training and applying machine learning models 350 (e.g., for glass making), in accordance with some embodiments. The machine learning system 400 may include a model training module 332 establishing one or more machine learning models 350 and a data processing module 330 for processing input data 422 using the machine learning model 350. In some embodiments, both the model training module 332 and the data processing module 330 may be located within a computer device 140 (e.g., a VR headset), while a training data source 404 provides training data 346 to the computer device 140. In some embodiments, the training data source 404 may include the data obtained from the computer device 140 itself, from a server 102, from storage 106, or from another electronic device or computer device 140. Alternatively, in some embodiments, the model training module 332 may be located at a server 102, and the data processing module 330 may be located in a computer device 140. The server 102 can train the machine learning model 350 and provide the trained models 350 to the computer device 140 to process real-time input data 422 detected by the computer device 140. In some embodiments, the training data 346 provided by the training data source 404 may include a standard dataset widely used to train machine learning models 350. The input data 422 further may include sensor data. Further, in some embodiments, a subset of the training data 346 may be modified to augment the training data 346. The subset of modified training data may be used in place of or jointly with the subset of training data 346 to train the machine learning models 350.

In some embodiments, the model training module 332 may include a model training engine 410, and a loss control module 412. Each machine learning model 350 may be trained by the model training engine 410 to process corresponding input data 422 and implement a respective task. Specifically, the model training engine 410 may receive the training data 346 corresponding to a machine learning model 350 to be trained and process the training data to build the machine learning model 350. In some embodiments, during this process, the loss control module 412 can monitor a loss function comparing the output associated with the respective training data item to a ground truth of the respective training data item. In these embodiments, the model training engine 410 may modify the machine learning models 350 to reduce the loss, until the loss function satisfies a loss criteria (e.g., a comparison result of the loss function is minimized or reduced below a loss threshold). The machine learning models 350 may thereby be trained and provided to the data processing module 330 of a computer device 140 to process real-time input data 422 from the computer device 140.

In some embodiments, the model training module 402 may further include a data pre-processing module 408 configured to pre-process the training data 346 before the training data 346 is used by the model training engine 410 to train a machine learning model 350. For example, an image pre-processing module 408 is configured to format patients' eye images in the training data 346 into a predefined image format. For example, the preprocessing module 408 may normalize the images to a fixed size, resolution, or contrast level. In another example, an image pre-processing module 408 extracts a region of interest (ROI) corresponding to an eye area.

In some embodiments, the model training module 332 can use supervised learning in which the training data 346 may be labelled and include a desired output for each training data item (also called the ground truth, in some embodiments). In some embodiments, the desirable output may be labelled manually by people or automatically by the model training model 332 before training. In some embodiments, the model training module 332 may use unsupervised learning in which the training data 346 is not labelled. The model training module 332 is configured to identify previously undetected patterns in the training data 346 without pre-existing labels and with little or no human supervision. Additionally, in some embodiments, the model training module 332 may use partially supervised learning in which the training data is partially labelled.

In some embodiments, the data processing module 330 may include a data pre-processing module 414, a model-based processing module 416, and a data post-processing module 418. The data pre-processing modules 414 may pre-process input data 422 based on the type of the input data 422. In some embodiments, functions of the data pre-processing modules 414 are consistent with those of the pre-processing module 408. The data pre-processing modules 414 can convert the input data 422 into a predefined data format that is suitable for the inputs of the model-based processing module 416. The model-based processing module 416 may apply the trained machine learning model 350 provided by the model training module 332 to process the pre-processed input data 422. In some embodiments, the model-based processing module 416 can also monitor an error indicator to determine whether the input data 422 has been properly processed in the machine learning model 350. In some embodiments, the processed input data may be further processed by the data post-processing module 418 to create a preferred format or to provide additional information that can be derived from the processed input data. The data processing module 330 may use the processed input data to make eyewear glasses for a patient user.

Figure 22:
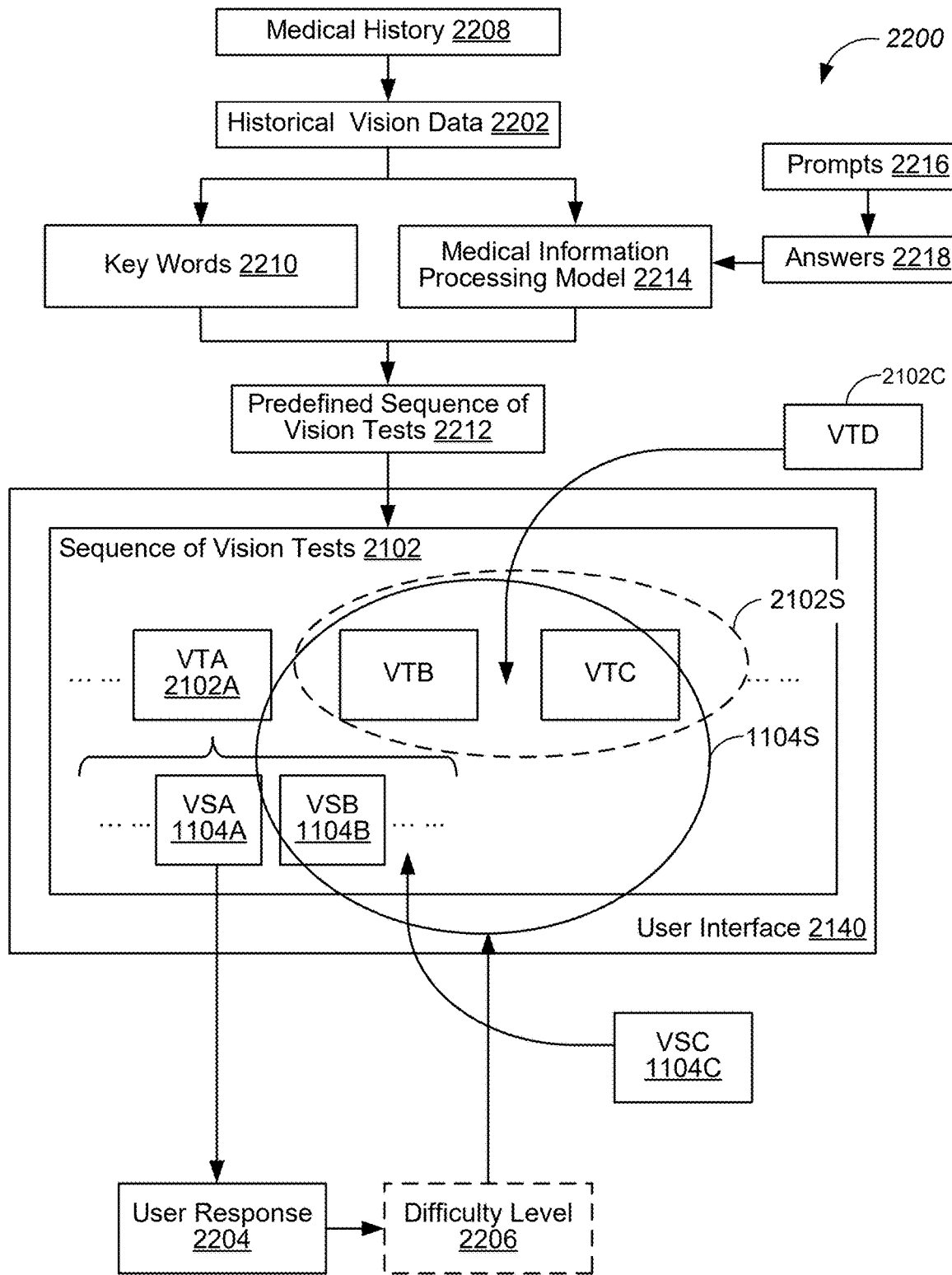
FIG. 22 is a flow diagram of an example method of dynamically adjusting vision tests, in accordance with some embodiments.
Figure 23:
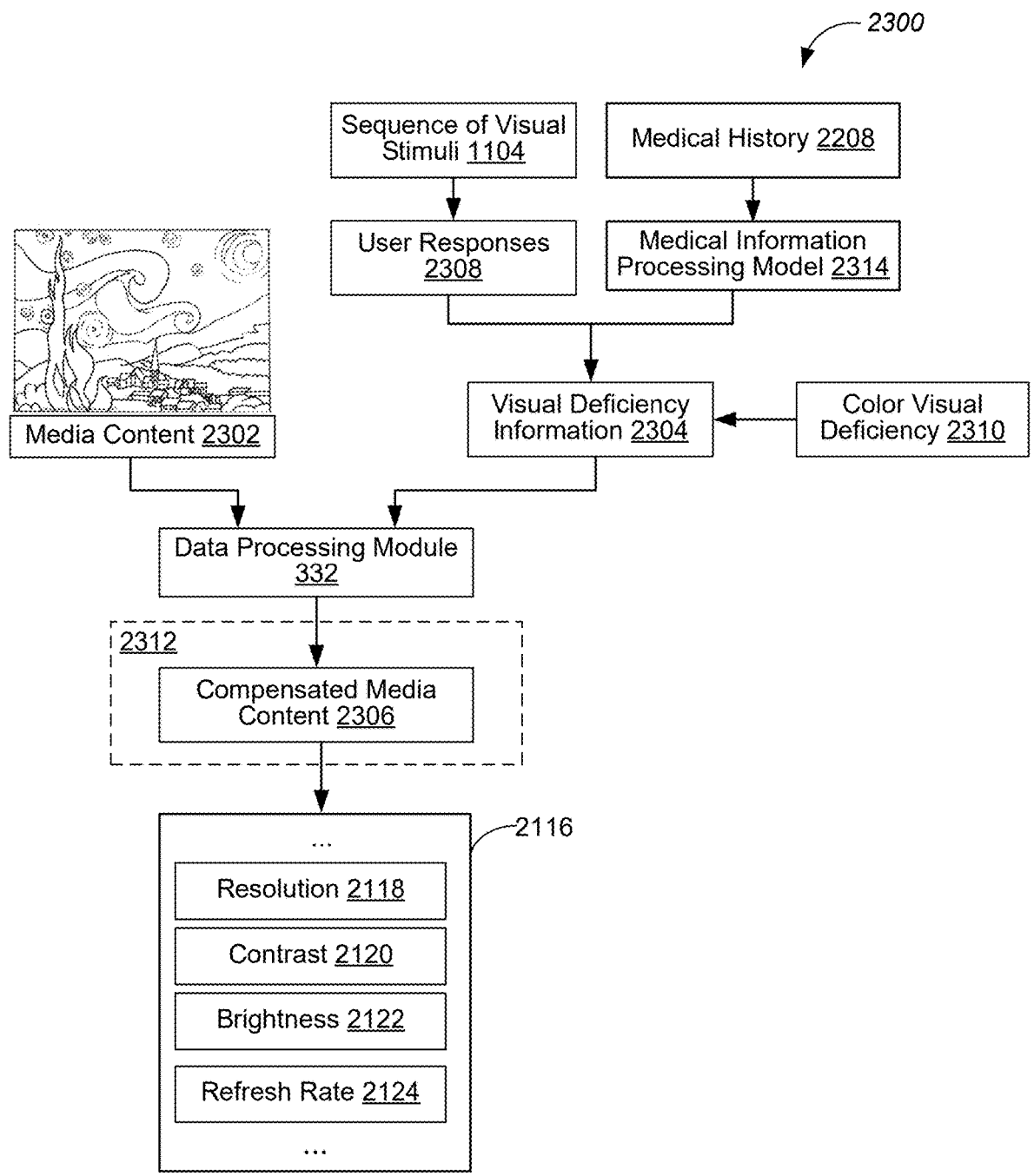
FIG. 23 is a diagram illustrating an example process of dynamically adjusting display of media content based on a visual deficiency of a user, in accordance with some embodiments.

Examples of the machine learning model 350 include, but are not limited to, an eye trajectory model 1202 (FIG. 12), an eye position model 1208 (FIG. 12), an ocular microtremor model 1406 (FIG. 14), a response analysis model 1626 (FIG. 16), a response analysis model 1816 (FIG. 18), a biomedical data model 2004 (FIG. 20), and medical information models 2214 (FIGS. 22) and 2312 (FIG. 23).

Figure 5A:
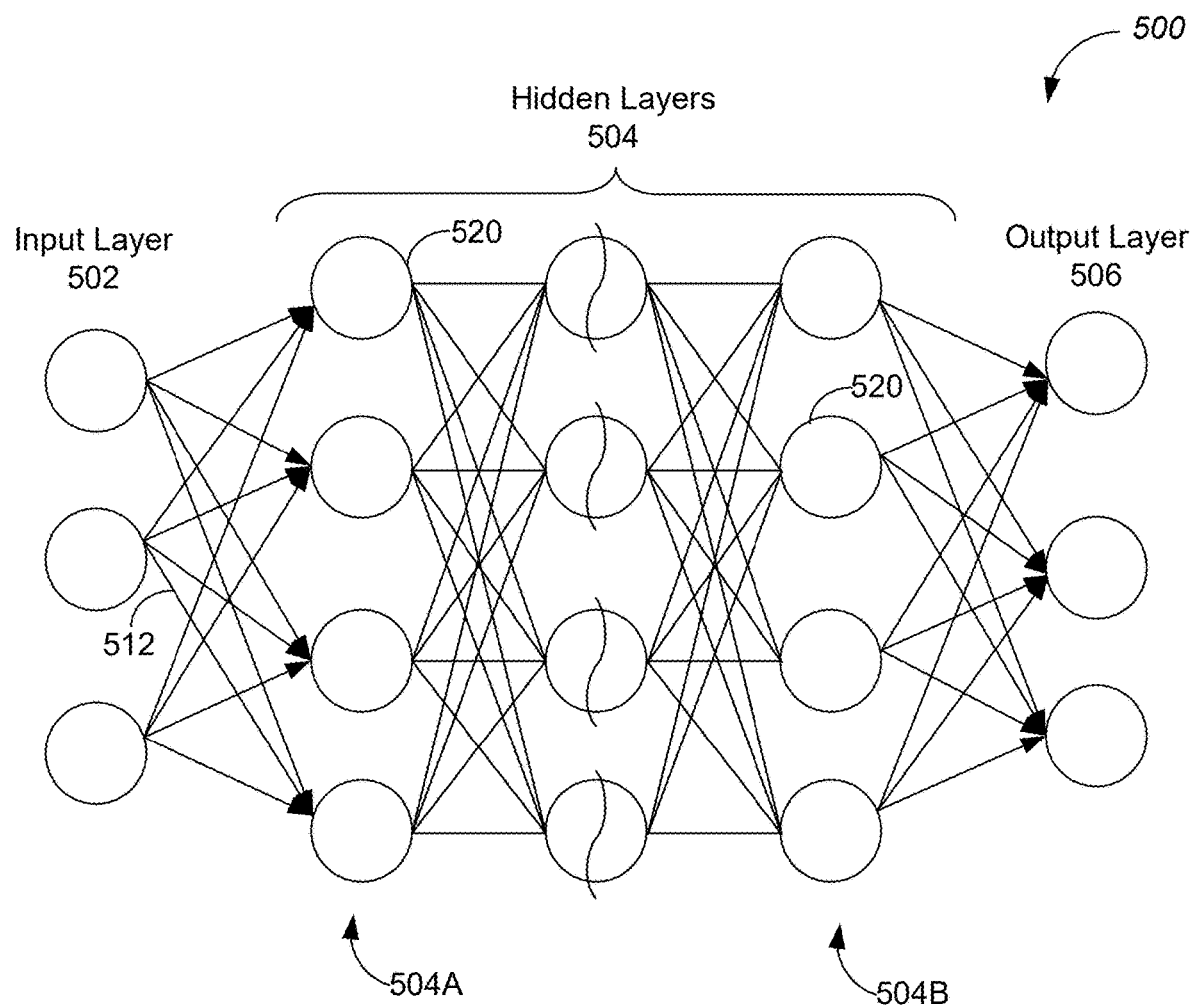
FIG. 5A is a structural diagram of an example neural network applied to process input data in a machine learning model.
Figure 5B:
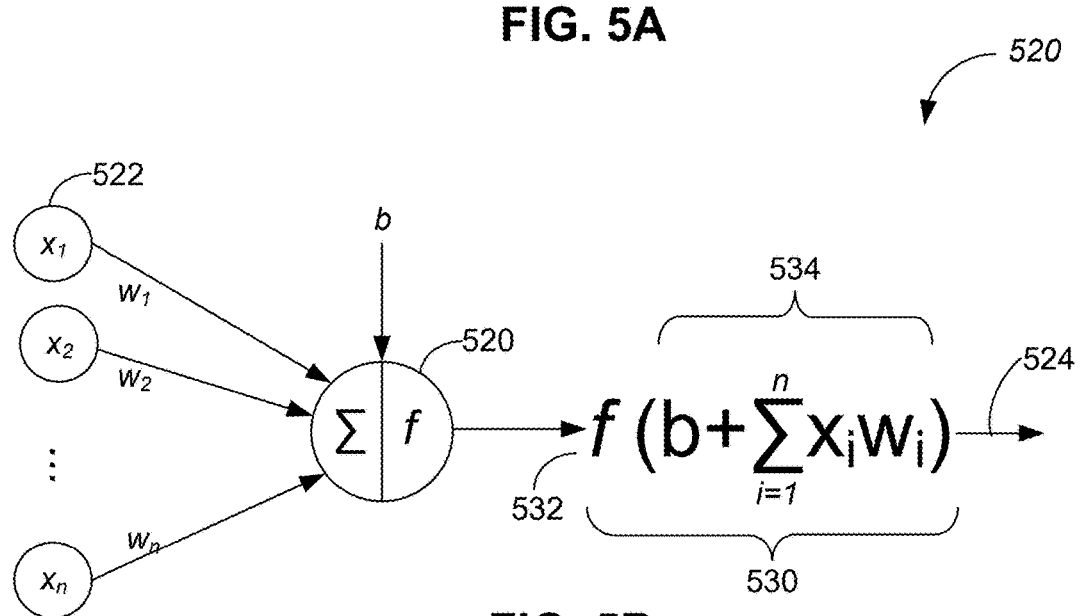
FIG. 5B is an example node in the neural network, in accordance with some embodiments.

FIG. 5A is a structural diagram of an example neural network 500 applied to process input data in a machine learning model 350, in accordance with some embodiments. Further, FIG. 5B is an example node 520 in the neural network 500, in accordance with some embodiments. It should be noted that this description is used as an example only, and other types or configurations may be used to implement the embodiments described herein. The machine learning model 350 may be established based on the neural network 500. A corresponding model-based processing module 416 may apply the machine learning model 350 including the neural network 500 to process input data 422 that has been converted to a predefined data format. The neural network 500 may include a collection of nodes 520 that may be connected by links 512. Each node 520 may receive one or more node inputs 522 and applies a propagation function 530 to generate a node output 524 from the one or more node inputs. As the node output 524 is provided via one or more links 512 to one or more other nodes 520, a weight w associated with each link 512 may be applied to the node output 524. Likewise, the one or more node inputs 522 may be combined based on corresponding weights $w_1$, $w_2$, $w_3$, and $w_4$ according to the propagation function 530. In an example, the propagation function 530 is computed by applying a non-linear activation function 532 to a linear weighted combination 534 of the one or more node inputs 522.

The collection of nodes 520 may be organized into layers in the neural network 500. In general, the layers may include an input layer 502 for receiving inputs, an output layer 506 for providing outputs, and one or more hidden layers 504 (e.g., layers 504A and 504B) between the input layer 502 and the output layer 506. A deep neural network has more than one hidden layer 504 between the input layer 502 and the output layer 506. In the neural network 500, each layer may only be connected with its immediately preceding and/or immediately following layer. In some embodiments, a layer may be a "fully connected" layer because each node in the layer is connected to every node in its immediately following layer. In some embodiments, a hidden layer 504 may include two or more nodes that may be connected to the same node in its immediately following layer for down sampling or pooling the two or more nodes. In particular, max pooling may use a maximum value of the two or more nodes in the layer for generating the node of the immediately following layer.

In some embodiments, a convolutional neural network (CNN) may be applied in a machine learning model 350 to process input data. The CNN employs convolution operations and belongs to a class of deep neural networks. The hidden layers 504 of the CNN include convolutional layers. Each node in a convolutional layer may receive inputs from a receptive area associated with a previous layer (e.g., nine nodes). Each convolution layer may use a kernel to combine pixels in a respective area to generate outputs. For example, the kernel may be to a 3×3 matrix including weights applied to combine the pixels in the respective area surrounding each pixel. Video or image data can be pre-processed to a predefined video/image format corresponding to the inputs of the CNN. In some embodiments, the pre-processed video or image data may abstracted by the CNN layers to form a respective feature map. In this way, video and image data can be processed by the CNN for video and image recognition or object detection.

In some embodiments, a recurrent neural network (RNN) is applied in the machine learning model 350 to process input data 422. Nodes in successive layers of the RNN follow a temporal sequence, such that the RNN exhibits a temporal dynamic behavior. In an example, each node 520 of the RNN has a time-varying real-valued activation. It is noted that in some embodiments, two or more types of input data may be processed by the data processing module 330, and two or more types of neural networks (e.g., both a CNN and an RNN) may be applied in the same machine learning model 350 to process the input data jointly.

The training process is a process for calibrating all of the weights $w_i$ for each layer of the neural network 500 using training data 346 that is provided in the input layer 502. The training process typically may include two steps, forward propagation and backward propagation, which may be repeated multiple times until a predefined convergence condition is satisfied. In the forward propagation, the set of weights for different layers may be applied to the input data and intermediate results from the previous layers. In the backward propagation, a margin of error of the output (e.g., a loss function) is measured (e.g., by a loss control module 412), and the weights may be adjusted accordingly to decrease the error. The activation function 532 can be linear, rectified linear, sigmoidal, hyperbolic tangent, or other types. In some embodiments, a network bias term b may be added to the sum of the weighted outputs 534 from the previous layer before the activation function 532 is applied. The network bias b may provide a perturbation that helps the neural network 500 avoid over fitting the training data. In some embodiments, the result of the training may include a network bias parameter b for each layer.

Figure 6A:
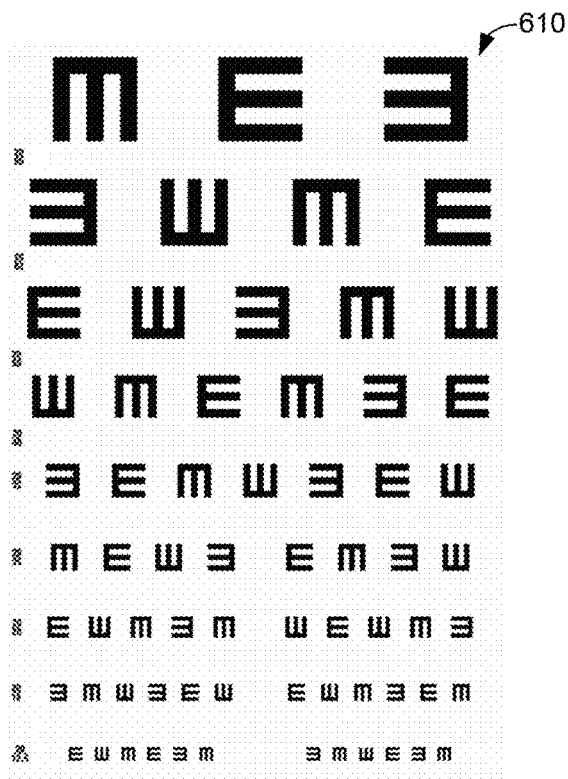
FIG. 6A is an example "tumbling E" chart applied in a visual acuity test.
Figure 6B:
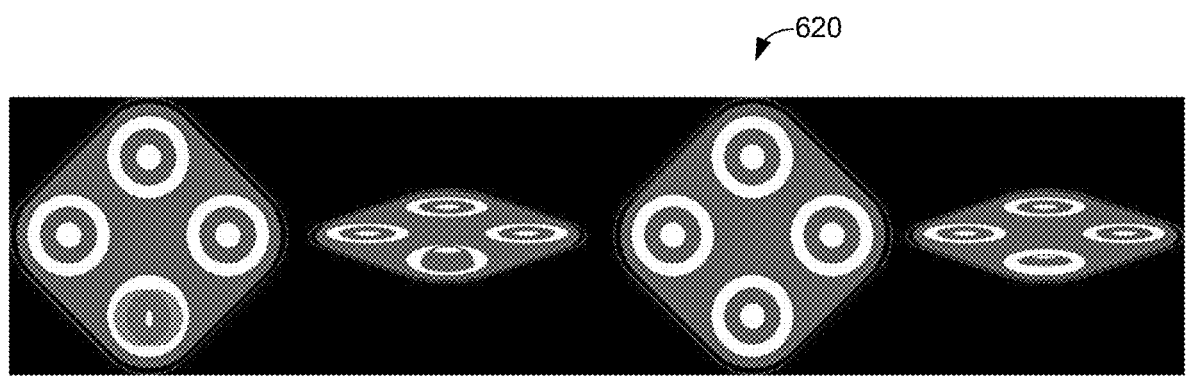
FIGS. 6B-6E are example patterns applied in an astigmatism test, a stereopsis test, a visual field test, and a color blindness test, in accordance with some embodiments.
Figure 6C:
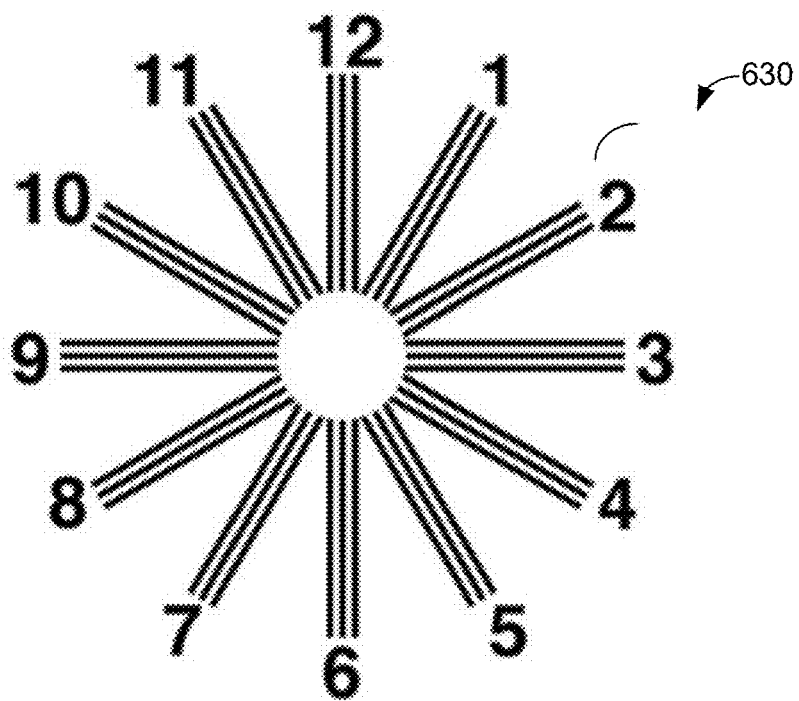
Figure 6D:
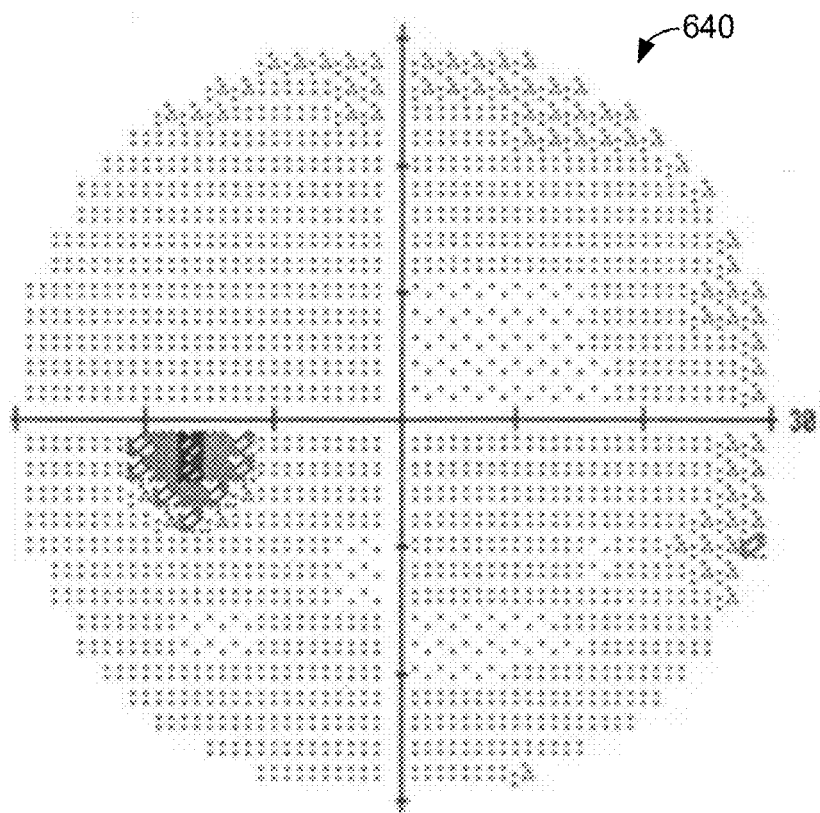
Figure 6E:
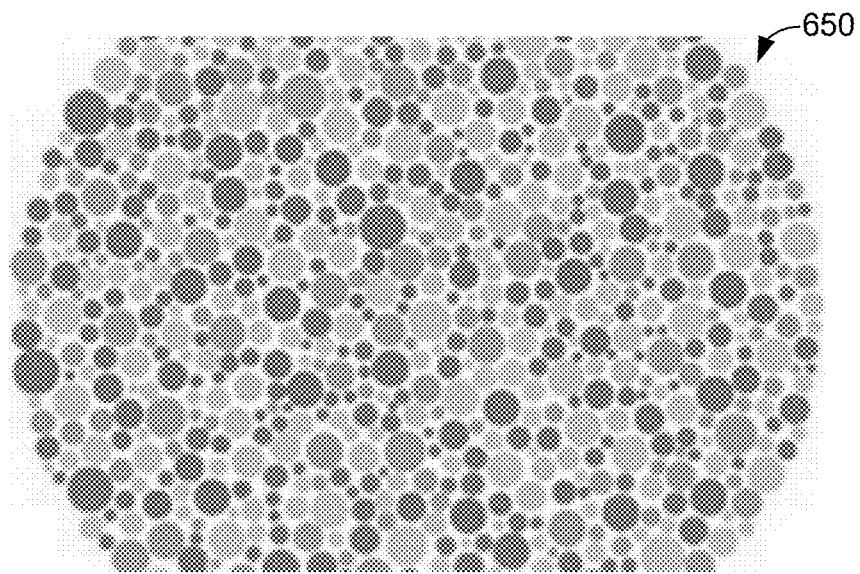

In some embodiments of the present disclosure, a vision test is implemented in a headset device 140D configured to display a user interface creating a three-dimensional (3D) virtual environment. Examples of a vision test implemented in the 3D virtual environment include, but are not limited to a visual acuity test, a visual field test, a visual depth test, a color blindness test, a retinoscopy, a test for stereopsis, a refraction test, an astigmatism test, and a contact lens exam. FIG. 6A is an example "tumbling E" chart 610 applied in a visual acuity test, in accordance with some embodiments. FIGS. 6B, 6C, 6D, and 6E are example patterns 620, 630, 640, and 650 applied in an astigmatism test, a stereopsis test, a visual field test, and a color blindness test, in accordance with some embodiments.

Figure 7:
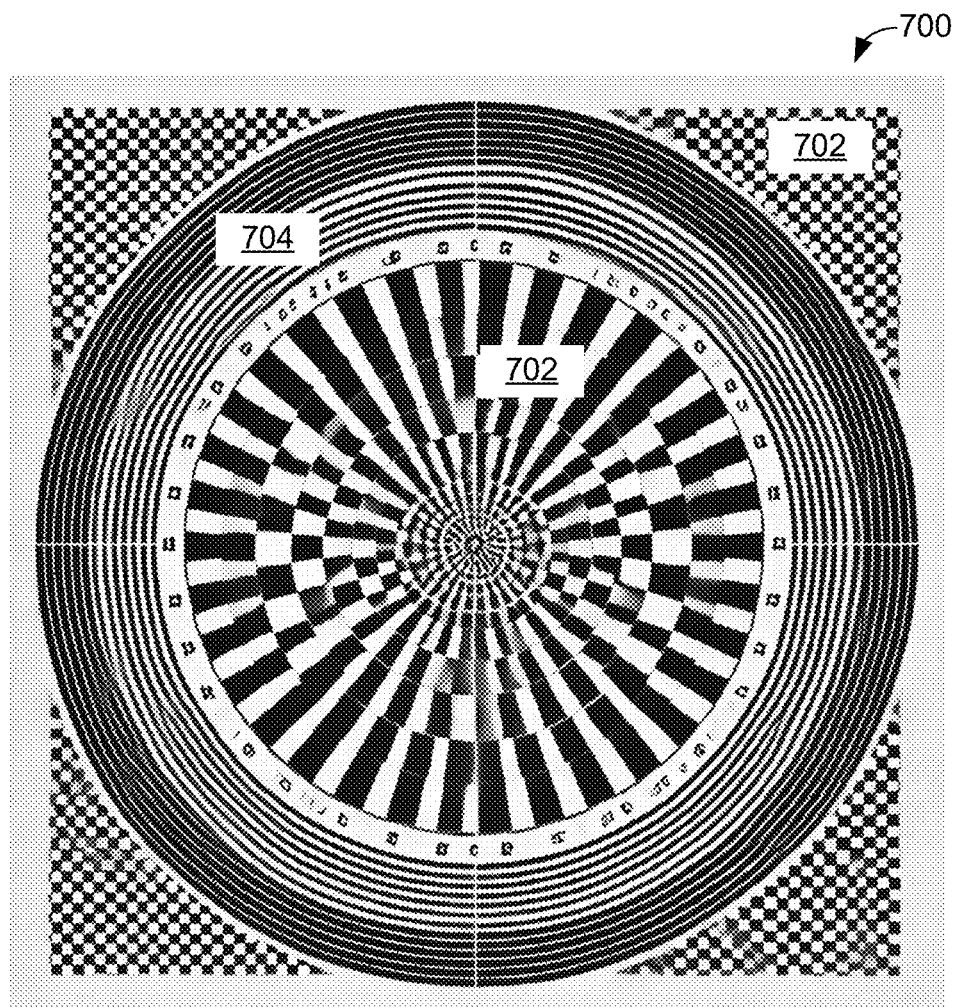
FIG. 7 is another example visual pattern applied to test visual acuity and astigmatism, in accordance with some embodiments.

FIG. 7 is another example visual pattern 700 applied to test visual acuity and astigmatism, in accordance with some embodiments. The visual pattern 700 integrates a grid pattern 702 and concentric rings 704. The grid pattern 702 may include evenly spaced horizontal and vertical lines, creating a checkerboard pattern. The grid pattern 702 may be configured to identify distortions in straight lines, which can indicate issues with visual acuity and astigmatism. The concentric rings 704 may expand outward from a center of the visual pattern 700 and can assist in detecting radial distortions, which are common indicators of astigmatism. The visual pattern 700 may be depicted in high-contrast black and white, which ensures maximum clarity and reduces the potential for color-related distortions, making it easier to detect any visual impairment or defect.

FIGS. 8A-8D include four diagrams of example graphical user interfaces 810, 820, 830, and 840 rendered to determine a visual acuity score in a virtual environment created by a headset device 140D, in accordance with some embodiments. The user interface 810 may display an information page including instructions on controlling a headset device 140D to select one of a plurality of optotype candidates to match a target optotype displayed in the virtual environment. The user interface 820 may display an information page including two optional ways of using the controller to select the one of the plurality of optotype candidates. The user interface 830 may display an information page including general guidelines on a visual acuity assessment process. The user interface 840 may display an optotype 842 that is projected on a screen that has a first distance L1 from a user's position in the virtual environment. In a second distance L2 near the user, a selection panel 844 including a plurality of optotype candidates may be displayed, prompting the user to select one of the optotype candidates that matches the optotype 842. In some embodiments, in response to a user selection of the one of the optotype candidates, the optotype 842 displayed in the first distance L1 may be updated with a new optotype 842. Further, in some embodiments, the new optotype 842 may spin at a fast rate for a shortened duration of time (e.g., 2 seconds), before it settles in place of the original optotype 842. In an example, the optotype 842 may spin and gradually shrink in size during the shortened duration of time.

Figure 9A:
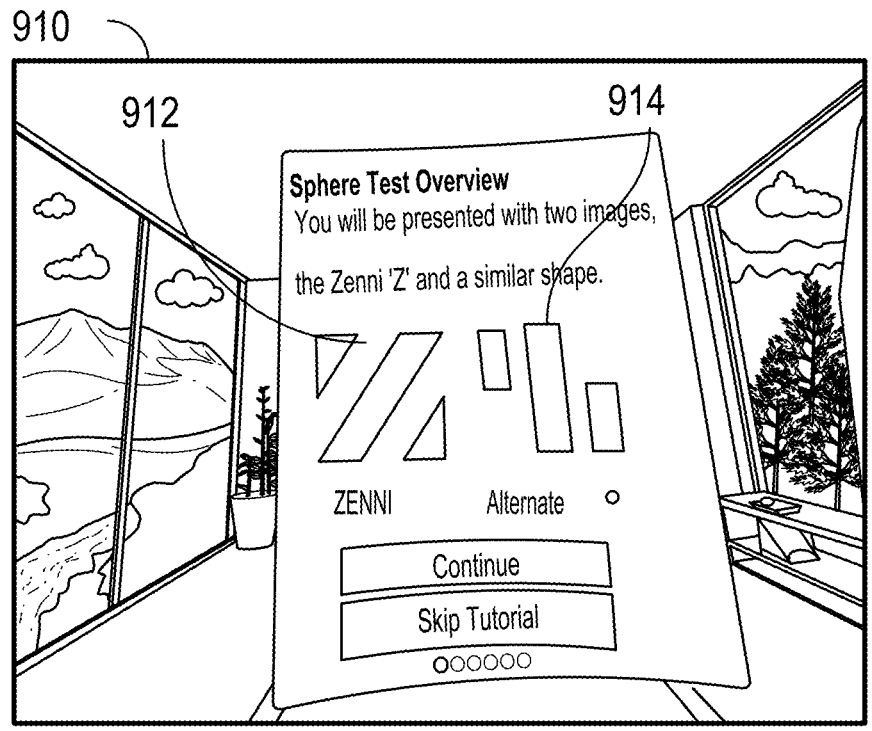
FIGS. 9A-9C include three diagrams of example graphical user interfaces rendered to determine a nearsighted or farsighted power in a virtual environment created by a headset device, in accordance with some embodiments.
Figure 9B:
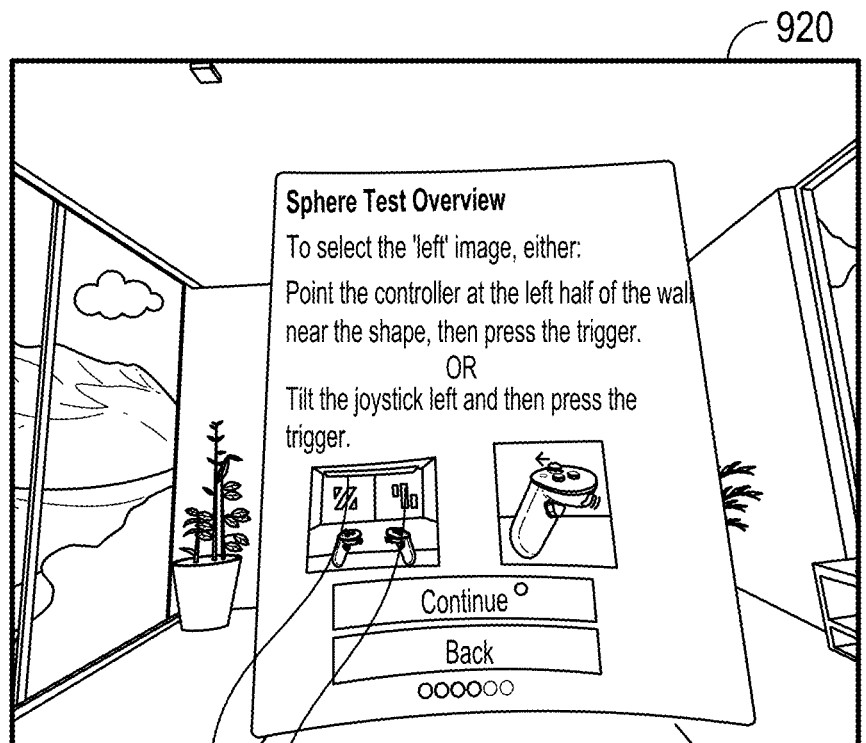
Figure 9C:
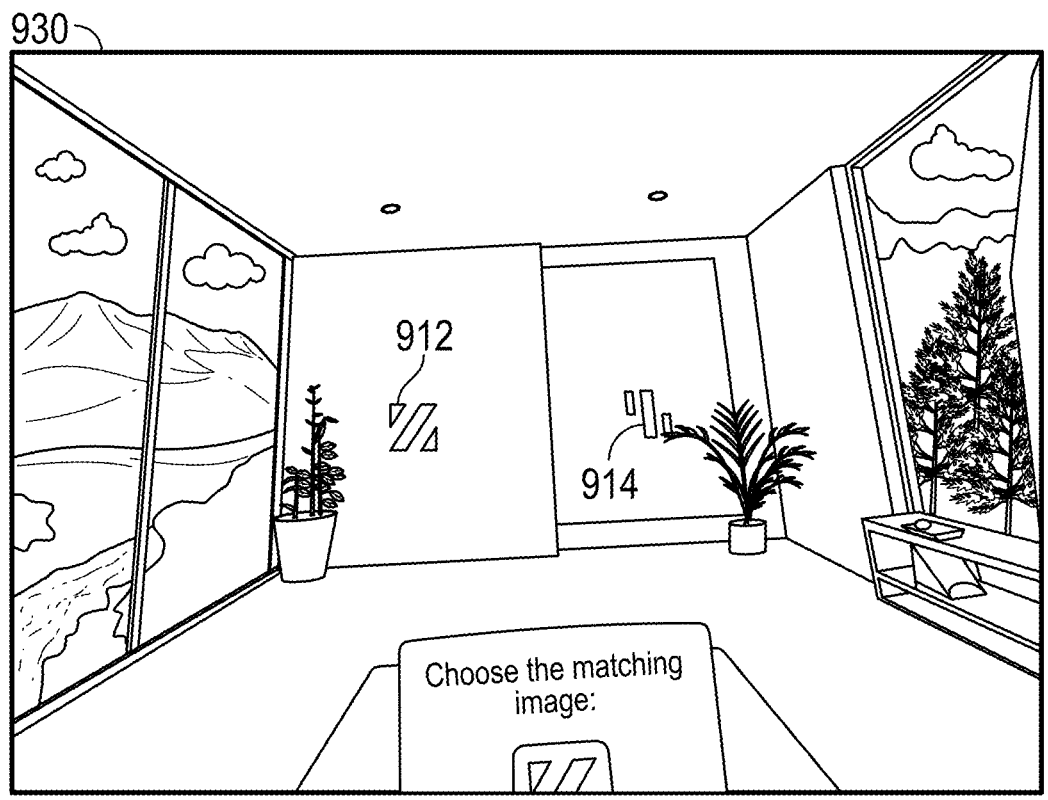

FIGS. 9A-9C include three diagrams of example graphical user interfaces 910, 920, and 930 rendered to determine a nearsighted or farsighted power in a virtual environment created by a headset device 140D, in accordance with some embodiments. The user interface 910 may display an information page explaining that two target optotypes 912 and 914 may be displayed in the virtual environment. The user interface 920 may display an information page including two optional ways of using the controller to select one of the two target optotypes 912 and 914. The user interface 930 may display two target optotypes 912 and 914 that may be projected on a screen that has a first distance L1 from a user's position in the virtual environment. In this example, the target optotype 912 located on the left is highlighted (e.g., by being displayed in a colored background). In a second distance L2 near the user, a confirmation panel 932 may be displayed, prompting the user to select one of the two target optotypes 912 and 914. In some embodiments, in response to a user selection of the one of the two target optotypes 912 and 914, the two target optotypes 912 and 914 displayed in the first distance L1 may be updated with a new pair of two target optotypes 912 and 914. Further, in some embodiments, each optotype 912 or 914 may spin at a fast rate for a shortened duration of time (e.g., 2 seconds), before it settles in place of the original optotype 912 or 914. In an example, the optotype 912 or 914 may spin and gradually shrink in size during the shortened duration of time.

FIGS. 10A-10F include six diagrams of example graphical user interfaces 1010, 1020, 1030, 1040, 1050, and 1060 rendered to determine eye stigmatism in a virtual environment created by a headset device 140D, in accordance with some embodiments. The user interface 1010 may display an information page explaining that a clock diagram of converging numbered lines 1012 (which is a type of optotype) is displayed in the virtual environment. For example, the user interface 1010 may include an message, e.g., "You will be presented with a clock diagram of converging numbered lines." The user interface 1020 may display an information page explaining what is selected on the clock diagram of converging numbered lines 1012 displayed in the virtual environment. For example, the user interface 1010 may include an message, e.g., "Your task is to identify if any of these sets of lines appear clearer, crisper, or darker than other." The user interface 1030 may display an information page including two optional ways of using the controller to select lines on the clock diagram of converging numbered lines 1012. For example, the user interface 1010 may include an message, e.g., "Make a selection by either pointing the controller at the lines on the clock, then pressing the trigger" and "Rotating the joystick to move the indicator arrows around the clock." The user interface 1040 may display an information page illustrating an embodiment having equally clear lines on the clock diagram of converging numbered lines 1012. For example, the user interface 1010 may include an message, e.g., "If two sets of neighboring lines seem to both stand out as equally clear, you can move the indicator arrows to a halfway point between those lines."

Figure 10E:
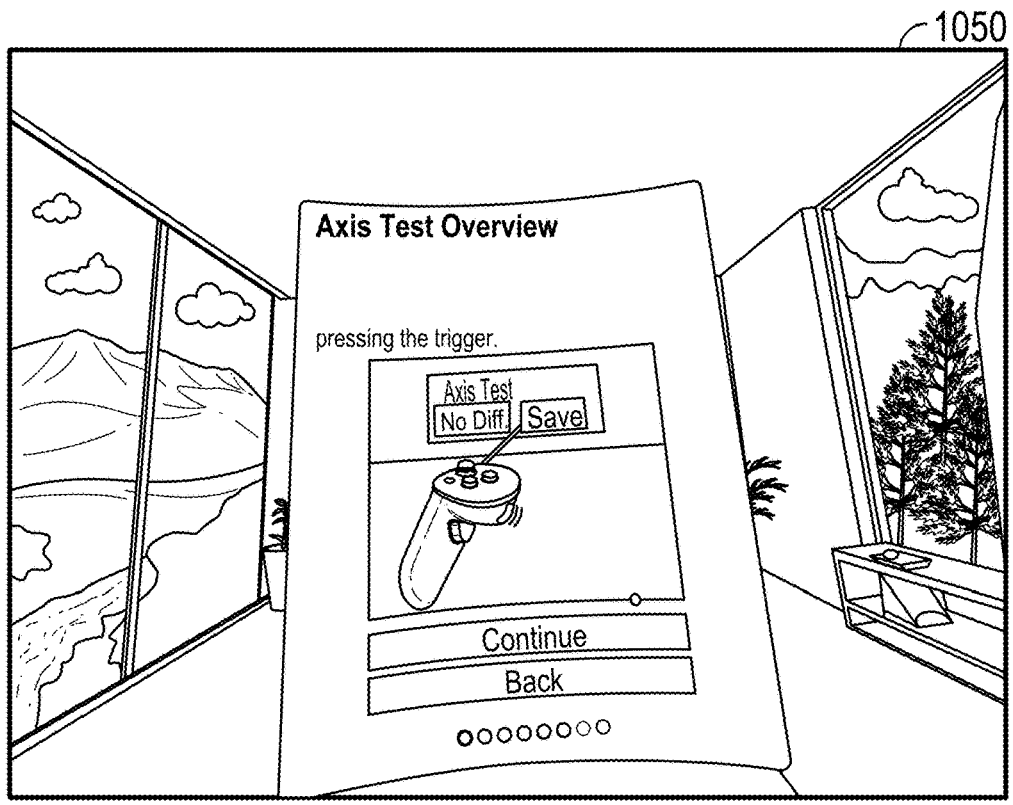
Figure 10F:
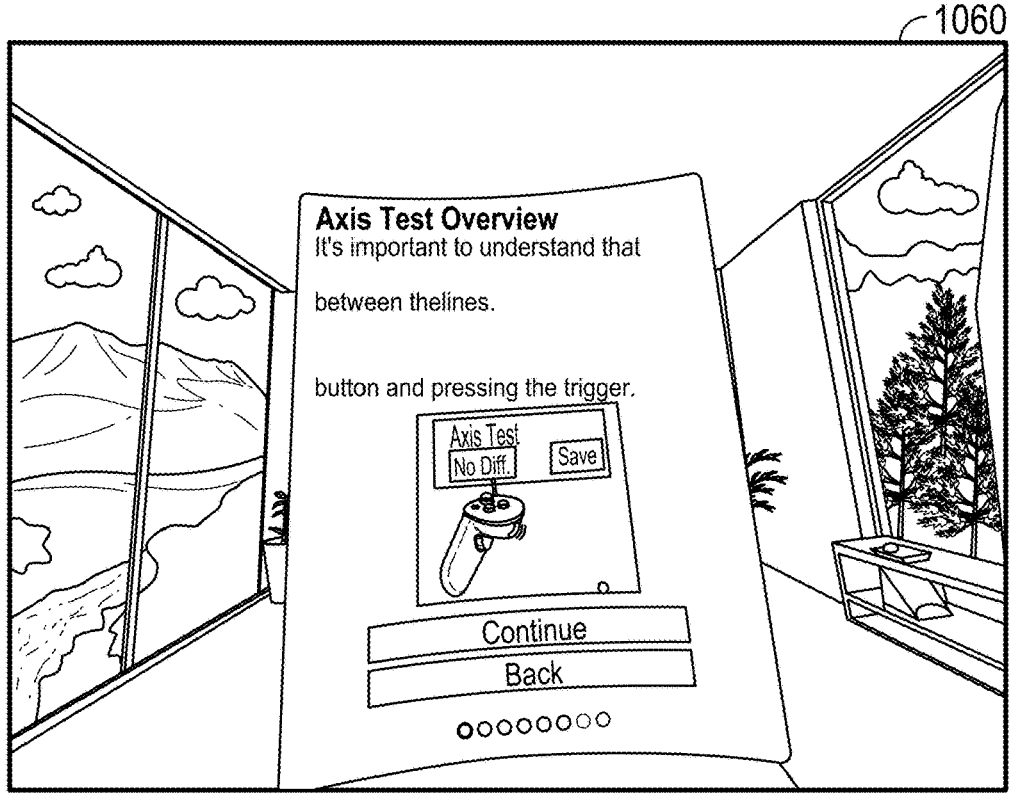

Referring to FIG. 10E, the user interface 1050 may display an information page including an instruction using the controller to submit a selection. For example, the user interface 1010 may include an message, e.g., "After selecting a set of lines, submit your choice with the 'Done' button below by pointing to the controller at the button and pressing the trigger." Further, referring to FIG. 10F, the user interface 1060 may display an information page including an instruction using the controller to indicate that no difference is observed on the clock diagram of converging numbered lines 1012. For example, the user interface 1010 may include an message, e.g., "It's important to understand that not everybody will see a difference between the lines" and "In this case, simply select 'No Difference' below, by positioning the controller at the button and pressing the trigger."

Innovations in Eye Movement Tracking

Some implementations of a VR system may be configured to enhance administration and experience of vision tests. The VR system may include a headset device 140D equipped with a display and one or more sensors for tracking one or more of eye movement, head orientation, and hand gestures of a user wearing the headset device 140D. In some embodiments, the headset device 140D may be configured to execute a vision assessment application 328 configured to adaptively manage a sequence of vision tests based on the user's condition. In some embodiments, the headset device 140D may be communicatively coupled to a server 102 configured to execute a server-side module for the vision assessment application 328, thereby managing the sequence of vision tests jointly with a device-side module the vision assessment application 328 executed on the headset device. The vision assessment application 328 may be configured to generate a VR user interface corresponding to a three-dimensional (3D) virtual environment and render visual stimuli 338 in this 3D virtual environment. A range of different vision tests may be conducted based on the visual stimuli within an immersive VR space.

In some embodiments, a headset device 140D may include one or more processors 302 and memory 306 storing instructions to execute the vision assessment application 328 for rendering visual stimuli 338 in an output device 312 (e.g., a display) and processing sensor data 342 collected from the sensors 360 in response to the visual stimuli 338. The sensor data 342 may be processed to determine vision test results 344 (e.g., eye movement patterns, response times, and visual perception accuracy) for the user. Further, in some embodiments, VR technology facilitates a personalized control scheme for navigating the vision tests. The personalized control scheme can enable the user to interact with the test environment through intuitive hand gestures and eye movements, thereby providing a natural and engaging testing experience. The vision tests may be customized based on individual users' requirements and accommodate a wide range of vision impairments.

In some embodiments, the vision test results 344 may be used to generate comprehensive reports on the user's visual performance. For example, the headset device 140D may employ a deep learning model that correlates micro-expression data with vision test results 344 to provide holistic assessment of the user's ocular health. In some embodiments, the vision test results 344 may be applied to identify vision conditions of the user and track changes of the vision conditions over time, thereby offering valuable insights to healthcare providers. In some embodiments of the present disclosure, eye images may be captured and used to determine eye movement information automatically and without user intervention, which is an efficient solution to provide reliable supplemental information that cannot be provided by the user's active responses to visual stimuli.

Figure 11:
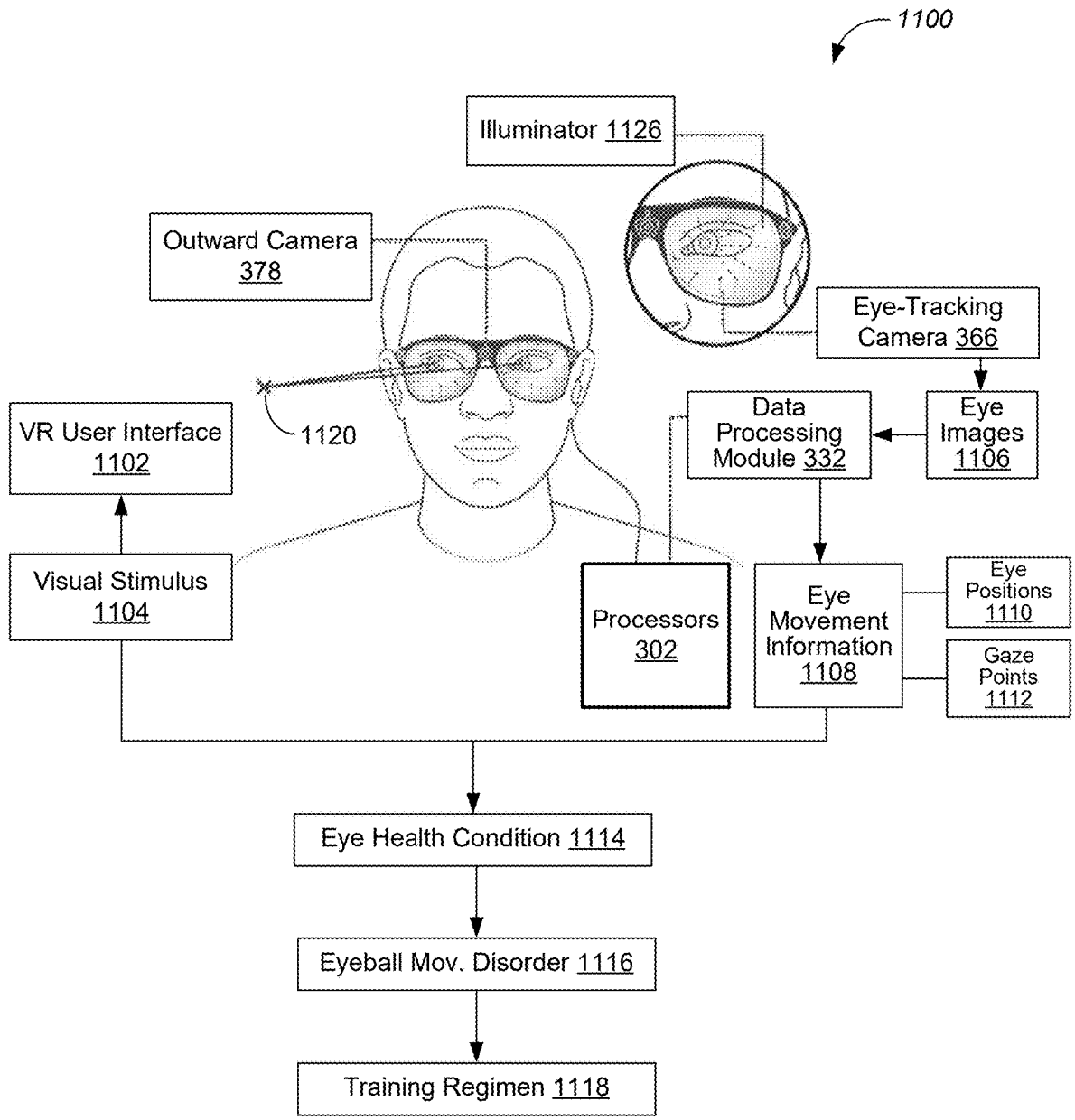
FIG. 11 is a diagram showing a vision test system configured to implement a virtual vision test based on eye tracking, in accordance with some embodiments.

FIG. 11 is a diagram showing a vision test system 1100 configured to implement a virtual vision test based on eye tracking, in accordance with some embodiments. The vision test system 1100 may be implemented using a computer device 140 (e.g., headset device 140D), which may include one or more processors 302, memory 306 storing instructions to be implemented by the processor(s) 302, an HMD 312A, and one or more cameras 310A (e.g., outward camera 378, eye-tracking camera 366). The computer device 140 may execute a user application (e.g., a visual assessment application 328) configured to enable the virtual vision test and generates a VR user interface 1102 corresponding to a three-dimensional (3D) virtual environment. A visual stimulus 1104 corresponds to the virtual vision test and is displayed on the user interface 1102. The computer device 140 may focus the eye-tracking camera 366 on an eye area of a user wearing the computer device 140. While displaying the visual stimulus 1104, in real time, the eye-tracking camera 366 can capture a sequence of eye images 1106. The computer device 140 may determine eye movement information 1108 including a temporal sequence of eyeball positions 1110 based on the sequence of eye images 1106. In some embodiments, the eye movement information 1108 may include a temporal sequence of gaze points 1112 each of which corresponds to a respective subset of a subset of eye images 1106. The visual stimulus 1104 and the eye movement information 1108 may be compared to determine an eye health condition.

In some embodiments, the computer device 140 may further include an illuminator 1126 configured to illuminate an eye area covered by the computer device 140 and facilitate capturing the eye images 1106 by the eye-tracking camera 366. Further, in some embodiments, the illuminator 1126 may include a near-infrared diode configured to illuminate the eye area with near-infrared light. The eye-tracking camera 366 may include a near-infrared sensor array.

In some embodiments, a camera 310A of the computer device 140 may be used to capture eyeball movement data that is representative of an eye position 1110. Based on the eyeball movement data, the visual stimulus 1104 and the eye movement information 1108 may be used to determine an eyeball movement disorder 1116. Further, in some embodiments, the computer device 140 (e.g., VR headset device) may focus the camera 310A on an eye area of a user wearing the computer device 140, and displays, on the user interface 1102, a visual stimulus 1104 corresponding to the virtual vision test. While displaying the visual stimulus, in real time, the camera 310A may capture a sequence of eye images 1106.

Examples of the eyeball movement disorder include strabismus (in which two eyes are not directed or focused at the same object), amblyopia (lazy eye), and nystagmus (repetitive eye movements). Strabismus may include esotropia in which either one or both eyes turn in toward the nose, exotropia in which either one or both eyes turn away from the nose, and hypertropia in which one eye is higher than the other. In some embodiments, based on the eye movement disorder 1116, the computer device 140 may prescribe a training regimen 1118 for the eye. Further, in some embodiments, the computer device 140 may display and provide the training regimen 1118 via the VR user interface 1102.

In some embodiments, the visual stimulus 1104 may include a visual pattern 700 (FIG. 7), and may be applied in the vision test system 1100 to monitor the user's gaze point 1120 as the user's eyes interact with the grid 702 and concentric rings 704 of the visual pattern 700. The processors 302 may analyze where the eyes focus and detect discrepancies in tracking, which can be applied to provide detailed data on visual acuity and astigmatism. In some embodiments, eye-tracking can detect subtle changes in how users perceive the visual pattern 700, providing real-time feedback on potential visual issues (e.g., the eye health condition 1114) and helping create personalized correction plans or further diagnostic procedures.

Figure 12:
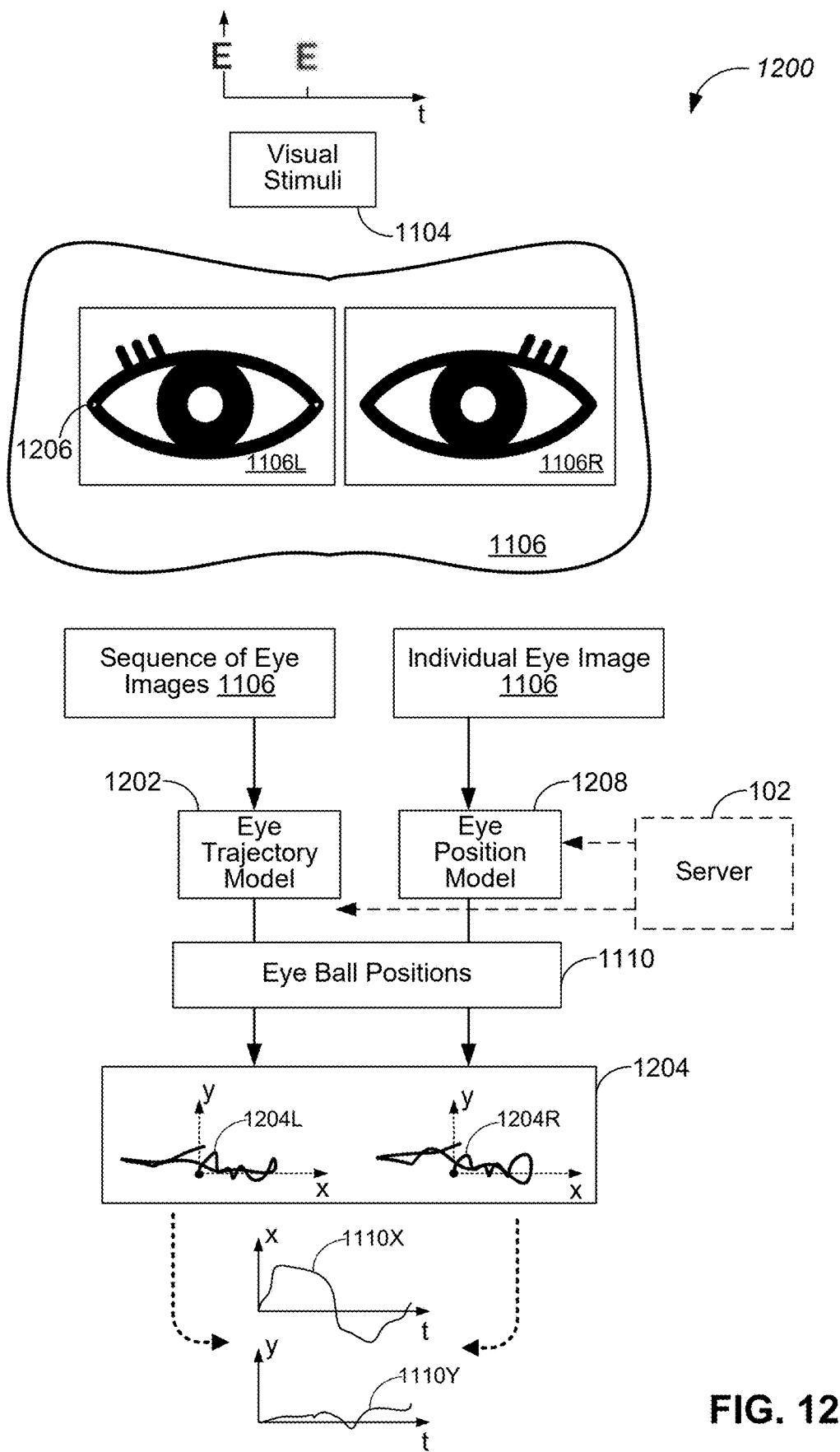
FIG. 12 is a flow diagram of an example method of tracking eyes for vision test, in accordance with some embodiments.

FIG. 12 is a flow diagram of an example method 1200 of tracking eyes for vision test, in accordance with some embodiments. A computer device 140 (e.g., headset device 140D) may include an HMD 312A, and one or more cameras 310A (e.g., outward camera 378 and eye-tracking camera 366 in FIG. 3). The computer device 140 may execute a user application (e.g., a visual assessment application 328) configured to enable the virtual vision test and generate a VR user interface 1102 (FIG. 11) corresponding to a 3D virtual environment. A visual stimulus 1104 (FIG. 11) corresponds to the virtual vision test, and is displayed on the user interface 1102. The computer device 140 may focus the eye-tracking camera 366 on an eye area of a user wearing the computer device 140. While displaying the visual stimulus 1104, in real time, the eye-tracking camera 366 may capture a sequence of eye images 1106 (FIG. 11), which is applied to determine eye movement information 1108 including a temporal sequence of eyeball positions 1110. In some embodiments, for each of the sequence of eye images 1106, the computer device 140 may crop the respective eye image 1106 to generate a left eye image 1106L and/or a right eye image 1106R including a respective eye of the user based on a predefined aspect ratio. After cropping, a resolution of the respective eye image 1106 may be adjusted to a predefined resolution.

In some embodiments, the computer device 140 may apply an eye trajectory model 1202 to process the sequence of eye images 1106 (FIG. 11) jointly and identify an eyeball position trajectory 1204 including the temporal sequence of eyeball positions 1110. In some embodiments, the eyeball position trajectory 1204 may include a first trajectory 1204L of a left eye or a second trajectory 1204R of a right eye. For either eye, the respective trajectory 1204L or 1204R may include a respective temporal sequence of x positions 1110X and a respective temporal sequence of y positions 1110Y. Alternatively, in some embodiments, an eye position model 1208 may be applied to process each of the sequence of eye images 1106 and identify a respective eyeball position 1110 in each eye image 1106. Respective eyeball position 1110 of the sequence of eye images 1106 may be consolidated to the temporal sequence of eyeball positions 1110. Additionally, in some embodiments, the computer device 140 may obtain the eye trajectory model 1202 or the eye position model 1208 from a server 102, and the server 102 is communicatively coupled to the computer device 140 via one or more communication networks 108 and is configured to manage the user application 324 and a plurality of user accounts.

In some embodiments, the server 102 may obtain a plurality of test eye images and associated ground truth eyeball positions. The eye trajectory model 1202 or the eye position model 1208 may be trained with the plurality of test eye images and the associated ground truth eyeball positions. After training, the server may send the eye trajectory model 1202 or the eye position model 1208 to the computer device 140.

In some embodiments, for each of the sequence of eye images 1106, the computer device 140 may process the respective eye image 1106 to identify one or more reference locations 1206 (e.g., a tear duct located at a corner of eye, an upper lash line, a lower lash line, an outer V). A respective eyeball position 1110 may be determined with respect to the one or more reference locations 1206. For example, for either eye, a reference location 1206 of an eye coordinate system may be set a middle point of a line connecting the tear duct and the outer V of the respective eye, and the respective eyeball position 1110 may include an x-axis position 1110X and a y-axis position 1110Y measured with respect to the reference location 1206 (which corresponds to an origin of the eyeball position trajectory 1204.

Figure 13:
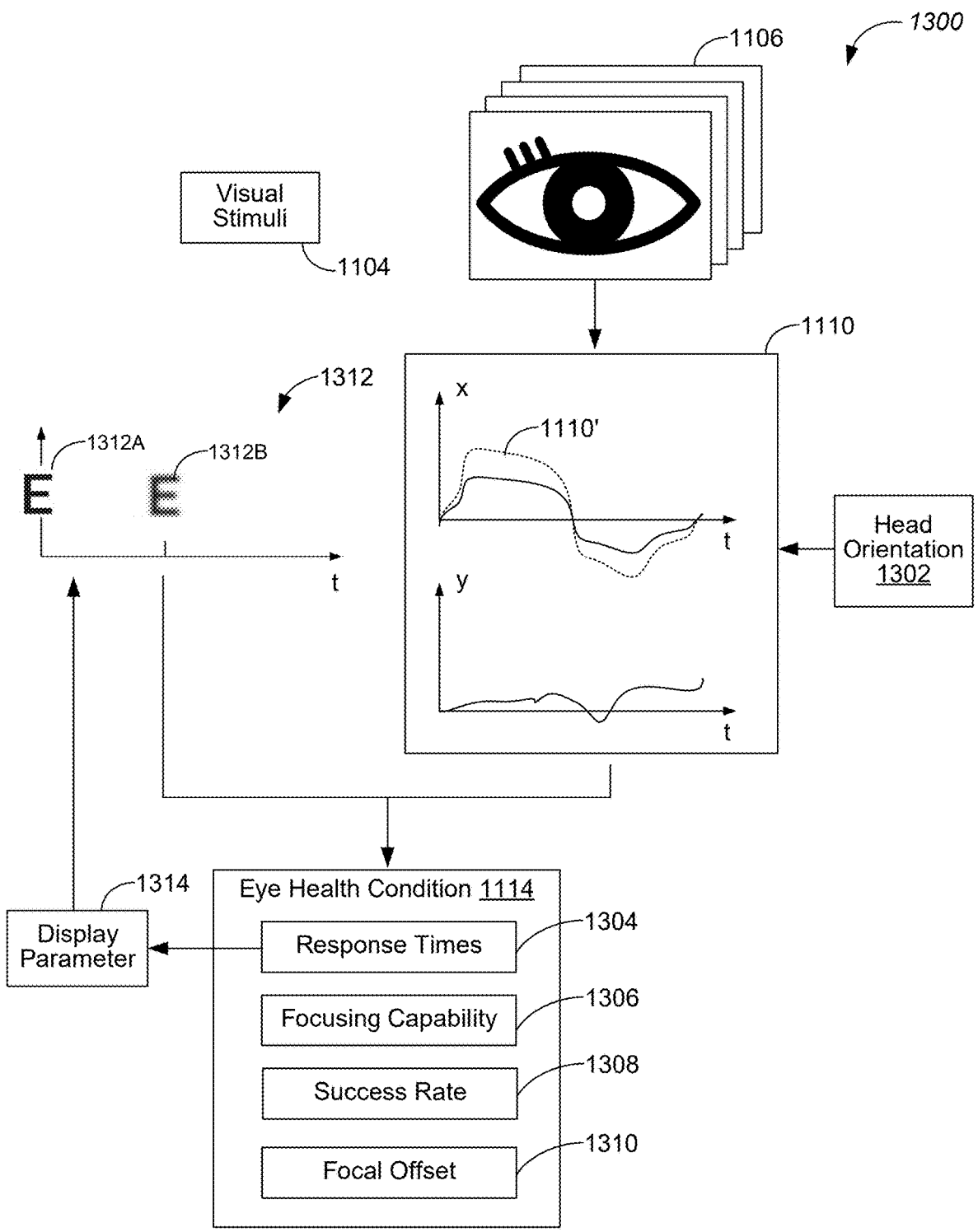
FIG. 13 is a flow diagram of an example method of tracking eyes for vision test, in accordance with some embodiments.

FIG. 13 is a flow diagram of an example method 1300 of tracking eyes for vision test, in accordance with some embodiments. In some embodiments, for each of the sequence of eye images 1106, the computer device 140 may further determine a respective head orientation 1302, and adjust the respective eyeball position 1110 based on the respective head orientation 1302, generating the adjusted respective eyeball position 1110'. For example, the user wearing the computer device 140 may only turn around his or her head without lifting up or down the head. The x-axis eyeball position corresponding to the adjusted respective eyeball position 1110' may deviate from the x-axis eyeball position 1110X, and the y-axis eyeball position corresponding to the adjusted respective eyeball position 1110' may be negligible.

In some embodiments, the visual stimulus 1104 and the eye movement information 1108 (e.g., eyeball positions 1110) may be compared to generate a comparison result including one or more of: an eyeball response time 1304, a success rate 1308, an eyeball position trajectory 1204, whether an eyeball focuses (i.e., a focusing capability 1306), or an offset 1310 from a correct focal point. In some embodiments, the eye health condition may include an eye's focusing capability 1306. In response to the visual stimulus 1104 staying at a fixed position on the user interface 1102, the computer device 140 may determine that the temporal sequence of eyeball positions 1110 follows the visual stimulus 1104 and moves around within a positional range around an eye position. The eye's focusing capability 1306 may be determined based on the positional range. In accordance with a determination that the positional range exceeds a vibration tolerance, the computer device 140 may determine an eyeball movement disorder 1116 (FIG. 11) corresponding to a difficult in focusing on the visual stimulus 1104.

In some embodiments, in response to the visual stimulus 1104, the computer device 140 may determine one or more response times 1304 associated with the temporal sequence of eyeball positions 1110. Based on the one or more response times, the computer device 140 may determine whether the eye health condition 1114 of the user may include a predefined neurological defect. For example, in accordance with a determination that the one or more response times 1304 are greater than a response time threshold, the computer device 140 may determine that the predefined neurological defect causes an abnormal delay for the user's eye to respond to the virtual stimulus 1104.

In some embodiments, the visual stimulus 1104 may include a sequence of optotypes 1312. In response to the visual stimulus, the computer device 140 may determine a success rate 1308 of the temporal sequence of eyeball positions 1110 following each of the sequence of optotypes 1312. The eye health condition 1114 of the user may be determined based on the success rate 1308. Further, in some embodiments, a false positive rate, a false negative rate, or both of them of the eyeball positions 1110 may be determined, e.g., for diagnosis of an eyeball movement disorder 1116 clinically.

In some embodiments, the visual stimulus 1104 may include a sequence of optotypes 1312. The computer device 140 may determine one or more response times 1304 associated with a first subset of the temporal sequence of eyeball positions 1110, which are associated with a first subset of optotypes 1312A. Based on the one or more response times, the computer device 140 dynamically adjusts a display parameter 1314 of a second subset of optotypes 1312B following the first subset of optotypes 1312A. Further, in some embodiments, the display parameter 1314 of the second subset of optotypes 1312B may include one or more of a display size, a spatial pitch, a temporal pitch, a contrast level, and a brightness level of the second subset of optotypes 1312B.

Figure 14:
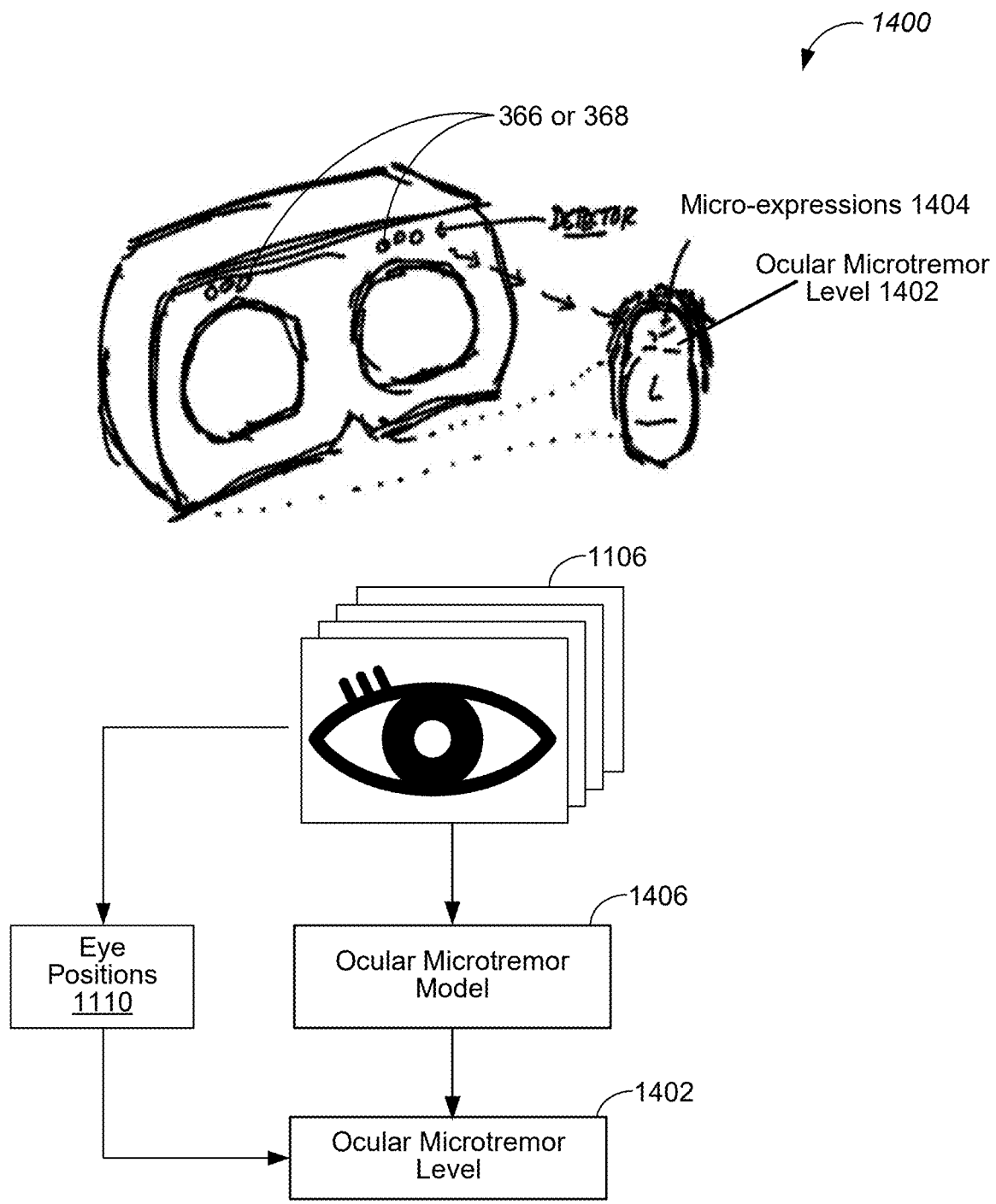
FIG. 14 is a diagram illustrating an example method of tracking micro-expressions and microtremors in an eye area, in accordance with some embodiments.

FIG. 14 is a diagram illustrating an example method 1400 of tracking micro-expressions and microtremors in an eye area, in accordance with some embodiments. In some embodiments, one or more the sequence of eye images 1106 may be processed to identify an ocular microtremor level or micro-expression in the eye area. In other words, a subarea of the eye area does not correspond to an eyeball, and a subset of a respective eye image 1106 may be analyzed to determine the ocular microtremor level 1402 or a micro-expression 1404 (e.g., frowning). In some embodiments, the sequence of eye images 1106 may be analyzed to determine one or more parameters of: a left-right asymmetry, a velocity of facial muscle movement in the subarea of the eye area, and an eye blinking rate. The micro-expression 1404 may be further determined based on the one or more parameters, e.g., using a corresponding machine learning model 350. In an example, a patient may have an eye health condition 1114 causing an apraxia of lid opening. The computer device 140 may determine a level of the left-right asymmetry based on the sequence of eye images 1106. The computer device 140 can also compare the level of the left-right asymmetry with historical levels of the left-right asymmetry to determine whether the eye health condition causing an apraxia of lid opening deteriorates over time.

In some embodiments, the eye-tracking camera 366 of the headset device 140D (FIG. 3) may be configured to detect micro-expressions and ocular microtremors. Alternatively, in some embodiments, the headset device 140D may further include a biometric sensor array 368 (FIG. 3) configured to detect micro-expressions and ocular microtremors. The biometric sensor array 368 may provide a higher resolution than the eye-tracking camera 366. The biometric sensor array 368 may be configured to generate biometric data used in diagnosis of early-stage neurological disorders and ocular diseases. Further, in some embodiments, an ocular microtremor model 1406 may be applied to process the sequence of eye images 1106 jointly and identify an ocular microtremor level 1402. Alternatively, in some embodiments, an ocular microtremor level 1402 may be determined based on the temporal sequence of eyeball positions 1110.

Innovations in Automatic Neurological Feedback

Development of VR technology that integrates multiple vision testing methods presents a significant advancement in comprehensive vision assessments. Some embodiments of the present disclosure are directed to a VR system configured to conduct a wide array of vision tests within a single immersive environment. This system may include a VR headset equipped with sensors 360 (FIG. 3) and output devices 312 (e.g., displays), capable of delivering visual stimuli and capturing user responses. The VR headset may be coupled to a computer device (e.g., a server 102) that runs a suite of visual assessment application 328 (FIG. 3). The visual assessment application 328 can be configured to implement a range of vision tests, including but not limited to visual acuity test, color perception test, depth perception test, and peripheral vision test. The VR system can be configured to integrate these vision tests, allowing users to undergo thorough evaluation of their visual capabilities in a seamless and integrated manner. In some embodiments, each test may be dynamically adapted to a user's specific vision profile, thereby providing personalized and precise assessment.

In some embodiments, a headset device 140D may include one or more processors 302 and memory 306 storing instructions to execute the vision assessment application 328 for rendering visual stimuli 338 in an output device 312 (e.g., a display) and processing sensor data 342 collected from the sensors 360 in response to the visual stimuli 338. The sensor data 342 may be processed to determine vision test results 344 (e.g., eye movement patterns, response times, and visual perception accuracy) for the user. Further, in some embodiments, the VR system may incorporate an advanced neuro-ocular interface that monitors real-time neural activity associated with visual processing. This interface may utilize non-invasive neural sensors embedded in the VR headset, capable of capturing subtle brain wave patterns and neural responses to visual stimuli. For example, electrodes may be integrated in one or more head straps of a headset device 140D for recording neurological signals of a brain of a user wearing the headset device 140D.

Data analysis algorithms (e.g., machine learning models 350) may be employed to interpret data collected by neural sensors and provide unprecedented insights into the user's overall visual health. For example, a specialized neural network may be applied to correlate neural activity patterns with visual performance metrics. The data analysis algorithm may allow for identification of a wide range of vision issues and early detection of neurological conditions affecting vision. The vision issues identified by data analysis can range from common refractive errors to more complex visual disorders. In some embodiments, the headset device 140D may be communicatively coupled to one or more servers 102, and enable a centralized vision test management platform with the one or more servers 102. This platform can aggregate data across multiple users, facilitating large-scale research and analysis. Further, in some embodiments, the platform's architecture may include a real-time adaptive feedback system that adjusts vision tests dynamically based on neural and ocular data and ensures personalized and optimized testing conditions for each user.

The headset device 140D may be configured to integrate multiple vision testing methods, advanced neural monitoring, and real-time adaptive feedback into a single, secure, and interactive VR environment. This can significantly enhance the scope, accuracy, and user experience of vision assessments, improve individual diagnostic capabilities, and contribute to broader research efforts in understanding the complex interplay between neural activity and visual health. In some embodiments of the present disclosure, neural activities may be captured and used to determine user spontaneous responses to visual stimuli automatically and without user intervention, which is an efficient solution to provide reliable supplemental information that cannot be provided by the user's active responses to visual stimuli.

Figure 15:
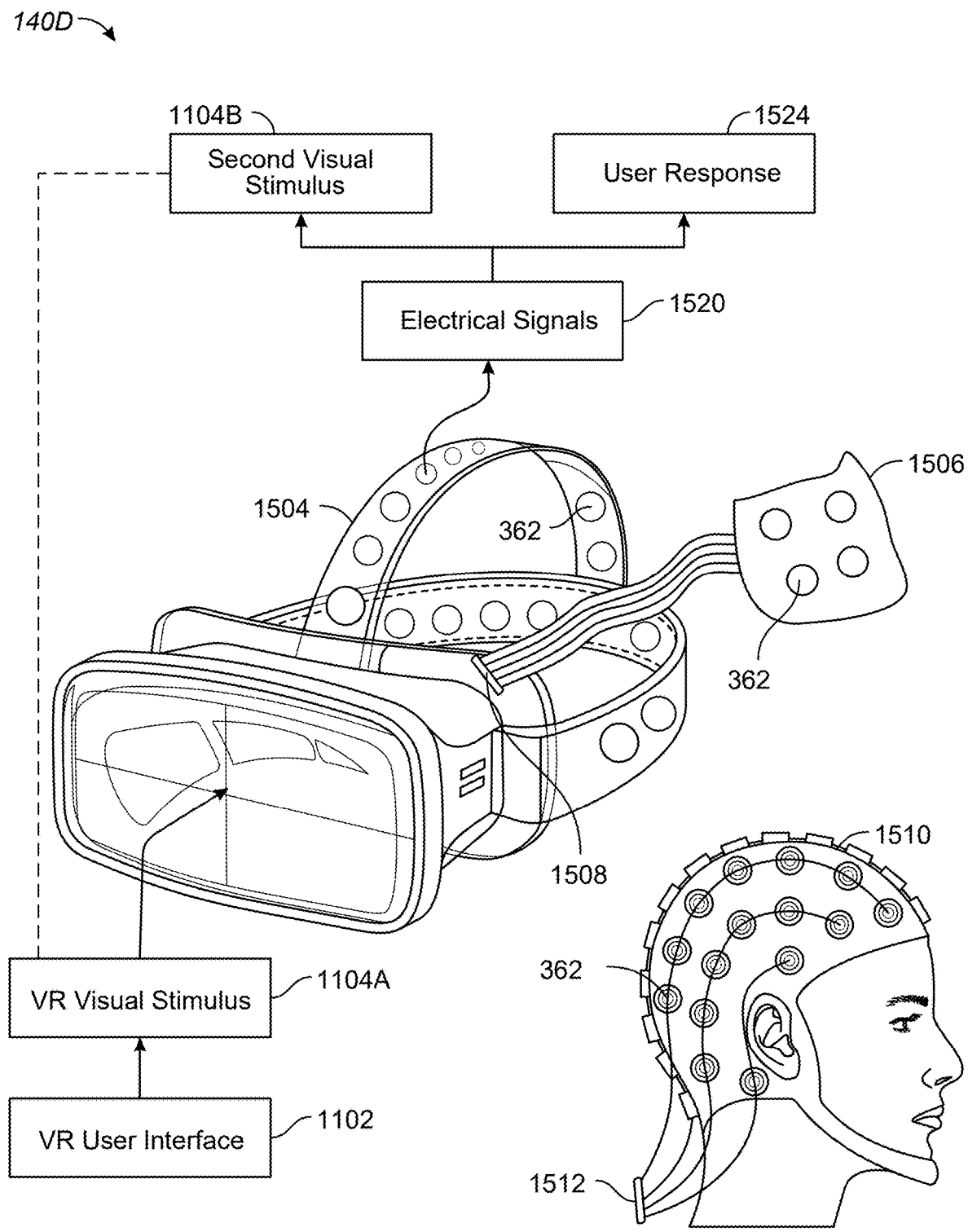
FIG. 15 is a diagram illustrating a headset device including a plurality of electrodes for measuring neural responses to visual stimuli, in accordance with some embodiments.

FIG. 15 is a diagram illustrating a headset device 140D including a plurality of electrodes for measuring neural responses to visual stimuli, in accordance with some embodiments. A computer device 140 (e.g., the headset device 140) may include one or more processors 302, memory 306 storing instructions to be implemented by the processor(s) 302, an HMD 312A, and one or more cameras 310A (e.g., outward camera 378, eye-tracking camera 366). The computer device 140 may execute a user application 324 (e.g., a visual assessment application 328) configured to enable a virtual vision test and generate a VR user interface 1102 corresponding to a 3D virtual environment. A first visual stimulus 1104A can correspond to the virtual vision test, and is displayed on the user interface 1102. The computer device 140 may include a plurality of electrodes 362. While displaying the first visual stimulus 1104A, in real time, the electrode device 200 can collect a plurality of electrical signals 1520 by the plurality of electrodes 362 that contact a head of a user of the computer device 140, and determine a second visual stimuli 1104B or a user response 1524 (e.g., spontaneous neural response) to the first visual stimulus 1104A based on the plurality of electrical signals 1520.

In some embodiments, the plurality of electrodes 362 may be integrated on one or more head straps 1504 of the computer device 140. The electrodes 362 integrated on the one or more head straps 1504 may be exposed to air, and when a user wears the computer device 140, the electrodes 362 come into contact with scalp of the head of the user. Alternatively, in some embodiments, the plurality of electrodes 362 may be integrated on an electrode pad 1506 electrically coupled to a body of the headset device 140D via a headset connector 1508. The electrode pad 1506 may be detachable from the body of the headset device 140D. Additionally, in some embodiments, the electrode pad 1506 may include a hat 1510 having an inner surface integrated with the plurality of electrodes 362. The electrodes 362 may be exposed to air via the inner surface of the hat 1510. When the user wears the computer device 140, the electrodes 362 may come into contact with scalp of the head of the user. The plurality of electrodes 362 of the hat 1510 may be coupled to an electrode connector 1512, which is configured to couple to the headset connector 1508, allowing the plurality of electrodes 362 to be controlled by the one or more processors 302 of the headset device 140D.

In some embodiments, the visual stimulus 1104A may include a visual pattern 700 (FIG. 7). The headset device 140D may monitor brain activity via electrodes 362 (also called EEG (electroencephalogram) sensors) when a user views the visual pattern 700. Changes in brain wave patterns can indicate how the user's brain processes the visual pattern 700 and identify any anomalies related to visual acuity, astigmatism, or both. The EEG sensors can help correlate visual distortions with specific brain activity patterns, understand cognitive aspects of visual impairments, and develop effective treatment strategies.

Figure 16:
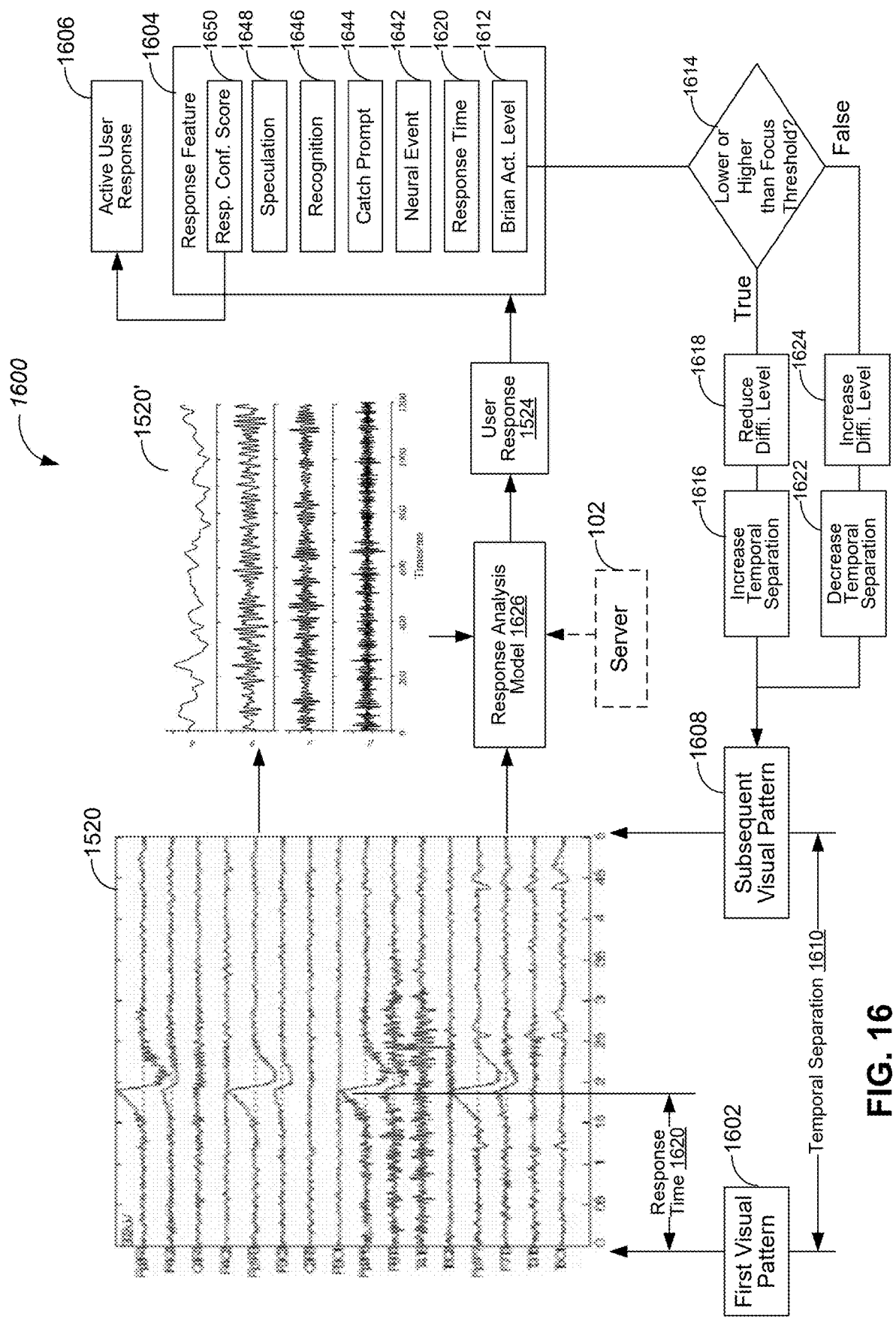
FIG. 16 is a diagram showing an example vision test system configured to facilitate a virtual vision test based on neural signals, in accordance with some embodiments.

FIG. 16 is a diagram showing an example vision test system 1600 configured to facilitate a virtual vision test based on neural signals, in accordance with some embodiments. The vision test system 1600 may include a computer device 140 (e.g., headset device 140D). The computer device 140 may further include one or more processors 302, memory 306 storing instructions to be implemented by the processor(s) 302, an HMD 312A, a plurality of electrodes 362. The computer device 140 may execute a user application (e.g., a visual assessment application 328) configured to enable the virtual vision test and generates a VR user interface 1102 corresponding to a 3D virtual environment. While displaying a first visual stimulus 1104A, in real time, the electrode device 200 may collect a plurality of electrical signals 1520 by the plurality of electrodes 362, and determine information of a next visual stimulus 1104N following the first visual stimulus 1104A or a user response 1524 to the first visual stimulus 1104A based on the plurality of electrical signals 1520.

In some embodiments, the plurality of electrodes 362 may be configured to form an electroencephalography (EEG) sensor system, and the plurality of electrical signals 1520 have a temporal resolution of milliseconds (ms). The plurality of electrodes may directly track the electrical activity of brain cells by measuring their effects on the electrical fields just outside the head of the user. In an example, each electrical signal 1520 collected by a respective electrode 362 may be sampled at a sampling rate at 1-10 KHz. Locations of the plurality of electrodes 362 may correspond to one or more regions of interest (ROI) in the brain.

In some embodiments, the first visual stimulus 1104A may include a first visual pattern 1602, and correspond to a temporal sequence of visual patterns. The virtual vision test may be one of a visual acuity test, a visual field test, a visual depth test, a color blindness test, a retinoscopy, a refraction test, an astigmatism test, and a contact lens exam. The first visual pattern 1602 may be selected from a plurality of predefined visual patterns to implement the virtual vision test, and be configured to be displayed with one or more adjustable display parameters 1314 (e.g., a display size, a spatial pitch, a temporal pitch, a contrast level, and a brightness level).

While displaying the first visual pattern 1602, the computer device 140 may determine a response feature 1604 of the user response 1524 to the first visual pattern 1602 based on the plurality of electrical signals 1520. In some embodiments, the response feature 1604 of the user response 1524 to the first visual stimulus 1104A may be determined based on the plurality of electrical signals 1520. The response feature 1604 may include one or more of: a brain activity level 1612, a response time 1620, whether each of one or more feature neural events 1642 occurs, whether the user catches a prompt 1644, or whether the user has a recognition 1646 or speculation 1648 about the first visual stimulus 1104A. The response feature 1604 may reflect a spontaneous neural response to the first visual pattern 1602. In some embodiments, based on the response feature 1604, a subsequent visual pattern 1608 immediately following the first visual pattern 1602 may be dynamically selected, and a next temporal separation 1610 may be determined to separate the first visual pattern 1602 and the subsequent visual pattern 1608. The subsequent visual pattern 1608 corresponds to the second visual stimulus 1104B Further, in some embodiments, the response feature may include a brain activity level 1612. In accordance with a determination (operation 1614) that the brain activity level 1612 is lower than a focus threshold, the next temporal separation 610 may be increased (operation 1616), giving more time to the user to respond, compared with a current temporal separation between the first visual pattern 1602 and a previous visual pattern (not shown in FIG. 16). Alternatively, in accordance with a determination (operation 1614) that the brain activity level 1612 is lower than the focus threshold, a difficulty level of the subsequent visual pattern 1608 may be reduced (operation 1618) compared with that of the first visual pattern 1602, e.g., using a simpler visual pattern 1608. Conversely, in some embodiments, in accordance with a determination (operation 1614) that the brain activity level 1612 is higher than the focus threshold, the next temporal separation 610 may be decreased (operation 1622) compared with a current temporal separation between the first visual pattern 1602 and a previous visual pattern (not shown in FIG. 16), shortening a length of time for the user to respond to the subsequent visual pattern 1608. Alternatively, in accordance with a determination (operation 1624) that the brain activity level 1612 is higher than the focus threshold, the difficulty level of the subsequent visual pattern 1608 may be increased (operation 1618) compared with that of the first visual pattern 1602, e.g., using more complicated visual pattern 1608.

In some embodiments, the response feature 1604 may include a response time 1620 determined based on the plurality of electrical signals 1520 measured by the plurality of electrodes 362 (e.g., not based on an active user response 1606). In accordance with a determination that the response time 1620 is greater than a response threshold, the next temporal separation 1610 may be increased compared with a current temporal separation between the first visual pattern 1602 and a previous visual pattern. Alternatively, in accordance with a determination that the response time 1620 is greater than a response threshold, a difficulty level of the subsequent visual pattern 1608 may be reduced compared with that of the first visual pattern 1602.

In some embodiments, the computer device 140 (e.g., a headset device 140D) may apply a response analysis model 1626 to process a subset of the plurality of electrical signals 1520, which is recorded immediately after a first visual pattern 1602, and determine the user response 1524 (e.g., including one or more of the response features 1604) to the first visual pattern 1602. In an example, the user response 1524 may include whether the user speculates about the first visual pattern 1602 (e.g., one of a recognition 1646 and a speculation 1648). Further, in some embodiments, the virtual vision test may include a color vision test, and the first visual pattern 1602 is applied in the color vision test to evaluates whether there are difficulties distinguishing between different colors. The user response 1524 to the color vision test may be automatically determined from the plurality of electrical signals 1520 without user intervention. Stated another way, the user response 1524 may include the user's uncontrollable and spontaneous response to the first visual pattern 1602.

In some embodiments, the plurality of electrical signals 1520 may be preprocessed before the response analysis model 1626 to process the subset of the plurality of electrical signals 1520. For example, the plurality of electrical signals 1520 may be denoised, down-sampled, smoothed, and/or scaled to generate modified electrical signals, which may be further provided as input to the response analysis model 1626. In some embodiments, the plurality of electrical signals 1520 may be converted to a plurality of brainwaves 1520' (e.g., Delta (±0 to 4 Hz), theta (4–8 Hz), alpha (8–13 Hz), and beta (13–20 Hz)), and the plurality of brainwaves 1520' may be further processed by the response analysis model 1626, e.g., for extracting one or more response features 1604.

In some embodiments, the user response 1524 may include an active user response 1606 sensed by an alternative sensor 360 (e.g., a camera, a microphone) distinct from the electrodes 362. Examples of the active user response include, but are not limited to, head nodding, a hand gesture, and a voice indicator. The active user response may indicate an optotype displayed on the user interface 1102 or confirm whether the user recognizes a visual pattern. The active user response 1606 to a first visual pattern may be collected using a microphone or a camera of the computer device 140. A response analysis model 1626 may be applied to process a subset of the plurality of electrical signals 1520, which is recorded immediately after the first visual pattern 1602. A confidence score associated with the active user response 1606 may be generated. In other words, in some embodiments, if the active user response 1606 matches the electrical signals 1520, the confidence score 1650 may be high (e.g., greater than 0.8 in a range of 0-1), and if the active user response 1606 does not match the electrical signals 1520, the confidence score 1650 may be reduced.

In some embodiments, the response analysis model 1626 may be received from a server 102 (FIG. 1) associated with the computer device 140. The response analysis model 1626 may be applied to process the plurality of electrical signals 1520, thereby determining information of at least one of the subsequent visual pattern 1608 or the user response 1524 to the first visual pattern 1602. Further, in some embodiments, before the response analysis model 1626 is applied, the server 102 may collect a plurality of historical visual stimuli and a collection of historical electrical signals that are associated with the plurality of historical visual stimuli, and train the response analysis model 1626 based on the plurality of historical visual stimuli and the collection of historical electrical signals. Additionally, in some embodiments, the plurality of historical visual stimuli and the collection of historical electrical signals may be communicated from a plurality of computer devices 140 (FIG. 1) to the server 102 in an encrypted format. After receiving the plurality of historical visual stimuli and the collection of historical electrical signals, the server 102 may decrypt the plurality of historical visual stimuli and the collection of historical electrical signals. More details on model training are explained above with reference to FIG. 4.

Innovations in Biometric Feedback

Some embodiments of the VR system may include interactive controls during vision tests to enhance personalized vision care. This VR system may allow users to adjust test parameters in real time through intuitive interactive controls. The VR system may include a headset device 140D equipped with a display and one or more sensors for tracking one or more of eye movement, head orientation, and hand gestures of a user wearing the headset device 140D. In some embodiments, the headset device 140D may be communicatively coupled to a server 102 configured to execute a server-side module for the vision assessment application 328, thereby managing the sequence of vision tests jointly with a device-side module of the vision assessment application 328 executed on the headset device. Users can interact with a 3D virtual environment via a variety of control schemes, such as voice commands, hand gestures, and eye movement, thereby dynamically modifying test parameters (e.g., a contrast level, a stimulus size, and a test speed). By these means, the VR system implements real-time adjustments of visual stimuli based on user comfort and response, may enable personalized, interactive, and adaptive testing experience by implementing, and enhances accuracy and effectiveness of vision tests.

In some embodiments, the VR system may collect comprehensive data on user interactions, including changes to test parameters and corresponding responses. Additionally, it employs a sophisticated biofeedback loop that monitors physiological responses such as heart rate variability, pupil dilation, and galvanic skin response. These physiological metrics may be integrated with alternative visual test results to provide a holistic view of the user's visual and cognitive state (e.g., eye health condition, neurological disorder).

In some embodiments, the vision assessment application 328 may be configured to implement the real-time adjustments made by users via processors of the VR system (e.g., including a headset device 140D and a server). Further, in some embodiments, the VR system may include a quantum co-processor configured to apply quantum computing principles to enhance a speed and accuracy of data processing. This quantum co-processor is particularly adept at handling complex and multidimensional datasets generated by the VR system, thereby improving sensitivity and precision of real-time adjustments of test parameters of the vision tests in the 3D virtual environment. Further, in some embodiments, data collected by different sensors (e.g., the above physiological responses) may be processed, using a machine learning model 350, a quantum computational model, or a combination thereof. The VR system is configured to identify patterns and anomalies that might be imperceptible through conventional methods, offering detailed insights into the user's visual performance and adaptability. The ability to adjust test parameters in real-time allows for the identification of subtle vision issues that might be missed in traditional static testing environments. Additionally, in some embodiments, the VR system supports secure, encrypted communication with a centralized vision health management platform, utilizing quantum encryption protocols to ensure data security. This platform aggregates data from numerous users, enabling large-scale analysis and research. The aggregated data can be cross-referenced with a global health databases to identify emerging trends and potential public health concerns.

Some implementations of the VR system may incorporate one or more of real-time interactive controls, quantum computing, biofeedback integration, and encryption. Such an VR system significantly may enhance customization, accuracy, and user engagement in vision assessments, and pushes boundaries of what is possible in the field of visual health diagnostics.

Figure 17:
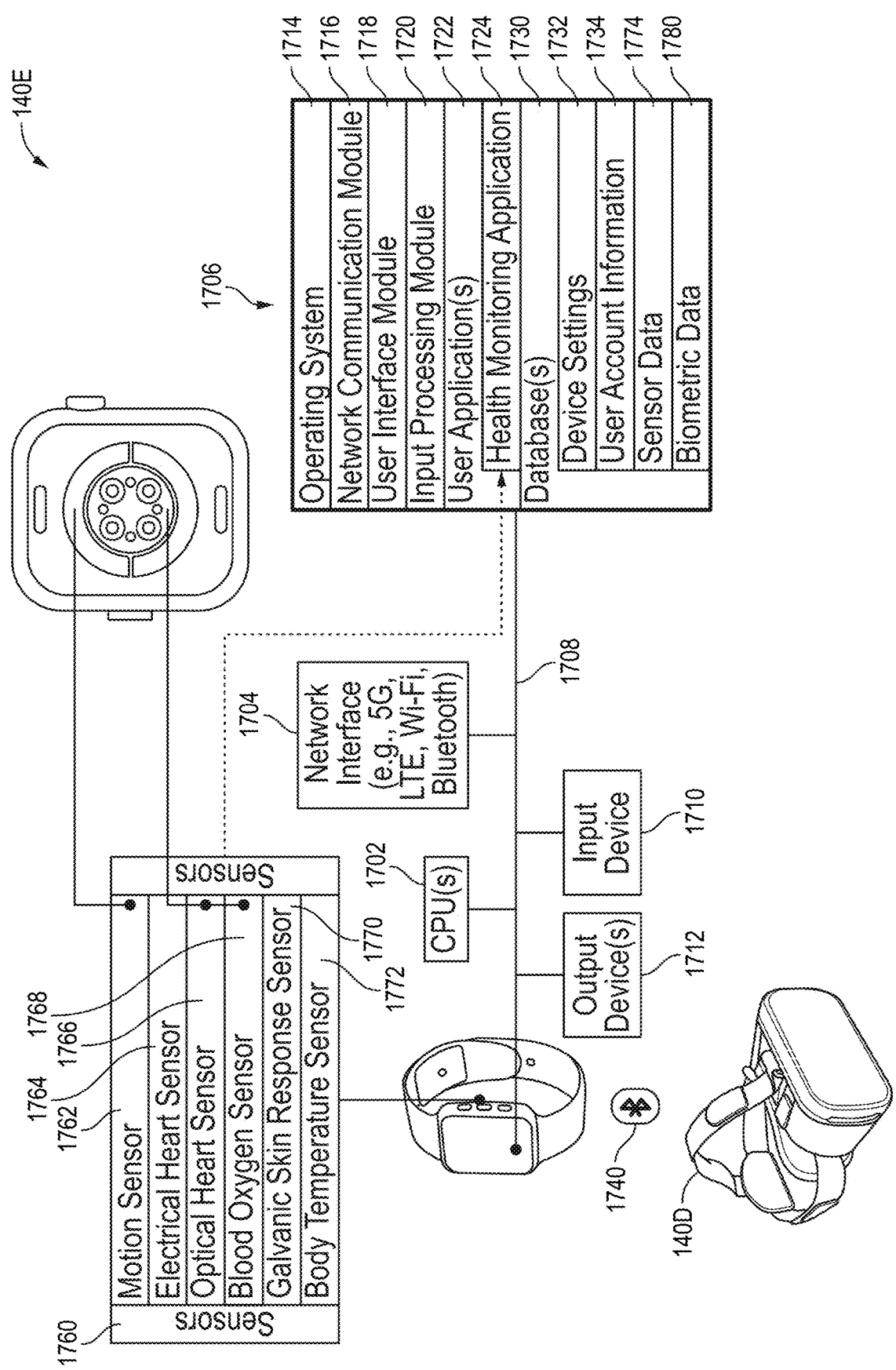
FIG. 17 is a block diagram of an example wearable device for facilitate a virtual vision test implemented on a headset device, in accordance with some embodiments.

FIG. 17 is a block diagram of an example wearable device 140E for facilitate a virtual vision test implemented on a headset device 140D, in accordance with some embodiments. The wearable device 140E may include one or more processing units (CPUs) 1702, one or more network interfaces 1704, memory 1706, and one or more communication buses 1708 for interconnecting these components (sometimes called a chipset). The wearable device 140E may include one or more input devices 1710 that facilitate user input, such as a microphone and a touch screen display. The wearable device 140E may also include one or more output devices 1712 that enable presentation of user interfaces 210 and display content. Examples of the output devices 1712 include, but are not limited to, one or more speakers and/or one or more visual displays.

The wearable device 140E may further include one or more sensors 1760, including one or more of: a motion sensor 1762, an electrical heart sensor 1764, an optical heart sensor 1766, a blood oxygen sensor 1768, a galvanic skin response sensor 1770, and a body temperature sensor 1772. The wearable device 140E may be configured to measure one or more sensing signals (e.g., corresponding to sensor data 1774) and generate a stream of biometric data 1780 based on the one or more sensing signals. In some embodiments, the wearable device 140E can establish a wireless communication link 1740 with the headset device 140D associated with a user of the wearable device 140E. The wireless communication link 1740 may communicate the stream of biometric data 1780 captured by the sensors 1760 using a short-range wireless protocol selected from Bluetooth, Wi-Fi, NearLink, near-field communication (NFC), LPWAN, ultra-wideband (UWB) and IEEE 802.15.

Memory 1706 may include high-speed random-access memory, such as DRAM, SRAM, DDR RAM, or other random-access solid state memory devices; and, optionally, may include non-volatile memory, such as one or more magnetic disk storage devices, one or more optical disk storage devices, one or more flash memory devices, or one or more other non-volatile solid state storage devices. Memory 1706, optionally, may include one or more storage devices remotely located from one or more processing units 1702. Memory 1706, or alternatively the non-volatile memory within memory 1706, may include a non-transitory computer readable storage medium. In some implementations, memory 1706, or the non-transitory computer readable storage medium of memory 1706, stores the following programs, modules, and data structures, or a subset or superset thereof:

- Operating system 1714 including procedures for handling various basic system services and for performing hardware dependent tasks;
- Network communication module 1716 for connecting each wearable device 140E to other devices (e.g., server 102, computer device 140, or storage 106) via one or more network interfaces 1704 (wired or wireless) and one or more communication networks 108, such as the Internet, other wide area networks, local area networks, metropolitan area networks, and so on;
- User interface module 1718 for enabling presentation of information (e.g., a graphical user interface for application(s) 1724, widgets, websites and web pages thereof, and/or games, audio and/or video content, text, etc.) at each wearable device 140E via one or more output devices 1712 (e.g., displays, speakers, etc.);
- Input processing module 1720 for detecting one or more user inputs or interactions from one of the one or more input devices 1710 and interpreting the detected input or interaction;
- One or more user applications 1722 for execution by the wearable device 140E, where in some embodiments, a health monitoring application 1724 may be executed to provide health data (e.g., oxygen level, heart rate, body temperature) or associated data (e.g., walking steps, running speed) to a headset device 140D; and
- One or more databases 1730 for storing at least data including one or more of:
  - Device settings 1732 including common device settings (e.g., service tier, device model, storage capacity, processing capabilities, communication capabilities, etc.) of the wearable device 140E;
  - User account information 1734 for the one or more user applications 1722, e.g., user names, security questions, account history data, user preferences, and predefined account settings;
  - Sensor data 1774 generated from electrical signals generated by the sensors 1760; and
  - Biometric data 1780 that are generated from the sensor data 1774 and indicate a health condition of the user wearing the wearable device 140E and the headset device 140D.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise rearranged in some embodiments. In some embodiments, memory 1706, optionally, stores a subset of the modules and data structures identified above. Furthermore, memory 306, optionally, stores additional modules and data structures not described above.

Figure 18:
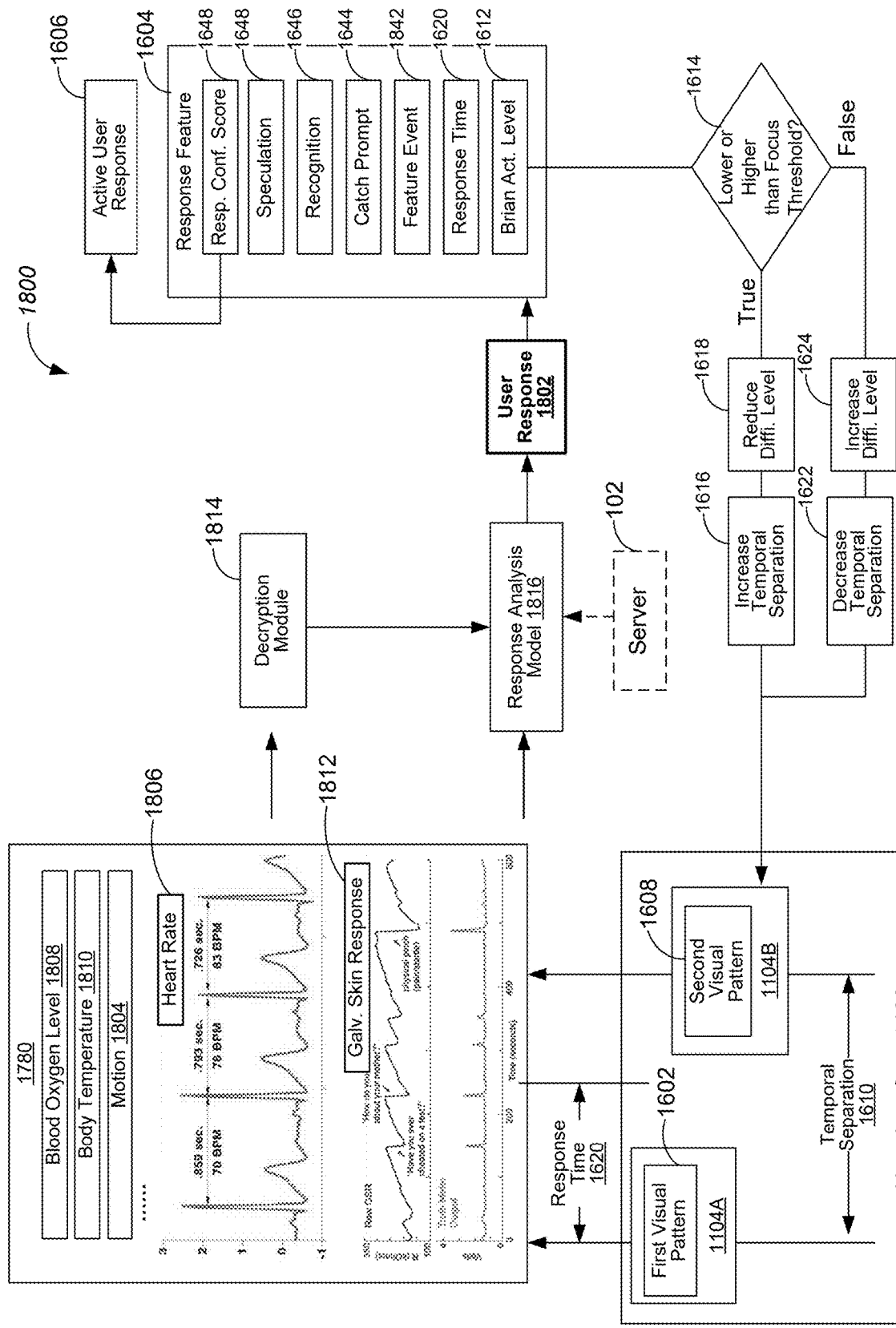
FIG. 18 is a diagram showing a vision test system including a headset device and a wearable device, in accordance with some embodiments.

FIG. 18 is a diagram showing a vision test system 1800 including a headset device 140D and a wearable device 140E, in accordance with some embodiments. The vision test system 1800 may include a computer device 140 (e.g., headset device 140D), which further may include one or more processors 302, memory 306 storing instructions to be implemented by the processor(s) 302, and an HMD 312A. The computer device 140 may execute a user application (e.g., a visual assessment application 328) configured to enable the virtual vision test and generate a VR user interface 1102 corresponding to a 3D virtual environment. A user interface 1102 may be rendered, on the HMD 312A, and may include a first visual stimulus 1104A corresponding to the virtual vision test. The computer device 140 establishes a wireless communication link 1740 with a wearable device 140E (FIG. 17) associated with a user of the computer device 140. While displaying a first visual stimulus 1104A, in real time, the electrode device 200 may collect a stream of biometric data 1780 from the wearable device 140E via the wireless communication link 1740. The computer device 140 may determine a second visual stimulus 1104B following the first visual stimulus 1104A and a user response 1802 to the first visual stimulus 1104A based on the stream of biometric data 1780.

In some the wearable device 140E may include one or more of: a motion sensor 1762, an electrical heart sensor 1764, an optical heart sensor 1766, a blood oxygen sensor 1768, a galvanic skin response (GSR) sensor 1770, and a body temperature sensor 1772. The wearable device may be configured to measure one or more sensing signals and generate the stream of biometric data 1780 based on the one or more sensing signals. In an example, a motion level 1804 of the user may be determined from sensor data 1774 provided by the motion sensor 1762, and exceed a motion threshold, which indicates that the user experiences an elevation of a stress level. In another example, a hear rate 1806 measured by the electrical heart sensor 1764 and/or the optical heart sensor 1766 may exceed a threshold level indicating that the user experiences an elevation of a stress level. In another example, a blood oxygen level 1808 or a body temperature level 1810 may be measured to indicate the user response 1802. In some embodiments, the GSR sensor 1770 may measure a skin response 1812 including a varying level of skin conducting the electric current. Higher levels of perspiration on the skin can lead to a greater conductance of electrical currents. A higher level of conductivity of the skin after an event can therefore be interpreted as either positive or negative emotional arousal. The stress level or the positive or negative emotional arousal can be associated with an ongoing vision test session and used to determine the second visual stimulus 1104B following the first visual stimulus 1104A and/or the user response 1802 to the first visual stimulus 1104A. Stated another way, in some embodiments, the stream of biometric data 1780 may provide a spontaneous response to the first visual stimulus 1104A, and the user response 1802 may include the spontaneous response generated based on the stream of biometric data 1780.

In some embodiments, the wireless communication link 1740 communicates the stream of biometric data 1780 in an encrypted format, thereby protecting the biometric data 1780 from a tampering attempt. After receiving the stream of biometric data 1780, the computer device 140 (e.g., a decryption module 1814) may decrypt the stream of biometric data 1780.

In some embodiments, the first visual stimulus 1104A may correspond to a temporal sequence of visual patterns, and include a first visual pattern 1602. While displaying the first visual pattern 1602, the computer device 140 may determine a response feature 1604 of the user response to the first visual pattern 1602 based on the stream of biometric data 1780. Based on the response feature 1604, the computer device 140 may dynamically select a subsequent visual pattern 1608 immediately following the first visual pattern 1602, and determine next temporal separation 1610 between the first visual pattern 1602 and the subsequent visual pattern 1608. The subsequent visual pattern 1608 corresponds to the second visual stimulus 1104B.

Further, in some embodiments, the computer device 140 may determine a focus level (e.g., corresponding to a brain activity level 1612) based on the stream of biometric data 1780. In accordance with a determination that the focus level is lower than a focus threshold, the next temporal separation 1610 may be increased (operation 1616) compared with a current temporal separation (not shown) between the first visual pattern 1602 and a previous visual pattern, and alternatively, a difficulty level of the subsequent visual pattern 1608 may be reduced (operation 1618) compared with that of the first visual pattern 1602.

In some embodiments, the response feature 1604 may include a response time 1620. In accordance with a determination that the response time 1620 is greater than a response threshold, the next temporal separation 1610 may be increased compared with a current temporal separation between the first visual pattern 1602 and a previous visual pattern, and alternatively, a difficulty level of the subsequent visual pattern 1608 may be reduced compared with that of the first visual pattern 1602.

Also, in some embodiments, the virtual vision test may be one of a visual acuity test, a visual field test, a visual depth test, a color blindness test, a retinoscopy, a refraction test, an astigmatism test, and a contact lens exam. The first visual pattern 1602 may be selected from a plurality of predefined visual patterns to implement the virtual vision tests and configured to be displayed with one or more adjustable display parameters (e.g., a display size, a spatial pitch, a temporal pitch, a contrast level, and a brightness level).

In some embodiments, while displaying a first visual pattern 1602, the computer device 140 may determine a response feature 1604 of the user response to the first visual stimulus 1104A based on the stream of biometric data 1780. The response feature 1604 may include one or more of: a motion level, a stress level, whether each of one or more feature events 1842 occurs, whether the user catches a prompt 1644, and whether the user has a recognition 1646 or speculation 1648 about the first visual stimulus 1104A.

In some embodiments, a response analysis model 1816 may be applied to process a subset of the stream of biometric data 1780, which is recorded immediately after a first visual pattern 1602, an determine the user response to the first visual pattern 1602. The user response includes or indicates whether the user speculates about the first visual pattern 1602. Further, in some embodiments, the virtual vision test may include a color vision test, and the first visual pattern 1602 may be applied in the color vision test to evaluates whether there are difficulties distinguishing between different colors. The user response to the color vision test may be automatically determined from the stream of biometric data 1780. Additionally, in some embodiments, the computer device 140 may collect the active user response 1606 to a first visual pattern 1602 using a microphone or a camera of the computer device 140, and apply a response analysis model 1816 to process a subset of the stream of biometric data 1780, which is recorded immediately after the first visual pattern 1602. The computer device 140 may compare spontaneous and active user responses and generate a confidence score 1650 associated with the user response 1524.

In some embodiments, the computer device 140 may obtain a response analysis model 1816 from a server 102 associated with the computer device 140, and apply the response analysis model 1816 to process the stream of biometric data 1780, thereby determining the information of at least one of the first visual stimulus 1104A or the user response 1802 to the first visual stimulus 1104A. Further, in some embodiments, before applying the response analysis model 1816, the server 102 may collect a plurality of historical visual stimuli and a collection of historical biometric data that are associated with the plurality of historical visual stimuli, and train the response analysis model 1816 based on the plurality of historical visual stimuli and the collection of historical biometric data.

Some implementations of the vision test system 1800 may apply the response analysis model 1816 to determine the response feature 1604 substantially similar to those determined by the response analysis model 1626 of the vision test system 1600 (FIG. 16). More details on the response feature 1604 and associated control of subsequent visual stimuli are explained above with reference to FIG. 16.

Innovations in Biophotonic Sensors

Development of a fully immersive VR environment specifically designed for comprehensive vision testing represents a major innovation in the field of ophthalmology. The present application describes embodiments related to a VR-based system that may provide an all-encompassing visual experience to conduct a wide array of vision tests. This system may include a VR headset with high-resolution displays and advanced sensors capable of capturing detailed eye movements and head orientation. The VR headset may be connected to a powerful computer device running specialized vision test software. The immersive VR environment may simulate various visual scenarios and test conditions, such as different lighting, contrast levels, and dynamic visual stimuli, allowing for thorough and precise assessments of visual acuity, color vision, depth perception, and peripheral vision. By creating a controlled and interactive testing environment, the system may ensure that each vision test is conducted under optimal conditions tailored to the individual user's needs.

The computer device integrated with the VR system may be equipped with multiple processors and extensive memory to run the comprehensive vision test software and process the data collected within the immersive environment. The system may include a bio-photonic sensor array embedded in the VR headset, capable of detecting subtle changes in retinal blood flow and oxygenation levels during visual tasks. This biophotonic data may be synchronized with traditional metrics such as eye movements, reaction times, accuracy of visual tasks, and other critical parameters, creating a multi-layered dataset.

Advanced algorithms, including hybrid quantum-classical machine learning techniques, may be applied to analyze this rich dataset. The system may use a quantum neural network to correlate bio-photonic data with visual performance, providing unprecedented insights into the user's visual capabilities and potential impairments. This nuanced analysis can reveal early signs of retinal diseases and neurodegenerative conditions that traditional methods might miss.

The immersive VR environment may also support secure data transmission to a centralized vision health management platform through encrypted quantum communication channels. This platform aggregates data from multiple users, facilitating large-scale analysis and research into vision health trends. The platform employs a distributed ledger technology to ensure data integrity and traceability, allowing for secure and transparent data sharing among authorized researchers and healthcare providers.

By offering a fully immersive and interactive environment, coupled with advanced bio-photonic sensing and quantum-enhanced data analysis, the disclosed VR system may enhance the accuracy, engagement, and effectiveness of vision testing. This innovative approach may provide a superior alternative to traditional methods, enabling early detection of complex visual and neurological conditions and contributing to a more comprehensive understanding of vision health.

Figure 19:
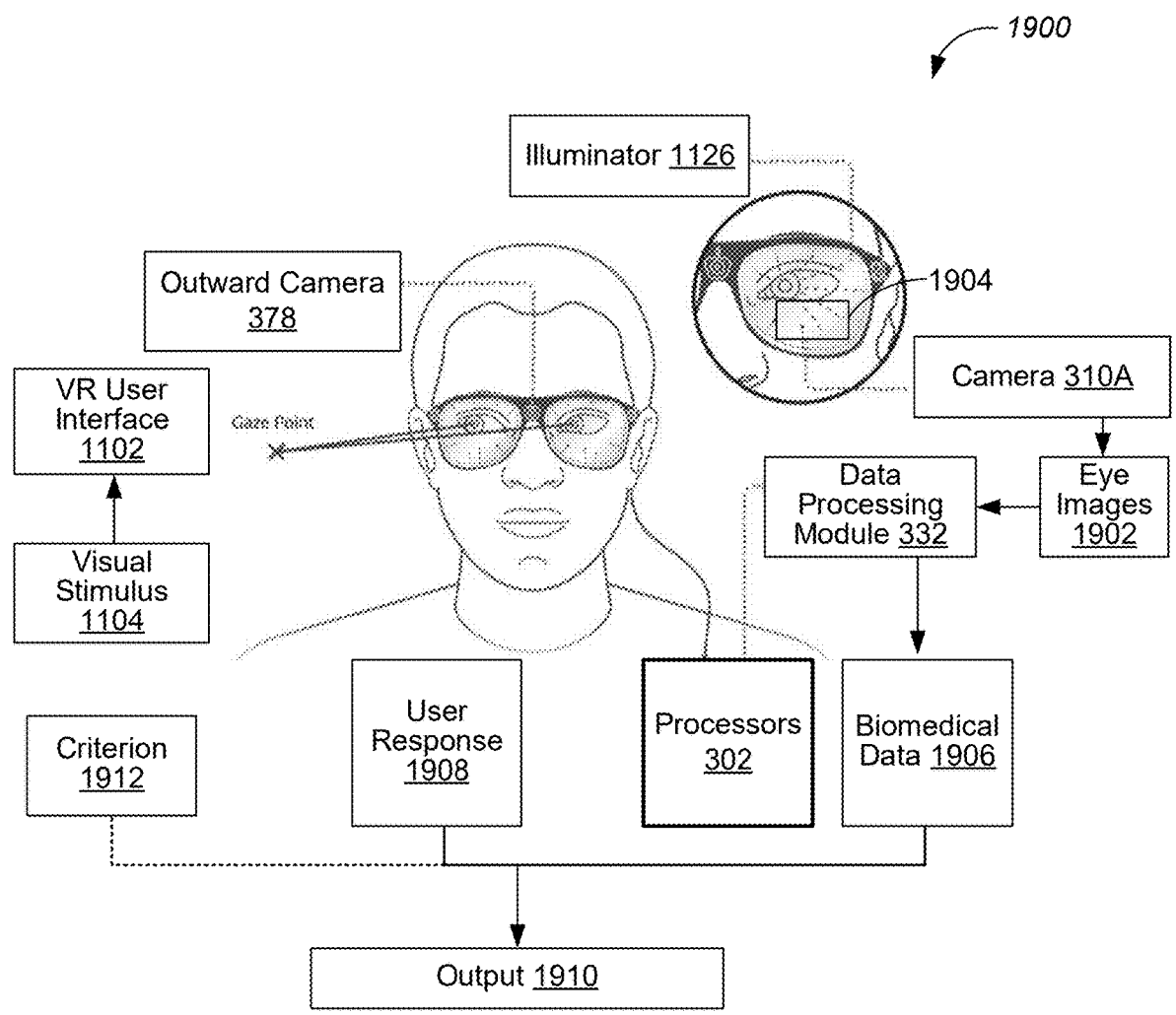
FIG. 19 is a diagram showing a vision test system configured to implement a virtual vision test based on biophotonic sensor data, in accordance with some embodiments.

FIG. 19 is a diagram showing a vision test system 1900 configured to implement a virtual vision test based on biophotonic sensor data, in accordance with some embodiments. The vision test system 1900 may be implemented using a computer device 140 (e.g., headset device 140D), which may include one or more processors 302, memory 306 storing instructions to be implemented by the processor(s) 302, an HMD 312A, and a camera 310A. The computer device 140 may execute a user application (e.g., a visual assessment application 328) configured to enable the virtual vision test and generates a VR user interface 1102 corresponding to a 3D virtual environment. A visual stimulus 1104 may correspond to the virtual vision test, and be displayed on the user interface 1102. The computer device 140 can direct the camera 310A to an eye area of a user wearing the computer device 140. While displaying the visual stimulus 1104, in real time, the camera 310A may capture a sequence of eye images 1902. Each eye image may include 1106 a respective region of interest (ROI) 1904 corresponding to an eyelid of the user. The computer device 140 can extract biomedical data 1906 from the sequence of eye images 1902.

After obtaining a user response 1908 to the visual stimulus 1104, the computer device 140 may generate an output 1910 based on the user response 1908 and the biomedical data 1906. The output 1910 indicates at least whether the user response 1908 satisfies a criterion 1912. In some embodiments, the user response 1908 may include an active user response sensed by an alternative sensor 360 (e.g., an outward camera 378, a microphone 380). Examples of the active user response include, but are not limited to, head nodding, a hand gesture, and a voice indicator. The active user response indicates an optotype displayed on the user interface 1102 or confirms whether the user recognizes a visual pattern.

In some embodiments, the computer device 140 may further include an illuminator 1126 configured to illuminate an eye area covered by the computer device 140 and facilitate capturing the eye images 1106 by the eye-tracking camera 366. Further, in some embodiments, the illuminator 1126 may include a near-infrared or infrared diode configured to illuminate the eye area with near-infrared or infrared light. The camera 310 may include a near-infrared sensor array or an infrared sensor array 370 (FIG. 3).

In some embodiments, the eye images 1902 captured by the camera 310A of the computer device 140 may also be used to determine eyeball movement data that is representative of an eye position 1110 (FIG. 19). Based on the eyeball movement data, the visual stimulus 1104 and the eye movement information 1108 may be used to determine an eye health condition 1114 or an eyeball movement disorder 1116.

In some embodiments, the visual stimulus 1104 may include a visual pattern 700 (FIG. 7), and may be applied in the vision test system 1800 or 1900. Blood oxygen levels, heart rate, and galvanic skin response (GSR) can be used to monitor physiological responses while a user viewing the visual pattern 700. The physiological responses indicate stress or discomfort caused by visual strain. By analyzing these responses, the visual pattern 700 can be used to detect visual impairments and understand associated impact on overall eye well-being and stress levels.

Figure 20:
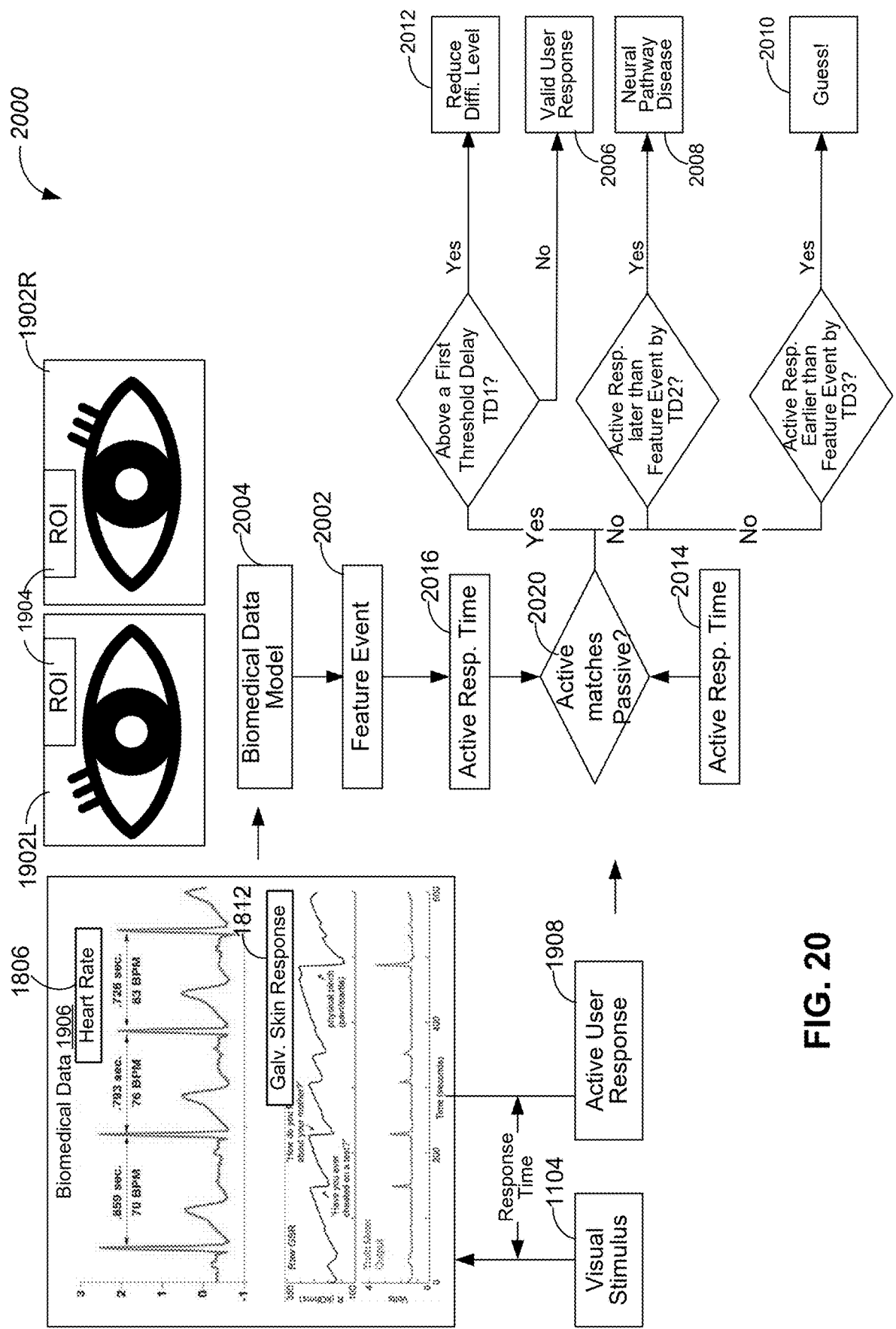
FIG. 20 is a flow diagram of an example method of monitoring a condition of an eye area for vision test, in accordance with some embodiments.

FIG. 20 is a flow diagram of an example method 2000 of monitoring a condition of an eye area for vision test, in accordance with some embodiments. The computer device 140 may execute a user application (e.g., a visual assessment application 328) configured to enable the virtual vision test and generates a VR user interface 1102 (FIG. 19) corresponding to a 3D virtual environment. A visual stimulus 1104 (FIG. 19) corresponds to the virtual vision test, and is displayed on the user interface 1102. The computer device 140 may direct the camera 310A to an eye area of a user wearing the computer device 140. While displaying the visual stimulus, in real time, the camera 310A of the computer device 140 may capture a sequence of eye images 1902 each of which may include a respective ROI 1904 corresponding to a subset of the eye area of the user (e.g., an eyelid). Biomedical data 1906 may be extracted from the sequence of eye images 1902 (specifically, from the ROIs 1904 thereof). After obtaining a user response 1908 to the visual stimulus 1104, the computer device 140 may generate an output 1910 indicating at least whether the user response 1908 satisfies a criterion 1912.

In some embodiments, for each of the sequence of eye images 1902, the computer device 140 may crop the respective eye image 1902 to generate a left eye image 1902L and/or a right eye image 1902R including a respective eye of the user based on a predefined aspect ratio. After cropping, a resolution of the respective eye image 1902 is adjusted to a predefined resolution. Each of the left and right eye images 1902 may include a respective ROI 1904. In some embodiments, the eye images 1902 may be captured in a near-infrared or infrared domain, and processed to the biomedical data 1906 indicating one or more of a heart rate, a galvanic skin response (GSR), and an oxygen level. Stated another way, the biomedical data 1906 may indicate a stress level of the user while the virtual vision test is implemented, and therefore, can be used to determine user spontaneous responses to visual stimuli automatically and without user intervention, which is an efficient solution to provide reliable supplemental information that cannot be provided by the user's active response (e.g., user response 1908) to the visual stimuli.

In some embodiments, a feature event 2002 may be extracted in response to the visual stimulus 1104 based on the biomedical data 1906. Further, in some embodiments, the biomedical data 1906 may include a temporal sequence of heart rate data or a temporal sequence of blood oxygen levels. The feature event 2002 may correspond to the heart rate exceeding a threshold rate or the blood oxygen level dropping below a blood oxygen threshold. In some embodiments, a biomedical data model 2004 may be applied to process the biomedical data 1906 and identify the feature event 2002. The biomedical data model 2004 may be provided by a server 102 after the model 2004 is trained at the server 102. Additionally, in some embodiments, the user response 1908 and the feature event 2002 detected in the biomedical data may have delays from the visual stimulus 1104. The delays may be compared with a first threshold delay, so may the delays be compared to each other (operation 2020) to determine whether active and passive responses match each other.

In some embodiments, the delays may be below a first threshold delay TD1, and the user response 1908 and the biomedical data 1906 match each other. It may be determined that the user response 1908 satisfies the criterion 1912, thereby corresponding to a valid user response 2006. Alternatively, in some embodiments, the user response 1908 may be delayed from the feature event 2002 of the biomedical data 1906 beyond a second threshold delay TD2. It may be determined that the user has a neural pathway disease 2008. The output 1910 may be generated to indicate the neural pathway disease, and the user response 1908 does not satisfy the criterion 1912. Alternatively, in some embodiments, the feature event 2002 of the biomedical data 1906 may be delayed from the user response 1908 beyond a third threshold delay TD3. It may be determined that the user response 1908 is not reliable, and the output 1910 may be generated to indicate that the user response 1908 does not satisfy the criterion 1912 (e.g., is a guess 2010).

Alternatively, in some embodiments, the user response 1908 and the feature event 2002 of the biomedical data 1906 have delays from the visual stimulus 1104, and the delays from the visual stimulus may be above the first threshold delay TD1. It may be determined that the user response 1908 does not satisfy the criterion 1912, and the output 1910 may include a message indicating that the user needs a break or a message requesting reduction of a difficulty level 2012 of the vision test. An instruction may be automatically generated based on the message requesting reduction of a difficulty level of the vision test to adjust one or more subsequent visual stimuli immediately following the visual stimulus 1104.

In some embodiments, the computer device 140 may generate the output 908 by determining an active response time 2014 of the user response 1908 with respect to the visual stimulus 1104 and a passive response time 2016 with respect to the visual stimulus based on the biomedical data. The active response time 2014 and the passive response time 2016 may be compared to generate the output 1910.

Innovations in Dynamic Adjustment of Eye Test Sequences

A VR platform may integrate eye health assessments with interactive storytelling and visual quests, and represent a significant advancement in vision care. The present application may describe embodiments related to a VR-based system designed to evaluate eye health through engaging and immersive experiences. This system may include a VR headset equipped with high-resolution displays and advanced sensors that track eye movements, focus, and response times. The VR headset may connect to a computer device 140 running specialized software that generates interactive stories and visual quests. These narratives and quests may be configured to subtly incorporate vision tests, such as visual acuity, color differentiation, depth perception, and peripheral vision assessments. By embedding these tests within captivating stories and challenges, the platform can enhance user engagement and ensure a comprehensive evaluation of visual function in a manner that is both entertaining and informative.

The computer device 140 integrated with the VR system can house multiple processors and memory modules to execute the interactive storytelling software and process the extensive data collected during the visual quests. The system may include an integrated neuro-ophthalmic interface, capable of measuring cortical responses to visual stimuli using embedded electroencephalogram (EEG) sensors within the VR headset. This neuro-ophthalmic data may be synchronized with detailed metrics on eye movements, visual response accuracy, and interaction patterns within the VR environment, resulting in a multi-faceted dataset that provides a deeper understanding of visual processing.

Advanced data analysis algorithms, including hybrid quantum-classical machine learning techniques, may be employed to interpret this rich dataset. The system may utilize a quantum cognitive model to correlate neuro-ophthalmic responses with visual performance metrics, offering unprecedented insights into the user's eye health and neurological function. This analysis can detect early signs of complex conditions such as amblyopia, glaucoma, and even neurodegenerative diseases that traditional methods might overlook.

The platform can identify specific visual impairments and tracks changes over time, offering valuable information for healthcare providers. Furthermore, the VR platform may ensure secure and encrypted communication with a centralized eye health management system, utilizing blockchain technology to maintain the integrity and confidentiality of the data. This system can aggregate data from numerous users, facilitating large-scale research and analysis, and enabling the creation of a comprehensive visual health database.

By combining eye health assessments with interactive storytelling, visual quests, and neuro-ophthalmic monitoring, the disclosed VR platform significantly can enhance the accuracy, engagement, and overall effectiveness of vision testing. This approach may transform vision assessments into an enjoyable and accessible process for users of all ages, while providing critical insights for early diagnosis and ongoing management of visual and neurological health.

In some embodiments, the present disclosure describes a customized VR entry experience designed to adapt vision testing based on preliminary user inputs, thereby providing a tailored and efficient diagnostic process. This system may leverage a virtual reality headset equipped with high-resolution displays and advanced optical sensors, which gather preliminary data such as age, medical history, and initial visual responses through a user-friendly interface. Upon entering the VR environment, users may be prompted to provide these preliminary inputs, which may be then processed by an AI-driven system. This system can analyze the inputs to customize the sequence and parameters of subsequent vision tests, ensuring they are optimally suited to the user's specific visual profile and needs. The customization may extend to adjusting the difficulty level, the type of tests presented, and the visual stimuli used, thereby enhancing both the accuracy and user experience of the vision testing process. The VR headset may include an intuitive user interface that prompts users to input essential preliminary information, such as age, medical history, current vision issues, and initial responses to basic visual stimuli. This interface is designed to be accessible and easy to navigate, ensuring that users can provide accurate information without difficulty.

In some embodiments, an AI module can process the preliminary inputs to generate a customized vision testing plan. This involves analyzing the data to determine the user's specific needs and tailoring the vision tests accordingly. For instance, the AI might decide to focus more on color vision tests if the preliminary inputs indicate potential color blindness, or adjust the difficulty level of visual acuity tests based on the user's initial responses.

In some embodiments, the vision tests within the VR environment may be dynamically adjusted in real-time based on the user's interactions and responses. This may include modifying the type, sequence, and complexity of tests, as well as the visual stimuli presented. The system may ensure that each test is appropriately challenging and relevant to the user's specific visual profile, thereby improving diagnostic accuracy.

In some embodiments, the system may integrate data from the preliminary inputs and subsequent vision tests into a cloud-based platform. This platform may utilize machine learning algorithms to refine the customization process continuously. By learning from each user interaction, the AI module can enhance the accuracy and effectiveness of the vision tests over time. Additionally, this cloud-based approach can allow healthcare professionals to access and analyze the data remotely, facilitating comprehensive diagnostics and follow-up care.

Figure 21:
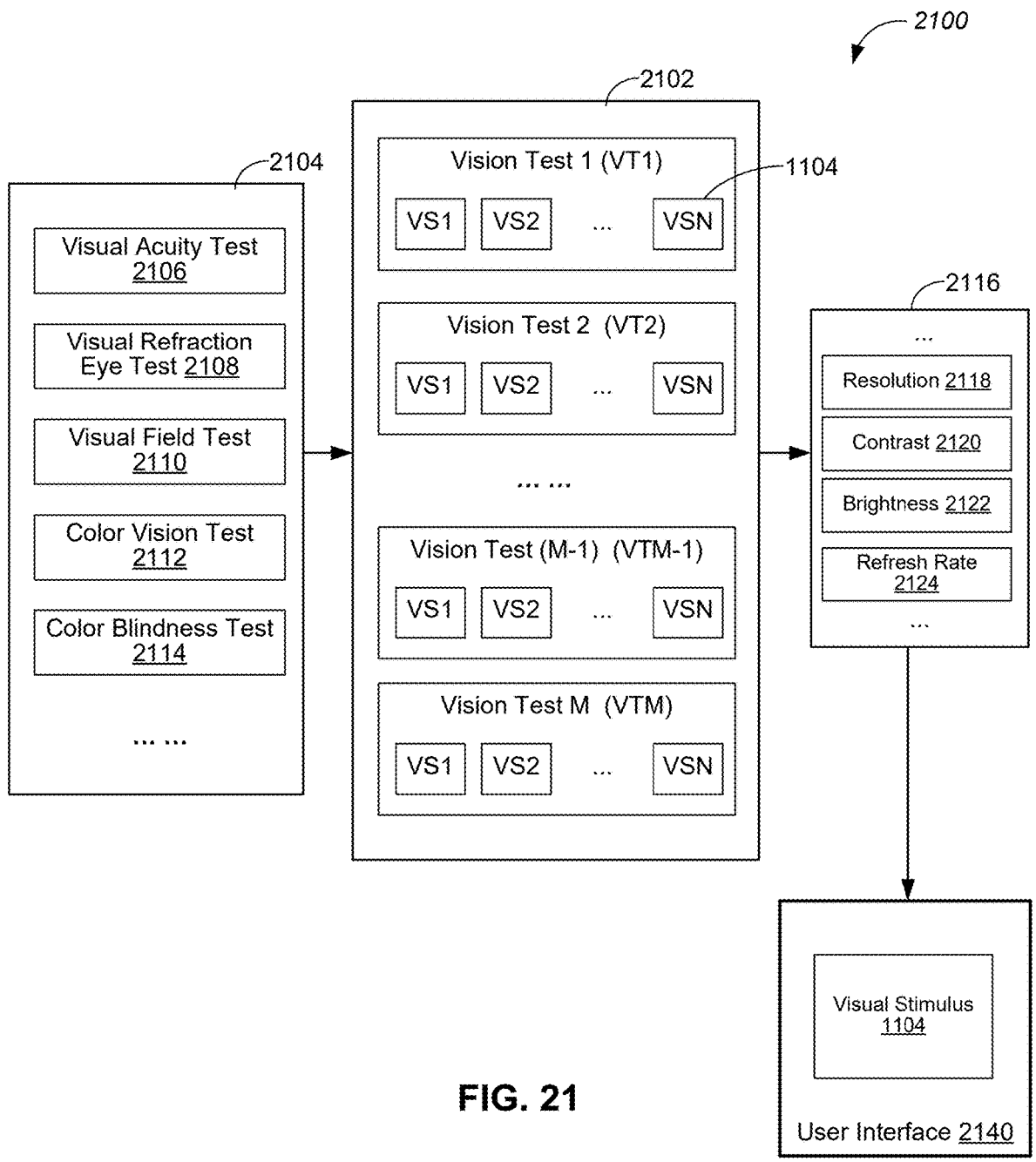
FIG. 21 is a diagram showing an example hierarchical structure of a vision test scheme applied in a virtual vision test, in accordance with some embodiments.

FIG. 21 is a diagram showing an example hierarchical structure 2100 of a vision test scheme applied in a virtual vision test, in accordance with some embodiments. A vision test scheme may include a temporally ordered sequence of vision tests 2102. Each of the vision tests 2102 may be selected from a plurality of predefined vision tests 2104. Examples of the predefined vision tests 2104 include, but are not limited to, a visual acuity test 2106, a visual refraction vision test 2108, a visual field test 2110, a color vision test 2112, and a color blindness test 2114. In an example, the vision tests 2102 include vision tests VT1, VT2, . . . , VTM-1, and VTM, which may be successively applied. In an example, each of the vision tests VT1, VT2, . . . , VTM-1, and VTM may be distinct from any of a remainder test in the sequence of vision tests 2102. In another example, two of the vision tests VT1, VT2, . . . , VTM-1, and VTM may correspond to the same vision test type (e.g., an visual acuity test 2106).

Each vision test 2102 further may include one or more visual stimuli 1104 (e.g., VS1, VS2, . . . , and VSN). For example, a first vision test VT1 may be a visual acuity test 2106, and the visual stimuli 1104 may include a sequence of optotypes that may be successively displayed. Each visual stimulus 1104 may be presented on a user interface 2140 with a plurality of display parameters 2116. Examples of the display parameters 2116 include, but are not limited to, a display size, a resolution 2118, a contrast level 2120, a brightness level 2122, a spatial pitch, a temporal pitch (e.g., corresponding to a refresh rate 2124), and a background style.

FIG. 22 is a flow diagram of an example method 2200 of dynamically adjusting vision tests, in accordance with some embodiments. A computer device 140 (e.g., a headset device 140D, a desktop computer, a laptop computer 1402A) may include a display, one or more processors, and memory. The computer device 140 may execute a user application (e.g., a visual assessment application) configured to enable the virtual vision test, and generates a user interface 2140. The computer system may obtain historical vision data 2202 (e.g., summaries of previous visits to an optician's office) of a patient user associated with the computer device 140. Based on the historical vision data, an ordered sequence of vision tests 2102 may be determined and may include a first vision test 2102A for the patient user. The first vision test 2102A (VTA) may be followed by a set of one or more subsequent vision tests 2102S (e.g., VTB, VTC) of the ordered sequence of vision tests 2102. Each of the first vision test 2102A or subsequent vision test(s) 2102S may include one or more visual stimuli 1104. The computer device 140 enables the ordered sequence of vision tests 2102 on the user interface 2140. More specifically, the computer device 140 may display, on the user interface 2140, a first visual stimulus 1104A (VSA) corresponding to the first vision test 2102A (VTA). A user response 2204 to the first vision test 2102A (VTA) (e.g., to the first visual stimulus 1104A) may be obtained. The computer device 140 may dynamically adjust a set of one or more subsequent visual stimuli 1104S (e.g., a subsequent visual stimulus 1104B in the vision test VTA, those in vision tests VTB, VTC) based on the user response 2204 to the first visual stimulus 1104A. In some embodiments, the user response 2204 to the first visual stimulus 1104A may be applied jointly with one or more additional user responses to dynamically adjust the set of one or more subsequent visual stimuli 1104S.

In some embodiments, the computer device 140 may include a headset device 140D, and the display for presenting the sequence of vision tests 2102 may include an HMD. The user interface 2140 may include a VR user interface corresponding to a 3D virtual environment, and he ordered sequence of vision tests 2102 may be rendered in the 3D virtual environment.

In some embodiments, the computer device 140 may dynamically adjust the set of one or more subsequent visual stimuli 1104S by adjusting at least one of a total number (e.g., 1, 2, or more) or an order of the set of one or more subsequent visual stimuli 1104S. More specifically, in some embodiments, based on the user response 2204, the computer device 140 may bypass a first one (e.g., VSB) of the set of one or more subsequent visual stimuli 1104S, add an alternative visual stimuli 1104C (VSC) or vision test 2102C (VTD) to the set of one or more subsequent visual stimuli 1104S, shorten a length of a second one (e.g., VTC) of the set of one or more subsequent vision tests 2102S, extend a length of a third one (e.g., VTC) of the set of one or more subsequent vision tests 2102S, advance a fourth one of the set of one or more subsequent visual stimuli 1104S, postpone a fifth one of the set of one or more subsequent visual stimuli 1104S, or swap two (e.g., VTB and VTC) of the set of one or more subsequent vision tests 2102S.

In some embodiments, the computer device 140 may determine a length, content, a temporal separation, and a display parameter 2116 (FIG. 21) of at least one subsequent vision test 2102S (e.g., VTB). Further, in some embodiments, the display parameter 2116 is one of: a resolution 2118, a display size, a spatial pitch, a temporal pitch (e.g., corresponding to a refresh rate 2124), a contrast level 2120, and a brightness level 2122 of a visual stimulus (e.g., an optotype, a visual pattern) associated with the at least one subsequent vision test 2102S.

In some embodiments, the computer device 140 may determine a difficulty level 2206 associated with the set of one or more subsequent visual stimuli 1104S, and adjust the difficulty level 2206 based on the user response 2204. Based on the adjusted difficulty level 2206, one of a plurality of predefined vision tests 2104 may be selected to be rendered on the user interface 2140 for the patient user. In some embodiments, the computer device 140 may adjust the difficulty level 2206 based on the user response 2204. Based on the adjusted difficulty level 2206, one or more visual stimuli 1104 may be selected from a plurality of predefined visual stimuli for display on the user interface 2140 for the patient user.

In some embodiments, the first vision test 2102A may include both the first visual stimulus 1104 (VSA) and the set of one or more subsequent visual stimuli 1104S (e.g., including only visual stimuli (e.g., VSB) in the first vision test 2102A). The user response 2204 may be obtained after the first visual stimulus 1104A is displayed. The set of one or more subsequent visual stimuli 1104B may be dynamically adjusted based on the user response 2204 to the first visual stimulus 1104A. Stated another way, subsequent visual stimuli may be dynamically adjusted based on the user response 2204 to the first visual stimulus 1104A internally within the first vision test 2102A. Alternatively, in some embodiments, the set of one or more subsequent visual stimuli 1104S may include at least one visual stimulus 1104 that is located in at least one vision test 2102 (e.g., VTB, VTC) distinct from the first vision test 2102A. The user response 2204 to the first visual stimulus 1104A can therefore be applied to adjust one or more subsequent visual stimuli 1104S in a different subsequent vision test 2102S. Alternatively, in some embodiments, the set of one or more subsequent visual stimuli 1104S may include two visual stimuli that may be located in the first vision test 2102A and an another vision test distinct from the first vision test 2102A, respectively. The user response 2204 to the first visual stimulus 1104A may therefore be applied to adjust subsequent visual stimuli 1104S in both the first vision test 2102A and a different subsequent vision test 2102S.

More specifically, in some embodiments, each of one or more subsequent visual stimuli 1104S may include a visual pattern. The visual pattern can be displayed with a temporal separation from an immediately preceding visual pattern or an immediately subsequent visual pattern. The content, the temporal separation, or a display parameter of at least one subsequent visual stimulus 1104S can be adjusted based on the user response 2204 to the first visual stimulus 1104A.

In some embodiments, the historical vision data 2202 of the patient user may be a document including a medical history 2208 of the patient user. The computer device 140 extracts one or more key words 2210 concerning an eye health condition of the patient user from the document, and selects the ordered sequence of vision tests 2102 from a plurality of predefined sequences of vision tests 2212 based on the one or more key words 2210. Each predefined sequence of vision tests 2212 may include a respective ordered sequence of predefined vision tests 2104. The computer system further may determine one or more respective visual stimulus 1104 of each vision test 2102. For example, the first vision test 2102A may include at least the visual stimuli 1104A and 1104B.

In some embodiments, the computer device 140 may determine the ordered sequence of vision tests 2102 by applying a medical information processing model 2214 to process the historical vision data 2202 and select the ordered sequence of vision tests 2102 from a plurality of predefined sequences of vision tests 2212. The medical information processing model 2214 may be received from, and trained by, a server 102 (FIG. 1) communicatively coupled to the computer device 140.

In some embodiments, the computer device 140 may present to the patient user a plurality of prompts 2216 and obtain a plurality of user answers 2218 to the plurality of prompts 2216, e.g., when the patient user checks into an optician's office. The ordered sequence of vision tests 2102 may be determined based on both the historical vision data 2202 and the plurality of user answers 2218. For example, the medical information processing model 2214 may be applied to process both the historical vision data 2202 and the user answers 2218 for generating the sequence of vision tests 2102. In some embodiments, the medical information processing model 2214 may include a language model configured to process natural language inputs corresponding to the historical vision data 2202 and the user answers 2218.

Innovations in Eye Deficiency Compensation

Some embodiments of the present disclosure may be directed to interactive learning about eye health through guided VR documentaries, incurring a significant advancement in educational and healthcare technologies. A VR-based system may be configured to educate users about eye health by immersing them in guided VR documentaries. This system may include a VR headset equipped with high-resolution displays and advanced sensors that track eye movements and head orientation. The VR headset may be connected to a computer device running specialized software that presents guided documentaries on various aspects of eye health, including anatomy, common vision disorders, preventive care, and treatment options. These documentaries may be interactive, allowing users to engage with the content by selecting topics of interest, answering quiz questions, and participating in visual demonstrations that enhance their understanding of eye health. By offering a captivating and educational experience, the VR method may ensure that users gain valuable knowledge about maintaining and improving their eye health.

A computer device integrated with the VR system may include multiple processors and memory modules to execute a guided documentary software and process user interactions. In some embodiments, the computer device may incorporate a biometric feedback mechanism configured to monitor physiological parameters, such as pupil dilation, heart rate variability, and galvanic skin response, in real time. These biometric signals, captured through sensors embedded in the VR headset, may provide additional layers of data on the user's engagement and emotional response to the educational content.

In some embodiments, data collected by the computer device 140 may include detailed records of user engagement, responses to quiz questions, interaction patterns within the VR environment, and biometric feedback. Advanced analysis algorithms, including hybrid quantum-classical machine learning techniques, may be applied to this rich dataset. For instance, the computer device 140 may leverage a quantum-enhanced adaptive learning model to dynamically adjust the documentary content based on real-time biometric and interaction data, providing highly personalized feedback and recommendations tailored to the user's learning progress and specific eye health concerns.

The VR documentaries may be configured to adapt to the user's knowledge level, learning pace, and emotional state, ensuring an individualized and immersive educational experience. Additionally, the system may support secure, encrypted communication with a centralized eye health education platform, utilizing quantum encryption protocols to ensure data security and privacy. This platform may aggregate data from multiple users, facilitating large-scale analysis and research into eye health education trends and the effectiveness of various educational strategies.

By combining interactive learning with guided VR documentaries, biometric feedback, and quantum-enhanced adaptive learning, the disclosed VR method significantly enhances the accessibility, engagement, and effectiveness of eye health education. This innovative approach transforms the learning experience into a dynamic and emotionally responsive journey, making it an invaluable tool for users of all ages and providing critical insights for educators and healthcare providers.

FIG. 23 is a diagram illustrating an example process 2300 of dynamically adjusting display of media content based on a visual deficiency of a user, in accordance with some embodiments. A computer device 140 (e.g., a headset device 140D, a desktop computer, a laptop computer 1402A) may include a display (e.g., HDD 312A in FIG. 3), one or more processors, and memory. The computer device 140 may obtain the media content 2302 to be rendered on the display and information of a visual deficiency 2304 of a user associated with the display (e.g., a user wearing the headset device 140D). Based on the information of the visual deficiency 2304 of the user, the media content 2302 may be compensated, e.g., by a data processing module 332 (FIG. 3), to generate compensated media content 2306 that is further rendered on the display for the user. In some embodiments, one or more display parameters 2116 (e.g., a resolution 2118, a contrast level 2120, a brightness level 2122, a refresh rate 2124, gamma compensation) of the display of the computer device 140 may be adjusted to compensate the media content 2302. By these means, display of the media content 2302 may be customized for the user to adapt to the user's visual deficiency, thereby enhancing image quality that can be provided by the computer device 140.

In some embodiments, the computer device 140 may render a sequence of visual stimuli 1104 on a user interface 1102, and obtain a plurality of user responses 2308 to the sequence of visual stimuli 1104. The visual deficiency of the user may be determined based on the plurality of user responses 2308. Stated another way, the computer device 140 may implement a virtual vision test to obtain the information of the user's visual deficiency 2304. In an example, the visual pattern 700 (FIG. 7) is applied to determine visual acuity and astigmatism for a particular user before the media content is compensated for this user.

In some embodiments, the visual deficiency compensated by the computer device 140 may include a color vision deficiency 2310 corresponding to a difficulty in telling a difference among a plurality of colors. The plurality of colors in the media content 2302 may be adjusted based on the visual deficiency of the user, thereby generating the compensated media content 2306. In an example, the color vision deficiency 2310 may include a red-green color blindness, and the information of the visual deficiency 2304 may include a severity level of insensitivity to a difference between red and green colors. A color shade of at least one of the red or green colors may be adjusted to generate the compensated media content 2306. In some embodiments, a green area may be displayed with flickering on a background red color that cannot be differentiated from the green area by the user's eyes. In some embodiments, a red area may be displayed with flickering on a background green color that cannot be differentiated from the red area by the user's eyes. In some embodiments, a brightness level of at least one of the red or green colors may be adjusted to generate the compensated media content 2306. A variation of the color shade or the brightness level may be determined based on the severity level of insensitivity to the difference between red and green colors. Alternatively, in some embodiments, other types of the color vision deficiency 2310 may be adjusted based on a severity level of color insensitivity associated with a corresponding type of color vision deficiency 2310.

In some embodiments, the display of the computer device 140 may include an HMD, and a user interface 2312 may include a VR user interface corresponding to a 3D virtual environment. The compensated media content 2306 may be rendered on the user interface 2312 and in the 3D virtual environment.

In some embodiments, the computer device 140 may obtain a document including a medical history 2208 of the user, and extracts the information of the visual deficiency 2304 of the user from the document. In an example, the document may include the user's eye prescription. In another example, the document may include summaries of the user's previous visits to an optician's office. Further, in some embodiments, the computer device 140 may extract the information of the visual deficiency 2304 by applying a medical information processing model 2314 to process the medical history 2208. The information of the visual deficiency 2304 may include at least a type and a severity level of the visual deficiency of the user. Additionally, in some embodiments, the computer device 140 may obtain the medical information processing model from a server 102 associated with the computer device 140, after the medical information processing model is trained on the server 102.

Advanced display technologies can be used to compensate for detected visual impairments. Real-time display compensation can provide immediate visual relief and improve the user's viewing experience. It can be particularly useful in VR or AR environments where precise visual accuracy is crucial.

Figure 24A:
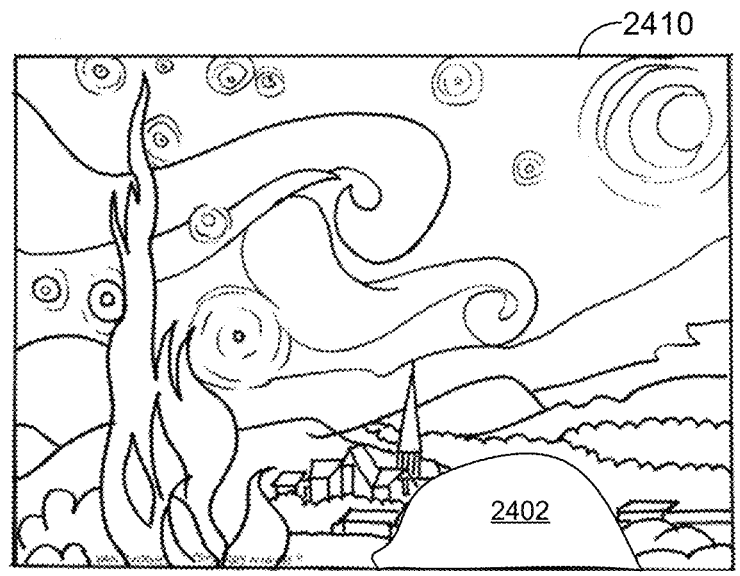
FIG. 24A is an example image perceived by a user who has a visual field impairment.
Figure 24B:
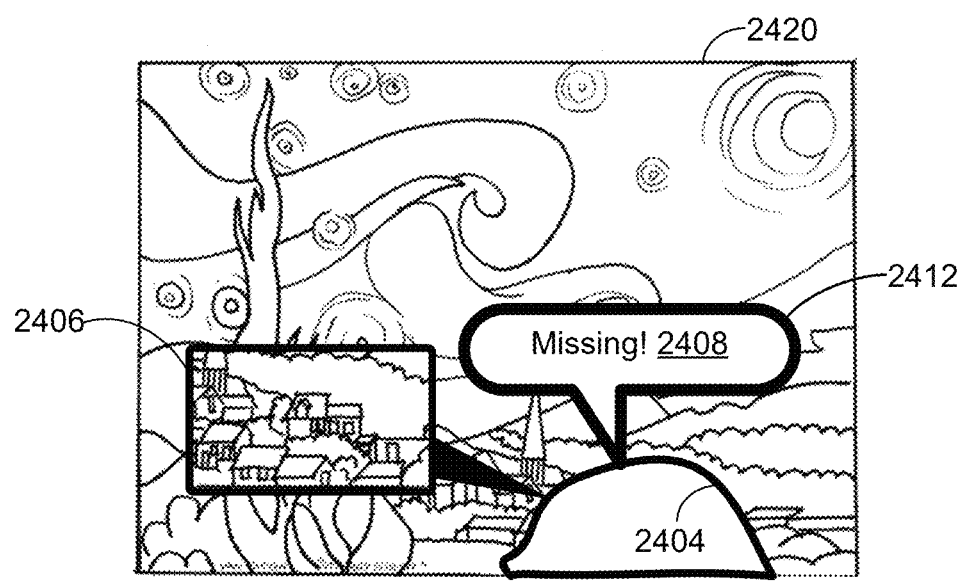
FIG. 24B is an example image including compensated media content for the user, in accordance with some embodiments.

FIG. 24A is an example image 2410 perceived by a user who has a visual field impairment, in accordance with some embodiments, and FIG. 24B is an example image 2420 including compensated media content 2306 for the user, in accordance with some embodiments. The visual deficiency of the user may include a vision field impairment. The information of the visual deficiency 2304 may identify a first location 2402 of the vision field impairment. For example, referring to FIG. 24A, the first location 2402 may be located near a bottom edge of a visual field of the user's eye. In some embodiments, referring to FIG. 24B, a display of the computer device 140 may display a mark identifying the first location 2402 of the vision field impairment. For example, the mark 2404 may include a highlighted edge of an area losing a sight at the first location 2402 of the vision field impairment.

In some embodiments, the mark 2404 may correspond to a subset of missing media content corresponding to the first location 2402 of the vision field impairment. The subset of missing media content may be displayed in a distinct location. For example, an overlay window 2406 may be displayed to present the compensated media content 2306 (FIG. 23). The subset of missing media content may be moved to be displayed in the overlay window 2406. In some embodiments, the mark 2404 may correspond to a message 2408, which is displayed within a speech bubble 2412, indicating that part of the media content 2302 corresponding to the first location 2402 is missing.

Figure 25A:
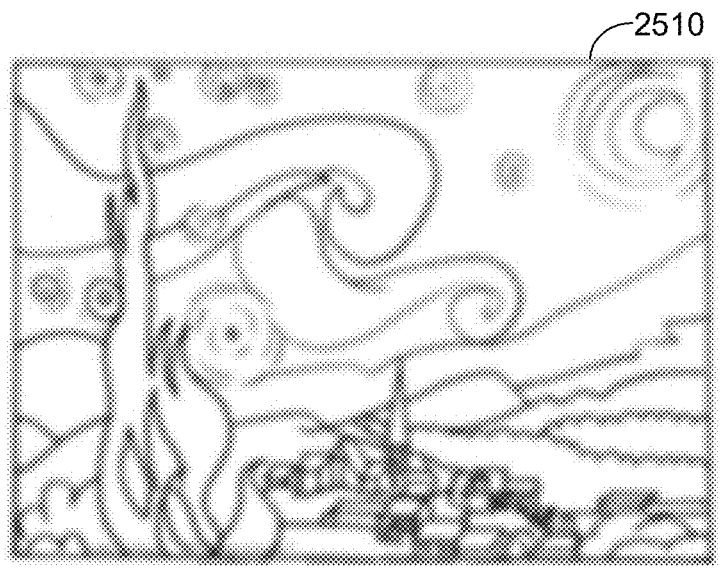
FIG. 25A is an example image perceived by a user having nearsightedness, in accordance with some embodiments.
Figure 25B:
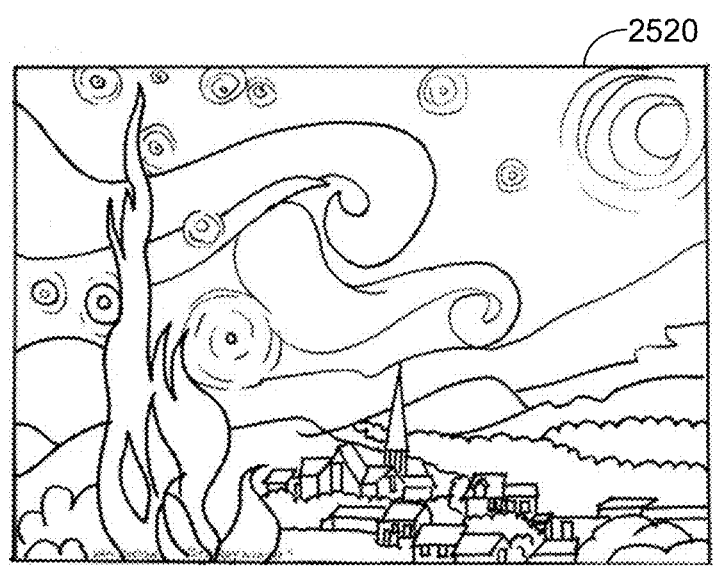
FIG. 25B is an example image including compensated media content for the user, in accordance with some embodiments.

FIG. 25A is an example image 2510 perceived by a user having nearsightedness, in accordance with some embodiments, and FIG. 25B is an example image 2520 including compensated media content 2306 for the user, in accordance with some embodiments. The image 2510 may be displayed with a resolution that allows sufficient details. The nearsightedness of the user make the image 2510 may appear blurry in the user's eyes, causing inconvenience to the user, particularly when the user wears the headset device 140D. Based on the information of the nearsightedness of the user (e.g., measured in Diopters), the image 2510 may be compensated, such that the image 2520 including the compensated media content 2306 may be perceived by the user's eyes with a sufficient level of details.

In some embodiments, as a result of nearsighted ness, the visual deficiency may include a visual acuity level that is lower than a visual acuity threshold. In accordance with a determination that the visual acuity level that is lower than the visual acuity threshold, the media content 2302 (FIG. 23) may be compensated and rendered as the image 2520, allowing the user to review the media content 2302 without wearing a correction eyewear and with an updated acuity level that is greater than the visual acuity threshold.

1. Voice—Guided Vision Tests in Virtual Environments

Some implementations of this application may include a VR-based method that incorporates audio instructions to facilitate comprehensive vision testing processes. An electronic device may be equipped with HMDs and optical sensors, enabling a wide array of vision tests (e.g., tests for visual acuity, color vision, depth perception, and contrast sensitivity) to be conducted in an immersive and virtual environment. The electronic device may integrate real-time eye-tracking technology which may utilize sensors (e.g., a camera 366) to monitor ocular metrics associated with eye movement, pupil dilation, and retinal responses. In some embodiments, machine learning may be applied to generate audio instructions dynamically based on a user's response and provide clear and personalized guidance throughout a vision test process. By these means, a voice-guided vision test implemented in a virtual environment may offer a portable and user-friendly solution that can be used in various settings (e.g., clinics, private homes) remotely while satisfying requirements of specialized equipment and professional supervision.

In some embodiments, an electronic device includes an HMD and one or more sensors. The HMD may have a resolution greater than a resolution threshold. For example, the resolution of the HMD is 8K (e.g., 7680×4320). In some embodiments, the electronic device has an optical sensor (e.g., a camera 366 in FIG. 3) configured for capturing eye images having ocular metrics. These sensors may provide real-time data on eye movement, pupil dilation, and retinal responses, and the real-time data may be applied to adjust visual stimuli presented during the vision test.

In some embodiments, the electronic device includes a data processing module 330 (FIG. 3) that may apply one or more machine learning models 350 to process data collected by one or more sensors 360 and adjust a sequence of vision tests accordingly. In some embodiments, the data processing module 330 may employ natural language processing (NLP) to generate context-sensitive audio instructions that guide a user through each of the vision tests. Voice guidance is dynamically adjusted based on the user's response, ensuring that the audio instructions are clear and satisfy the user's needs.

In some embodiments, the electronic device having the HMD may incorporate adaptive optics technology that adjusts a focus and display parameters of a display in real time. This ensures that the visual stimuli remain sharp and clear and may be used to correct a visual aberration (e.g., astigmatism, high order visual deficiency) detected during the vision tests.

In some embodiments, the electronic device is coupled on a cloud-based platform that may store and analyze data collected during the vision tests jointly with the electronic device. Machine learning is implemented on a server to improve accuracy and reliability of the vision tests based on a vast dataset of user interactions. For example, machine learning models applied by the electronic device may be trained by the server based on historic data. Additionally, in some embodiments, the cloud-based approach may enable remote diagnostics and allows healthcare professionals to access and analyze test results from any location, thereby extending the reach of quality vision care.

Figure 26:
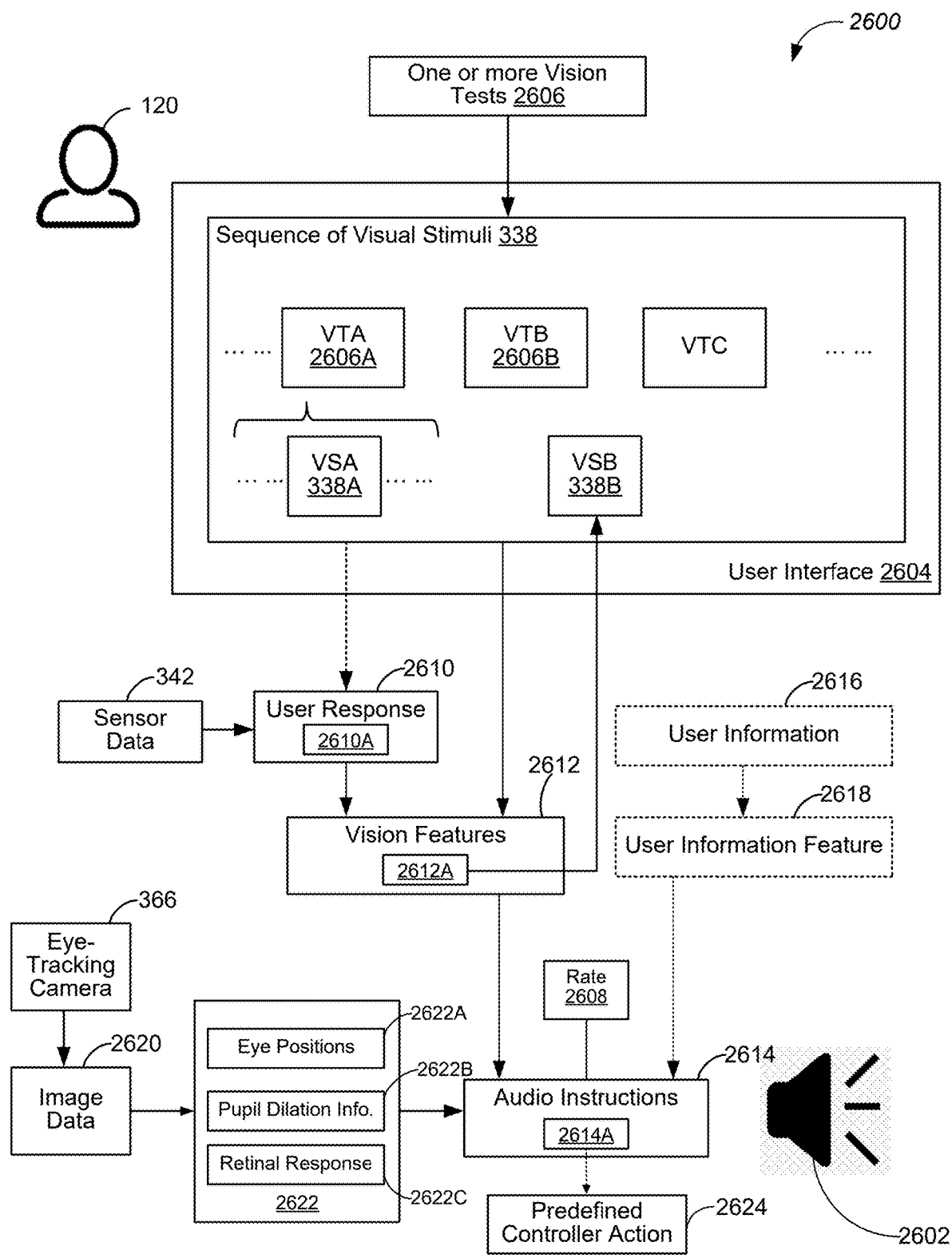
FIG. 26 is a flow diagram of an example process of implementing a voice-guided vision test, in accordance with some embodiments.

FIG. 26 is a flow diagram of an example process 2600 of implementing a voice-guided vision test 2606, in accordance with some embodiments. The process 2600 may be implemented using a computer device 104 (e.g., headset device 104D), which may include one or more processors 302 and memory 306 (FIG. 3) storing instructions to be implemented by the processor(s) 302. The computer device 104 may include a display (e.g., a head-mounted display (HMD) 312A, a two-dimensional (2D) display), one or more sensors 360 (FIG. 3), and a speaker 2602. The computer device 104 may execute a user application (e.g., a visual assessment application 328) configured to generate a VR user interface 2604 corresponding to a 3D virtual environment and enable one or more virtual vision tests 2606 via the VR user interface 2604. A sequence of visual stimuli 338 may correspond to the one or more virtual vision tests 2606 and be displayed on the user interface 2604 successively. Each virtual vision test 2606 may include a subset of respective visual stimuli 338.

The computer device 104 may present on the display a temporal sequence of visual stimuli 338. While the temporal sequence of visual stimuli 338 is displayed, in real time, the computer device 104 may obtain a stream of sensor data 342 captured by the one or more sensors 360. Each respective visual stimulus 338 corresponds to a subset of sensor data 342 indicating a user response 2610 to the respective visual stimulus 338, i.e., the subset of sensor data 342 is captured while the respective visual stimulus 338 is being displayed. The computer device 104 may generate a plurality of vision features 2612 based on the temporal sequence of visual stimuli 338 and the stream of sensor data 342. The computer device 104 may adaptively generate a sequence of audio instructions 2614 based on the plurality of vision features 2612. Each respective audio instruction 2614 corresponds to a subset of respective vision features 2612. The speaker 2602 may play the sequence of audio instructions 2614 successively to guide a user 120 associated with the display during the virtual vision tests 2606.

In some embodiments, the computer device 104 may obtain user information 2616 of the user 120 and extract a user information feature 2618 from the user information 2616. The sequence of audio instructions 2614 may be generated based on the user information feature 2618. Further, in some embodiments, each respective audio instruction 2614 is generated based on the subset of respective vision features 2612 and the user information feature 2618. In some embodiments, each respective audio instruction 2614 may have a respective language type, a respective speech rate, and a respective complexity level.

In some embodiments, the one or more sensors 360 (FIG. 3) may include one or more of: an eye tracking camera 366, a heart rate sensor, a body temperature sensor, a blood oxygen level, a Galvanic skin response sensor, a hand gesture camera (e.g., camera 378), a body gesture camera (e.g., camera 378), a microphone 380, a motion sensor 376, and a set of one or more brain activity electrodes 362.

In some embodiments, the plurality of vision features 2612 includes a first subset of vision features 2612A associated with a first visual stimulus 338A, and a second visual stimulus 338B is subsequent to the first visual stimulus 338A. While generating a first audio instruction 2614A associated with the first visual stimulus 338A based on the first subset of vision features 2612A, determining the second visual stimulus 338B based on the first subset of vision features 2612A. In some embodiments, the second visual stimulus 338B immediately follows the first visual stimulus 338A. Alternatively, in some embodiments, the second visual stimulus 338B follows, and is separated by one or more visual stimuli 338 from, the first visual stimulus 338A. In some embodiments, the first visual stimulus 338A and the second visual stimulus 338B belong to the same vision test 2606 (e.g., a vision test 2606A corresponding to a color deficiency test). Alternatively, in some embodiments, the first visual stimulus 338A and the second visual stimulus 338B belong to two distinct vision tests 2606 (e.g., a first vision test 2606A corresponding to a visual acuity test and a second vision test 2606B corresponding to an astigmatism test), respectively.

In some embodiments, while presenting on the display a temporal sequence of visual stimuli 338, in real time, an eye-tracking camera 366 (FIG. 3) of the computer device 104 may capture a stream of image data 2620. Each respective visual stimulus 338 corresponds to a subset of image data 2620 indicating a user's spontaneous response 2622 to the respective visual stimulus 338. Stated another way, the subset of image data 2620 may be recorded and provided by the eye-tracking camera 366 to indicate the user's spontaneous response 2622 while the respective visual stimulus 338 is being displayed. A first audio instruction 2614A may be adaptively generated based on the stream of image data 2620, allowing the speaker 2602 to play the first audio instruction 2614A to guide the user 120 in the virtual vision tests 2606.

In some embodiments, the computer device 104 may determine one or more of content, a language type, a complexity level, a tone style, a speech rate, and a volume of the first audio instruction 2614A. Further, in some embodiments, the computer device 104 may extract eye positions 2622A, pupil dilation information 2622B (e.g., a pupil size), or retinal responses 2622C from the stream of image data 2620, and determine a focus level of a user 120 taking the virtual vision tests 2606. The first audio instruction 2614A is generated based on the focus level of the user 120. For example, the computer device 104 monitors a pupil size. The larger the pupil size, the lower the focus level of the user 120. When the computer device 104 determines that the user 120 is not focused based on the image data 2620 (e.g., when the focus level is lower than a focus threshold level), the computer device 104 may issue a reminder message, reduce the complexity level or the speech rate, or raise the volume of the first audio instruction 2614A.

Figure 8A:
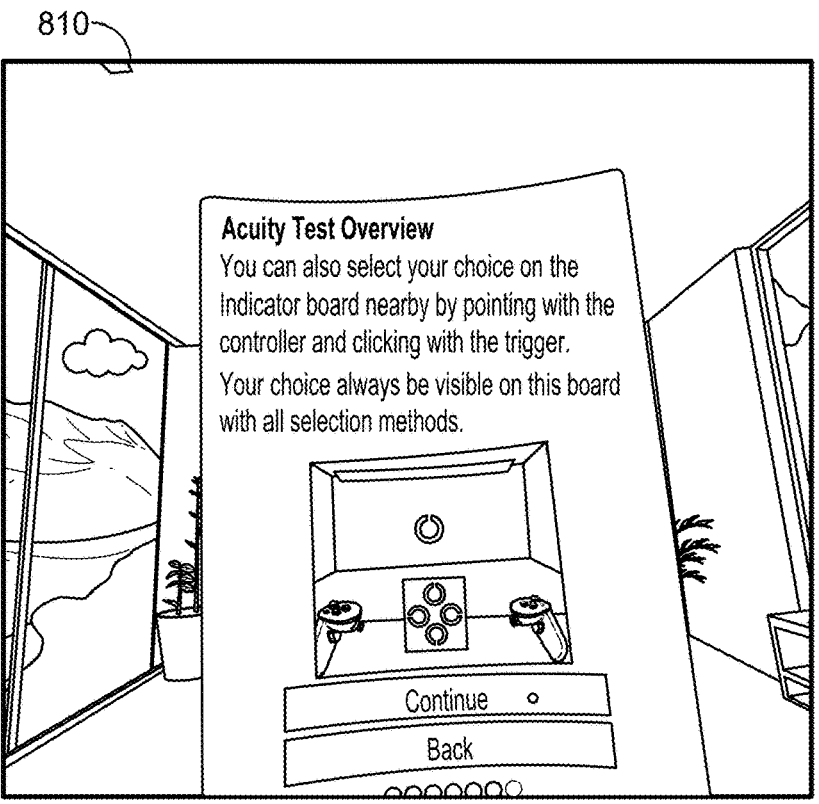
FIGS. 8A-8D include four diagrams of example graphical user interfaces rendered to determine a visual acuity score in a virtual environment created by a headset device, in accordance with some embodiments.
Figure 8B:
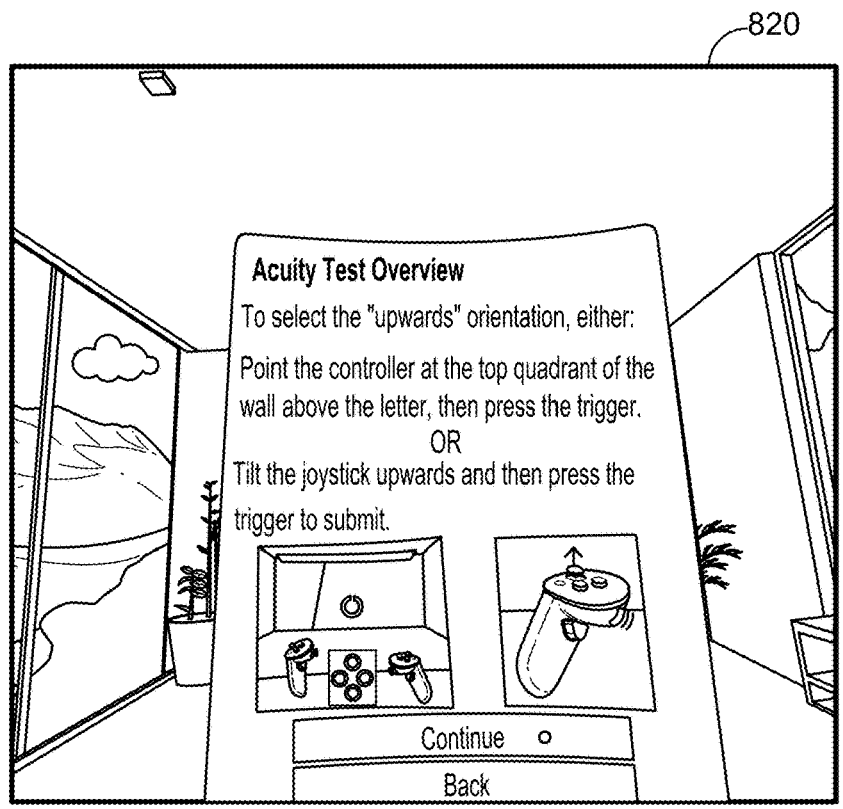
Figure 8C:
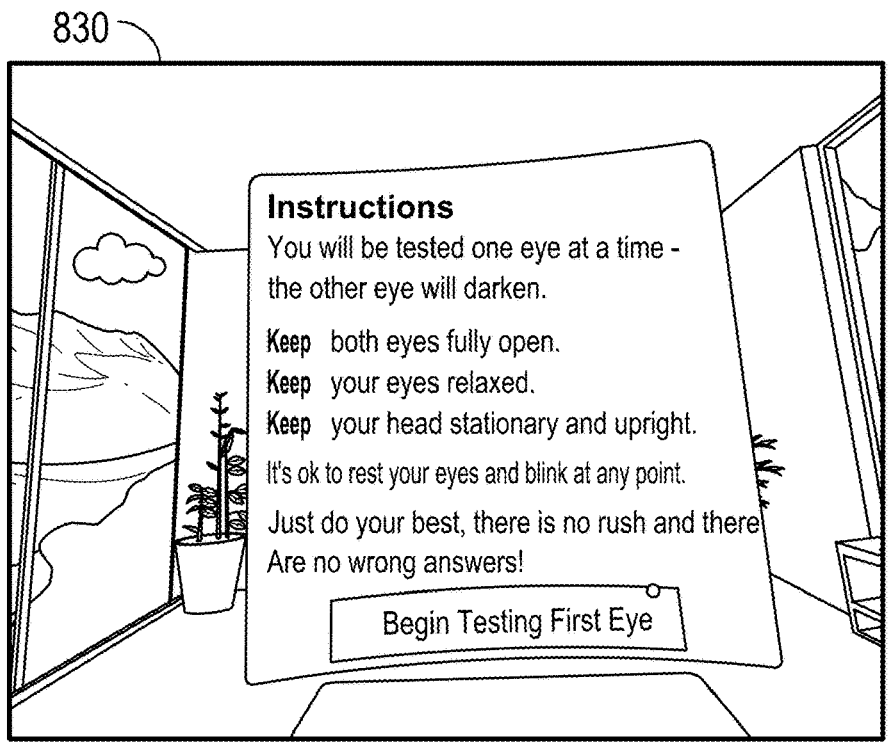
Figure 8D:
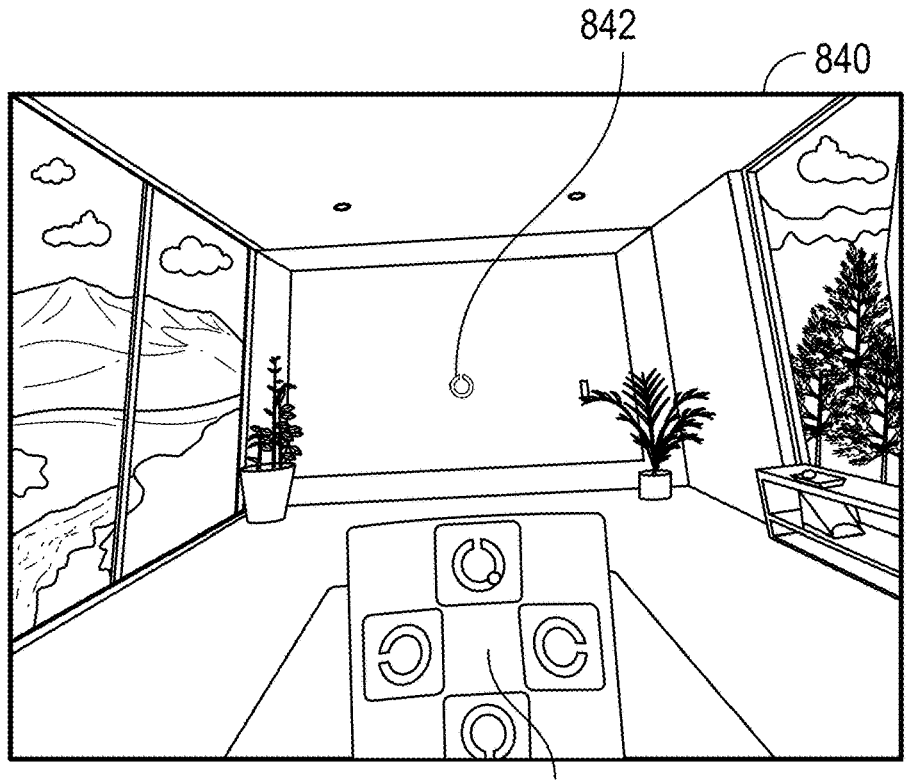

In some embodiments, the temporal sequence of visual stimuli 338 includes a first visual stimulus 338A, and in response to the first visual stimulus 338A, the respective audio instruction 2614A is generated with an instruction to apply a predefined action 2624 to a controller of the computer device 104. Referring to FIG. 8B, in some embodiments, the predefined controller action 2624 includes a selection of an orientation of an optotype using a controller associated with the computer device 104 (e.g., a headset device 104D), and the instruction shown in FIG. 8B may be delivered in a subset of audio instructions 2614A.

Figure 27:
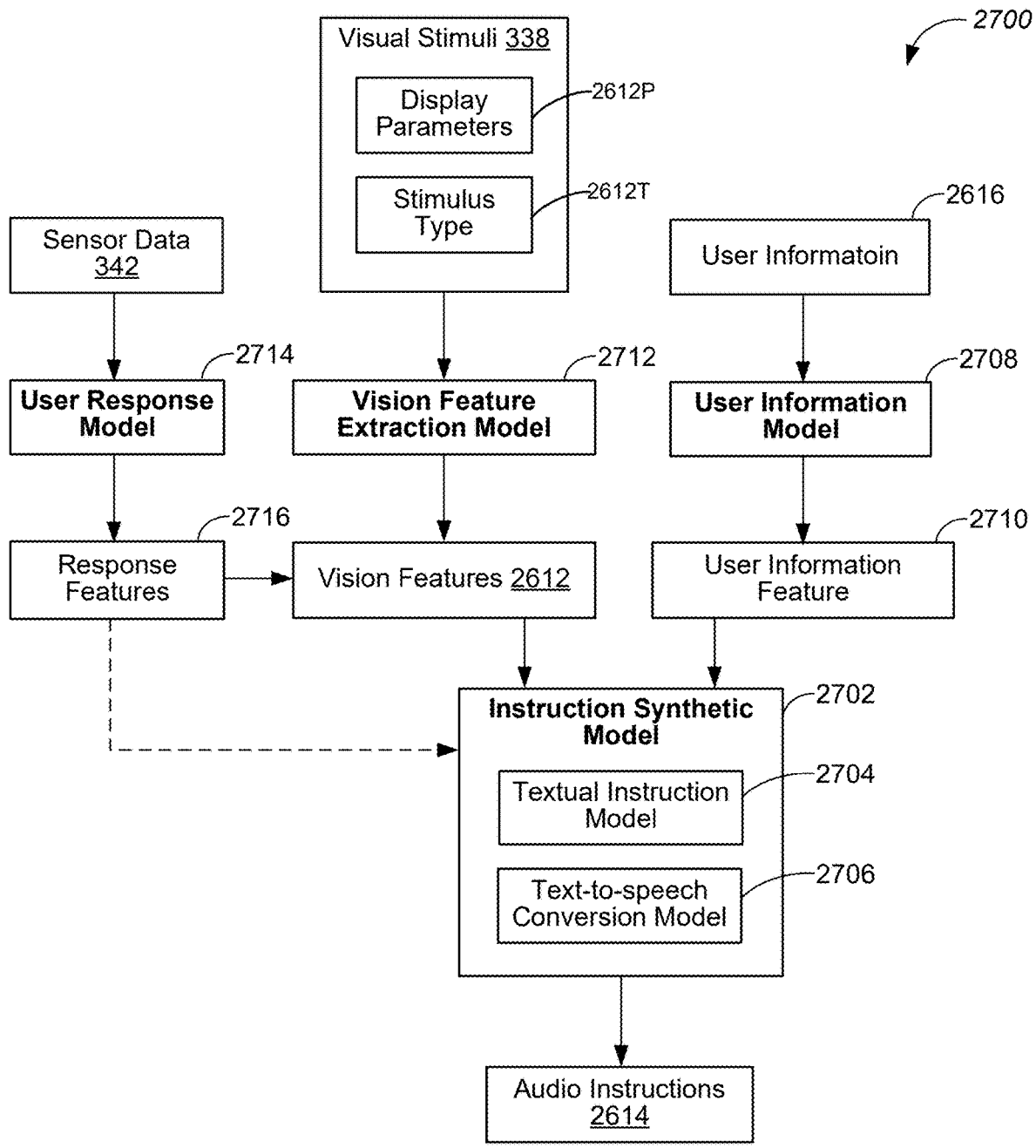
FIG. 27 is a block diagram of an example data processing process that applies an instruction synthetic model in a voice-guided vision test, in accordance with some embodiments.

FIG. 27 is a block diagram of an example data processing process 2700 that applies an instruction synthetic model 2702 in a voice-guided vision test 2606, in accordance with some embodiments. A computer device 104 (FIG. 1) may present on a display a temporal sequence of visual stimuli 338. While the temporal sequence of visual stimuli 338 is displayed, in real time, the computer device 104 may obtain a stream of sensor data 342 captured by the one or more sensors 360 (FIG. 3). The computer device 104 may generate a plurality of vision features 2612 based on the temporal sequence of visual stimuli 338 and the stream of sensor data 342. The computer device 104 may adaptively generate a sequence of audio instructions 2614 based on the plurality of vision features 2612. The speaker 2602 may play the sequence of audio instructions 2614 successively to guide a user 120 associated with the display in the virtual vision test 2606.

In some embodiments, for each respective audio instruction 2614, a subset of respective vision features 2612 is provided to the instruction synthesis model 2702, which may be applied to process the subset of respective vision features 2612 and generate the respective audio instruction 2614. Further, in some embodiments, the instruction synthesis model 2702 includes a textual instruction model 2704 and a text-to-speech conversion model 2706. For each visual stimulus 338, the textual instruction model 2704 is applied to process the subset of respective vision features 2612 and generate a respective textual instruction, which may be converted to the audio instruction 2614, e.g., using a text-to-speech conversion model 2706.

In some embodiments, the computer device 104 may obtain user information 2616 of the user 120 including age, education level, and language preference. The user information 2616 may be extracted from medical record of the user 120. The computer device 104 may apply a user information model 2708 to process the user information 2616 and generate user information features 2710. For one of the visual stimuli 338, the user information 2616, the user information features 2710, or both are provided to, and processed by, the instruction synthesis model 2702 jointly with the vision features 2612 to generate the respective audio instruction 2614. More specifically, in some embodiments, at least one of the textual instruction model 2704 and the text-to-speech conversion model 2706 may be applied based on the user information 2616. For example, the textual instruction model 2704 and the text-to-speech conversion model 2706 may be trained to use simple language in the user's mother language to guide the vision test if the user information 2616 indicates that the user 120 has never received high school education.

In some embodiments, each visual stimulus 338 has a stimulus type 2612T and is displayed with a plurality of display parameters 2612P. Examples of the display parameters 2612P include, but are not limited to, a display size, a spatial pitch, a temporal pitch, a contrast level, a brightness level, and a background style of the respective visual stimulus 338. The plurality of vision features 2612 may indicate the stimulus type 2612T and the plurality of display parameters 2612P associated with each respective visual stimulus 338. In some embodiments, for each respective visual stimulus 338, the computer device 104 may apply a vison feature extraction model 2712 to process the stimulus type 2612T, the plurality of display parameters 2612P, and the subset of sensor data 342, generating a subset of one or more vision features 2612.

In some embodiments, the computer device 104 may apply a user response model 2714 to process the subset of sensor data 342 corresponding to one of the visual stimuli 338 (e.g., stimulus 338A in FIG. 26) and generate a set of one or more response features 2716. The plurality of vision features 2612 include the set of one or more response features 2716, and are applied to generate one or more audio instructions 2614 corresponding to the one of the visual stimuli 338 (e.g., stimulus 338A).

Figure 28:
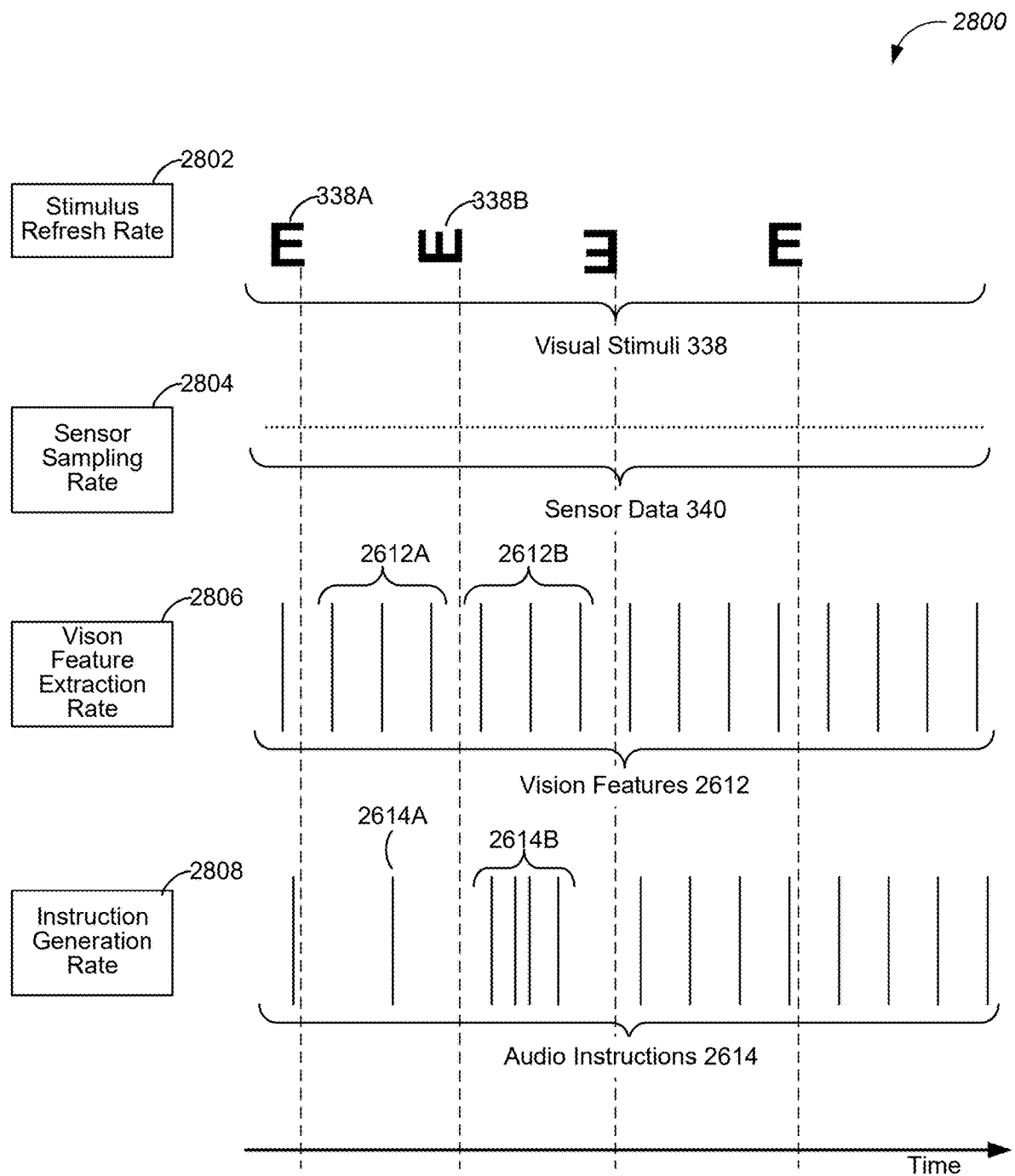
FIG. 28 is a temporal diagram of example data involved in a data processing process shown in FIG. 26, in accordance with some embodiments.

FIG. 28 is a temporal diagram of example data 2800 involved in a data processing process 2700 shown in FIG. 26, in accordance with some embodiments. The data 2800 may include media data associated with a sequence of visual stimuli 338, sensor data 340 captured in response to the visual stimuli 338, vision features 2612 generated based on the visual stimuli 338 and/or user responses 2610, and audio instructions 2614. The temporal sequence of visual stimuli 338 may have a stimulus refresh rate 2802. Each of the one or more sensors 360 capturing the sensor data 340 may correspond to a sensor sampling rate 2804. The plurality of vision features 2612 may be generated at a feature extraction rate 2806 that is less than the sensor sampling rate 2804. The feature extraction rate 2806 is equal to or greater than the stimulus refresh rate. Stated another way, each visual stimulus 338 corresponds to a subset of one or more vision features 2612. The sequence of audio instructions 2614 may be generated at an instruction generation rate 2808 that is less than or equal to the feature extraction rate 2806. In an example, each visual stimulus 338 may correspond to one or more audio instructions 2614.

In some embodiments, the instruction generation rate 2808 of the sequence of audio instructions 2614 may be adaptively adjusted based on the user's response 2610 or 2622 to a corresponding visual stimulus 338. Further, in some situations, the vision features 2612 associated with the user response 2610 may indicate that the user 120 responds well to the visual stimulus 338, and no audio instruction 2614 is displayed. Alternatively, in some situations, the user's spontaneous response 2622 tracked by the image data 2620 may indicate that the user 120 does not focus on or is lost on the visual stimulus 338, and a series of audio instructions 2614 are displayed successively to guide the user 120.

In an example, a first visual stimulus 338A is displayed on a display of the computer device 104 (e.g., a headset device 104D), and a second visual stimulus 338B follows the first visual stimulus 338A. The sequence of sensor data 340 continuously track the user response 2610 including a user response 2610A (FIG. 26) to the first visual stimulus 338A. A first set of vision features 2612A are extracted in response to the first visual stimulus 338A, and a second set of vision features 2612B are extracted in response to the second visual stimulus 338B. A single audio instruction 2614A is generated to guide the user 120 to respond to the first visual stimulus 338A, e.g., because the spontaneous response 2622 (e.g., a pupil size) shows that the user 120 has no difficulty in responding to the first visual stimulus 338A. Four successive audio instructions 2614B are generated to guide the user 120 to respond to the second visual stimulus 338B, e.g., because the spontaneous response 2622 (e.g., a pupil size) shows that the user 120 has a difficulty in responding to the second visual stimulus 338B. As such, the instruction generation rate 2608 of the sequence of audio instructions 2614 may be adaptively adjusted based on the user's response 2610 or 2622 to a corresponding visual stimulus 338.

2. Avatar—Guided Vision Tests In Virtual Environments

Some implementations of this application may include a VR computer system having a digital optician. The digital optician may include an avatar that is displayed via video to guide a user 120 through a sequence of vision tests. The VR computer system may combine virtual reality technology with sensors and AI-driven interactive guidance to deliver comprehensive and user-friendly vision testing experience. An electronic device having an HMD may integrate real-time eye-tracking technology, utilizing sensors to monitor ocular metrics associated with eye movement, pupil dilation, and retinal responses. The digital optician (e.g., an AI-powered avatar) may be displayed in a 3D virtual environment. The digital optician may provide real-time audio instructions and feedback to guide the user to perform each vision test correctly and efficiently. Application of the digital optician may eliminate the need for direct supervision by a human optician and make it feasible to conduct accurate and reliable vision exams remotely or in locations having limited access to professional eye care.

In some embodiments, an electronic device may include an HMD and one or more sensors. The HMD may have a resolution greater than a resolution threshold. For example, the resolution of the HMD is 8K (e.g., 7680×4320). In some embodiments, the electronic device may have an optical sensor (e.g., a camera 366 in FIG. 3) configured for capturing eye images having ocular metrics. These sensors may provide real-time data on eye movement, pupil dilation, and retinal responses, and the real-time data may be applied to adjust visual stimuli or audio instructions during the vision test.

In some embodiments, the electronic device includes a data processing module 330 (FIG. 3) that may apply one or more machine learning models 350 to process data collected by one or more sensors 360 and adjust a sequence of vision tests accordingly. In some embodiments, the data processing module 330 may employ natural language processing (NLP) to generate personalized and context-sensitive audio instructions based on real-time data collected from the sensors 360. The electronic device incorporates real-time data processing to provide dynamic interaction between the digital optician and the user. The machine learning models may be applied to analyze the sensor data continuously, allowing the digital optician to offer immediate feedback and adjust the vision tests as needed. The avatar are enabled to facilitate customization of the vision tests to individual users' needs and conditions, enhancing accuracy and reliability of vision test results. As such, an avatar and associated voice guidance may be dynamically adjusted based on the user's response, ensuring that the vision tests are implemented accurately and efficiently in a virtual environment.

In some embodiments, a VR-based computer system may include a cloud-based platform for storing and analyzing the data collected during vision exams. This platform may employ advanced machine learning algorithms to continuously improve machine learning performance and the accuracy of the vision tests. The cloud infrastructure may also facilitate remote access to the test results by healthcare professionals, enabling them to provide expert analysis and recommendations regardless of their physical location.

Figure 29:
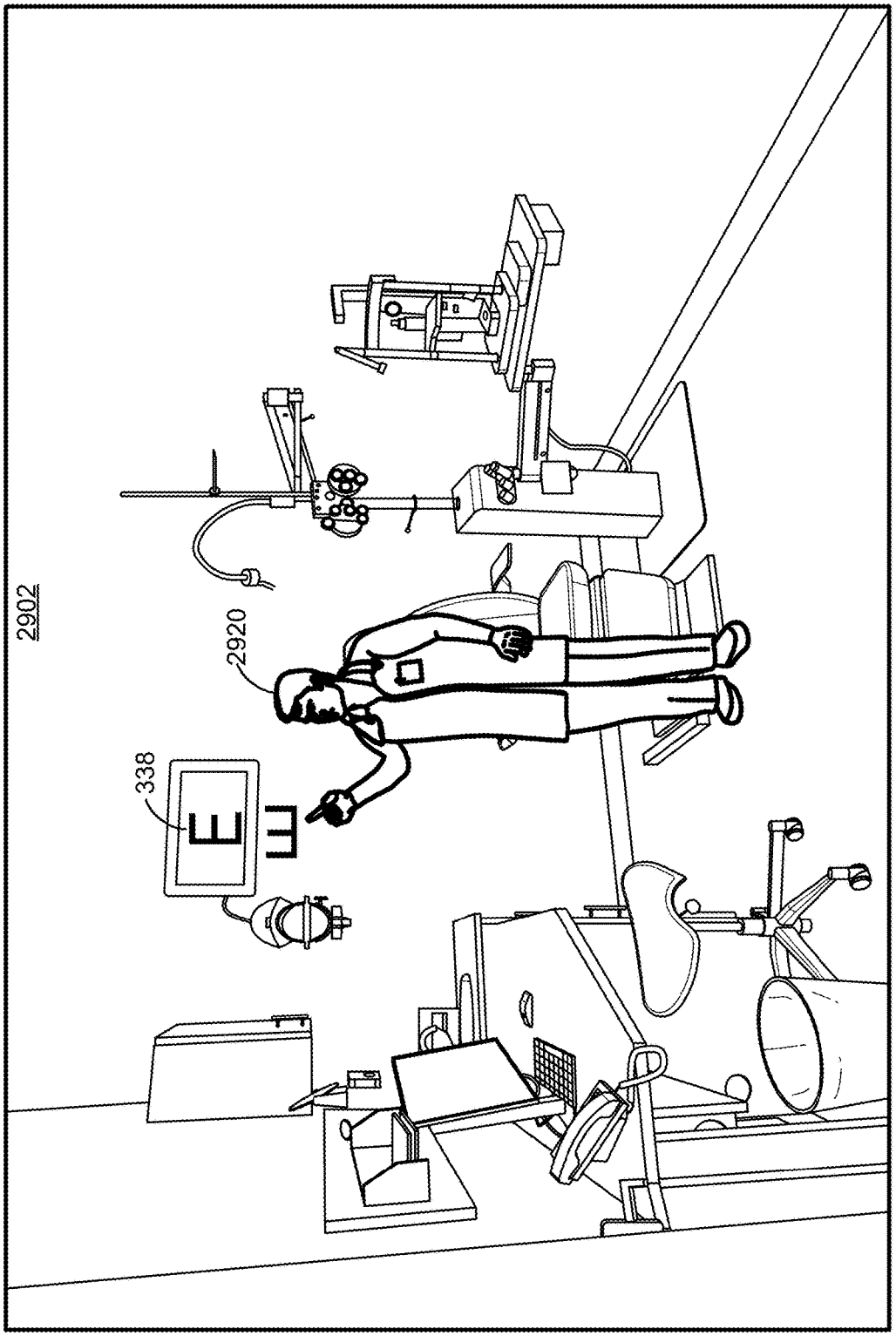
FIG. 29 is an example optician's office environment where an avatar of a digital optician is rendered, in accordance with some embodiments.

FIG. 29 is an example optician's office environment 2900 where an avatar 2920 of a digital optician is rendered, in accordance with some embodiments. A computer device 104 (e.g., headset device 104D) may include one or more processors 302 and memory 306 (FIG. 3) storing instructions to be implemented by the processor(s) 302. The computer device 104 may include a display (e.g., an HMD 312A). The computer device 104 may execute a user application (e.g., a visual assessment application 328 in FIG. 3) configured to generate a user interface 2902 corresponding to a 3D virtual environment and enable one or more virtual vision tests via the user interface 2902. A sequence of visual stimuli 338 may correspond to the one or more virtual vision tests 3002 and be displayed on the user interface 2902 successively. Each virtual vision test 3002 may include a subset of respective visual stimuli 338. The computer device 104 may concurrently display an avatar 2920 and the sequence of visual stimuli 338 on the user interface 2902.

In some embodiments, the user interface 2902 includes a VR user interface that is entirely rendered by the computer device 104, e.g., independently of a physical venue where the vision test is implemented. The avatar 2920 of the digital optician may be rendered jointly with the optician's office environment 2900. Alternatively, in some embodiments, the user interface 2902 includes an AR user interface. A headset device 104D may set the HMD 312A to be transparent and seen through to show a field of view, and the optician's office environment 2900 corresponds to the physical venue where the vision test is implemented. Each visual stimuli 338 may be overlaid on a field of view of the headset device 104D. Alternatively and additionally, in some embodiments, the headset device 104D may include a forward facing camera 378 that captures a stream of video data of a field of view, which is rendered on the user interface 2902 in real time to show the optician's office environment 2900. Each second stimulus 338B may be overlaid on a set of respective image frames in the stream of video data.

The avatar 2920 is configured to adopt a realistic look and enable a deep and immersive virtual reality experience. In some embodiments, the avatar 2920 may portray details (e.g., face emotion of emotions, imperfections that mimic a real person's facial anatomy). The avatar 2920 of the digital optician can provide a personal, intimate, and hyper-realistic experience involving a virtual conversation or other interactions during a virtual vision test.

Figure 30:
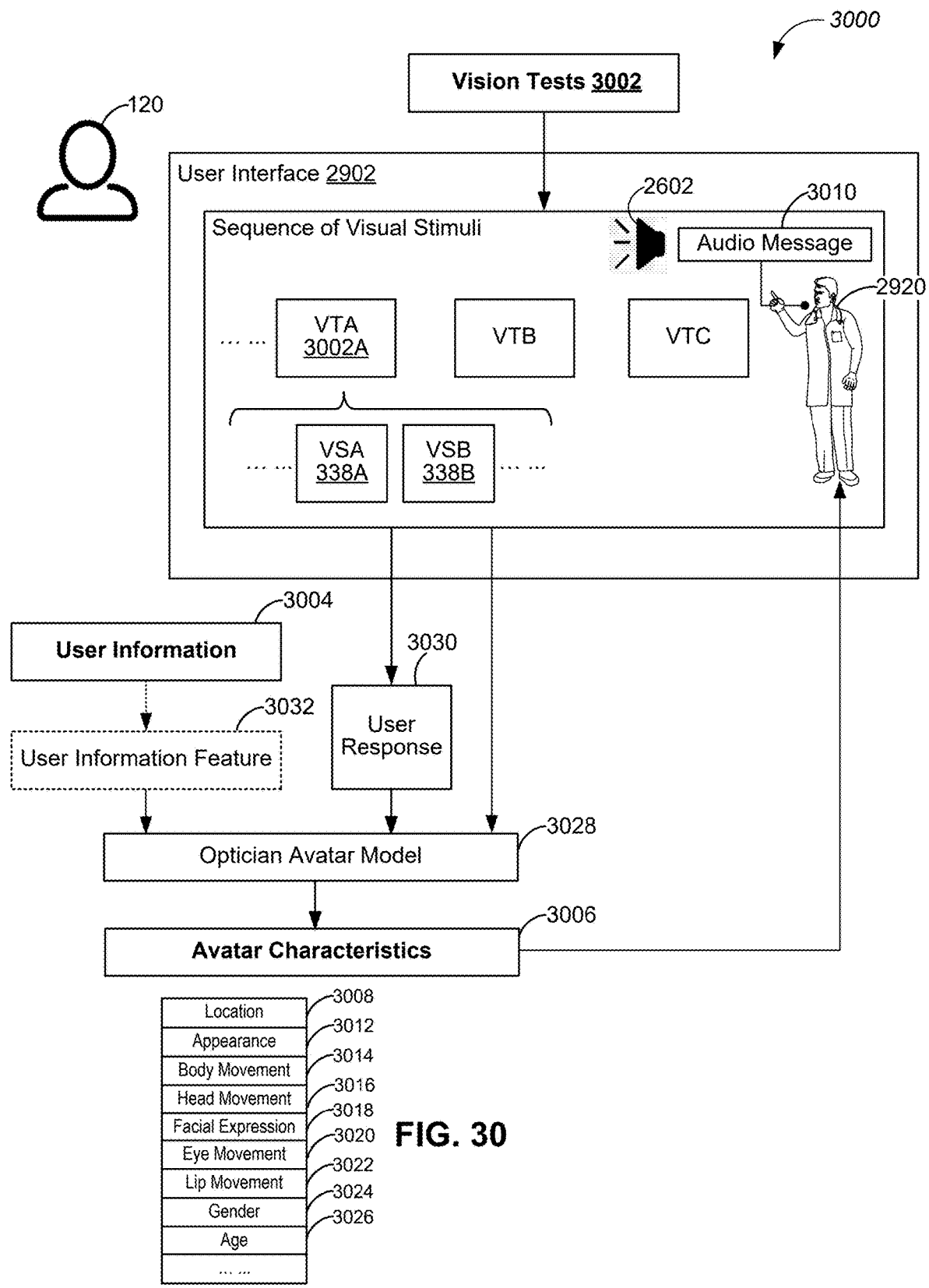
FIG. 30 is a flow diagram of an example process of implementing one or more avatar-guided vision tests, in accordance with some embodiments.

FIG. 30 is a flow diagram of an example process 3000 of implementing one or more avatar-guided vision tests 3002, in accordance with some embodiments. The process 3000 may be implemented by a computer device 104 (e.g., headset device 104D), which may include a display (e.g., an HMD 312A), a speaker 2602, one or more processors 302, and memory 306 storing instructions to be implemented by the processor(s) 302. The computer device 104 may execute a user application (e.g., a visual assessment application 328) configured to generate a VR or AR user interface 2902 corresponding to a 3D virtual environment (e.g., an optician's office environment 2900) and enable one or more virtual vision tests 3002 via the user interface 2902. A sequence of visual stimuli 338 may correspond to the one or more virtual vision tests 3002 and be displayed on the user interface 2902 successively. Each virtual vision test 3002 may include a subset of respective visual stimuli 338. For example, a first vision test 3002A includes a first visual stimulus 338A and a second visual stimulus 338B. The computer device 104 may concurrently display an avatar 2920 and the sequence of visual stimuli 338 on the user interface 2902. An example of the user interface 2902 that is rendered on the computer device 104 is shown in FIG. 29.

In some embodiments, the computer device 104 may obtain user information 3004 of a user 120 associated with the computer device 104 (e.g., a user 120 wearing the HMD 312A). While displaying each respective visual stimulus 338, avatar characteristics 3006 are determined based on the user information 3004 and the respective visual stimulus 338. The avatar characteristics 3006 include a location 3008 of the avatar 2920 in the 3D virtual environment. The computer device 104 may adjust display of the avatar 2920 based on the avatar characteristics 3006. In some embodiments, an audio message 3010 may be played while the first visual stimulus 338A and the avatar 2920 are displayed concurrently on the use interface 2902. The first visual stimulus 338A and the avatar 2920 may be displayed in synchronization with the audio message 3010.

In some embodiments, the avatar characteristics 3006 may include parameters associated with one or more of: avatar appearance 3012, body movement 3014, head movement 3016, facial expression 3018, eye movement 3020, and lip movement 3022 of the avatar 2920. In some embodiments, the avatar characteristics 3006 may include an age 3024 (e.g., young or old optician) or a gender 3026 (e.g., male or female) of the avatar 2920. In an example, the avatar 2920 impersonates a movie star.

In some embodiments, while displaying each respective visual stimulus 338, in real time, the computer device 104 may monitor a user response 3030 to the respective visual stimulus 338. The avatar characteristics 3006 of the avatar 2920 may be determined based on the user response 3030, and the avatar 2920 may be rendered on the user interface 2902 in synchronization with the user response 3030.

In some embodiments, the user information 3004 of the user 120 may further include one or more of: user preferences, medical history, pre-visit survey, and user feedback associated previous visits. In some embodiments, the computer device 104 may apply an optician avatar model 3028 to analyze the user information 3004 of the user 120 to determine the avatar characteristics 3006. Alternatively, in some embodiments, user information features 3032 may be extracted from the user information 3004, and fed into the optician avatar model 3028 to generate the avatar characteristics 3006. Stated another way, information of the visual stimuli 338, the user response 3030, the user information 3004, the user information features 3032, or a combination thereof is inputted into the optician avatar model 3028 to generate the avatar characteristics 3006. The optician avatar model 3028 may be trained at a server 102 and provided to the computer device 104 for inferring the avatar characteristics 3006 in real time while the visual stimuli 338 are displayed.

Figure 31:
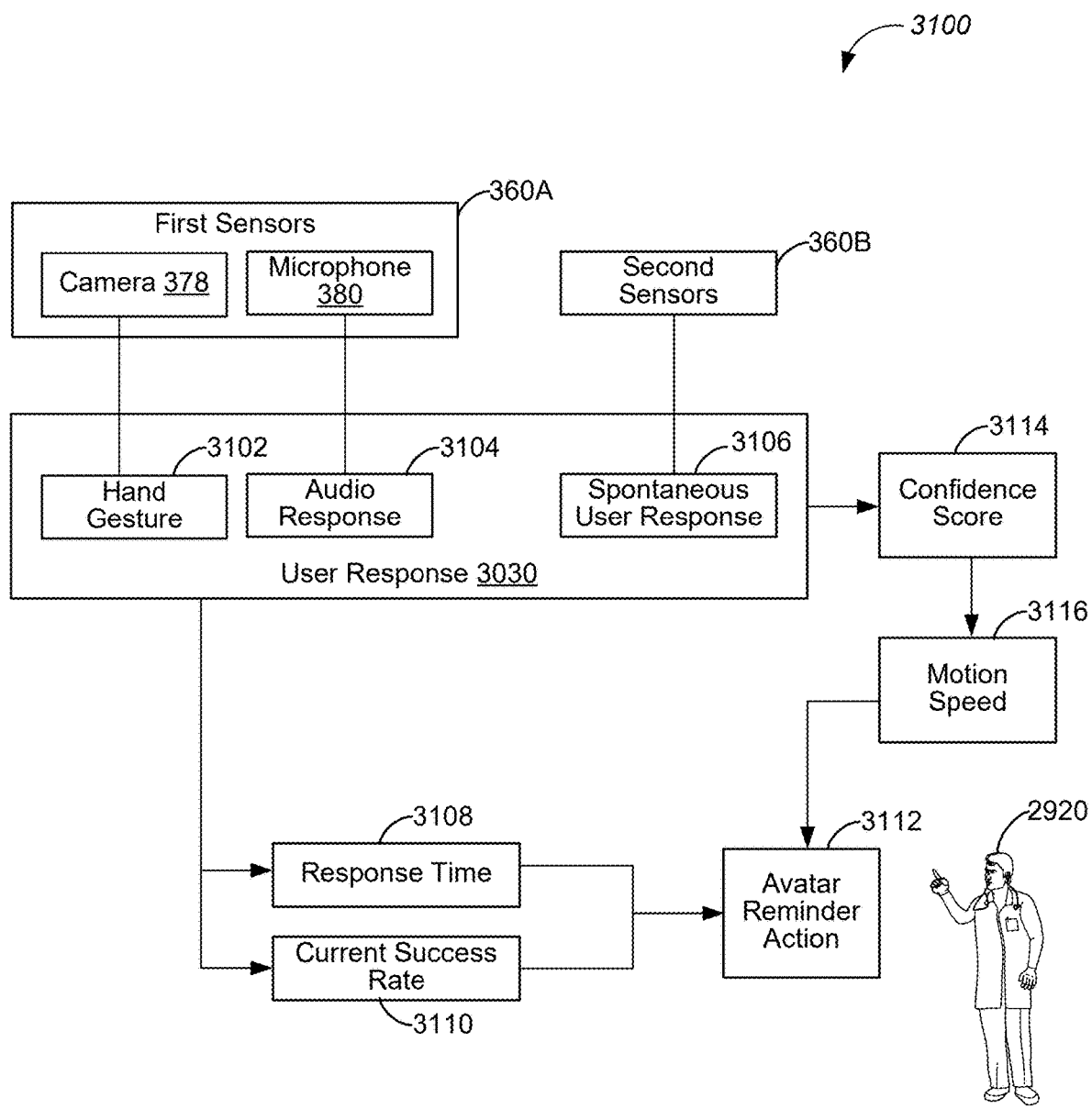
FIG. 31 is a flow diagram of an example process of controlling an avatar of a digital optician based on user responses in a virtual vision test, in accordance with some embodiments.

FIG. 31 is a flow diagram of an example process 3100 of controlling an avatar 2920 of a digital optician based on user responses 3030 in a virtual vision test 3002, in accordance with some embodiments. In some embodiments, the user response 3030 may include a user input captured by one or more first sensors 360A of the computer device 104, and the one or more first sensors 360A include a forward facing camera 378 (FIG. 3) for detecting a hand gesture 3102 and a microphone 380 (FIG. 3) for collecting an audio response 3104. In some embodiments, the user response 3030 may include a spontaneous user response 3106 monitored by one or more second sensors 360B of the computer device 104. The one or more second sensors 360B include one or more of: an eye tracking camera 366, a heart rate sensor, a body temperature sensor, a blood oxygen level, a Galvanic skin response sensor, a hand gesture camera (e.g., camera 378), a body gesture camera (e.g., camera 378), a microphone 380, a motion sensor 376, and a set of one or more brain activity electrodes 362.

Additionally, in some embodiments, the computer device 104 determines a response time 3108 of the user response 3030 associated with a second visual stimulus 338B (FIG. 30) and a current success rate 3110 for a subset of visual stimuli 338 displayed prior to the second visual stimulus 338B. In accordance with a determination that the response time 3108 is greater than a response threshold and that the current success rate 3110 is lower than a failure threshold, the computer device 104 enables display of the avatar 2920 taking an avatar reminder action 3112 based on the avatar characteristics 3006. For example, the avatar reminder action 3112 may include an avatar gesture pointing to the second visual stimulus 338B, thereby providing additional guidance to the user 120. In another example, the avatar reminder action 3112 may include a set of lip movement, body movement, and hand gestures that are orchestrated in synchronized with an audio message 3010 played by a speaker 2602.

Further, in some embodiments, the computer device 104 may determine a confidence score 3114 based on the spontaneous user response 3106 and adjust an avatar motion speed 3116. The computer device 104 may monitor a pupil size of the user 120 wearing the headset device 104D. The larger the pupil size, the lower a focus level of the user 120. When the computer device 104 determines that the user 120 is not focused (e.g., when the pupil size is greater than a pupil threshold or when the focus level is lower than a focus threshold level), the computer device 104 may obtain a low confidence score 3114 for the user response 3030 actively provided by the first sensors 360A and slow down the avatar motion speed 3116, thereby slowing down a pace of the virtual vision test 3002.

In other words, in some embodiments, a computer device 104 (e.g., a headset device 104D) includes an HMD 312A. The computer device 104 may execute a user application (e.g., a visual assessment application 328 in FIG. 3) configured to enable a virtual vision test 3002 and generate a VR user interface 2902 corresponding to a 3D virtual environment. While displaying a sequence of visual stimuli 338, the computer device 104 may collect a spontaneous user response 3106 monitored by one or more second sensors 360B of the computer device 104. A confidence score 3114 may be determined based on the spontaneous user response and further used to determine avatar characteristics 3006 based on the confidence score 3114. The computer device 104 may display an avatar 2920 and a sequence of visual stimuli 338 on the VR user interface 2902 based on the avatar characteristics 3006. The avatar characteristics 3006 may include an avatar motion speed 3116, an avatar speech rate, and an avatar gesture type.

Astigmatism—Driven Media Content Compensation

A cornea of an eyeball may be irregularly shaped, causing light to focus unevenly on the retina. A refractive power of the eyeball on each meridian may be uneven. After light enters the eyeball, the light cannot focus on the retina and forms scattered focal points due to different refractive powers of the eyeball on different meridians. An error associated with the different refractive powers of the eyeball on different meridians is called astigmatism. Some implementations of this application are directed to applying a user's astigmatism information to compensate media content presented to the user who has an astigmatism condition. The user may not need to wear eyewear while reviewing media content. Particularly, when the user utilizes a headset device 104D (FIG. 1) to review media content, astigmatism-driven compensation enhances quality of the media content and user experience associated with the headset device 104.

Figure 32:
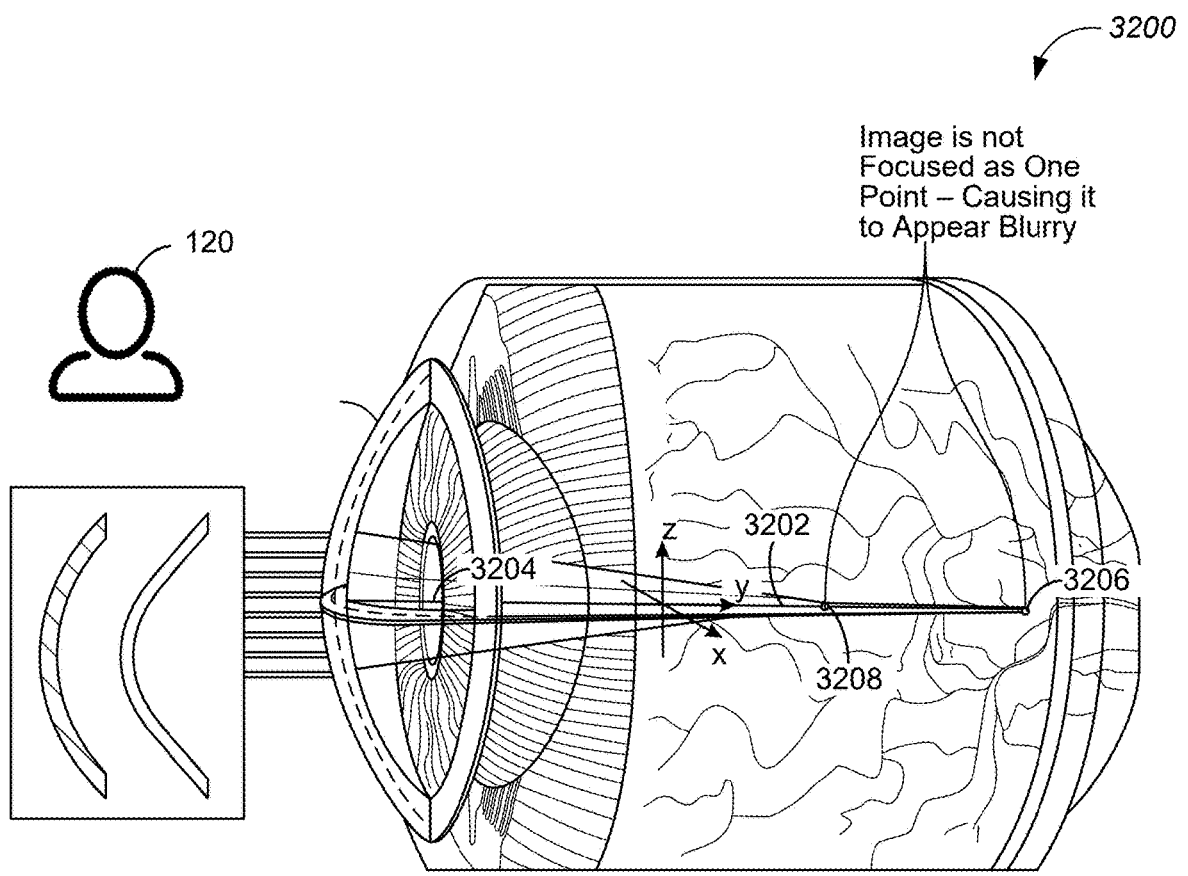
FIG. 32 is a cross sectional view of an example human eye ball and an associated prescription, in accordance with some embodiments.
Figure 32:
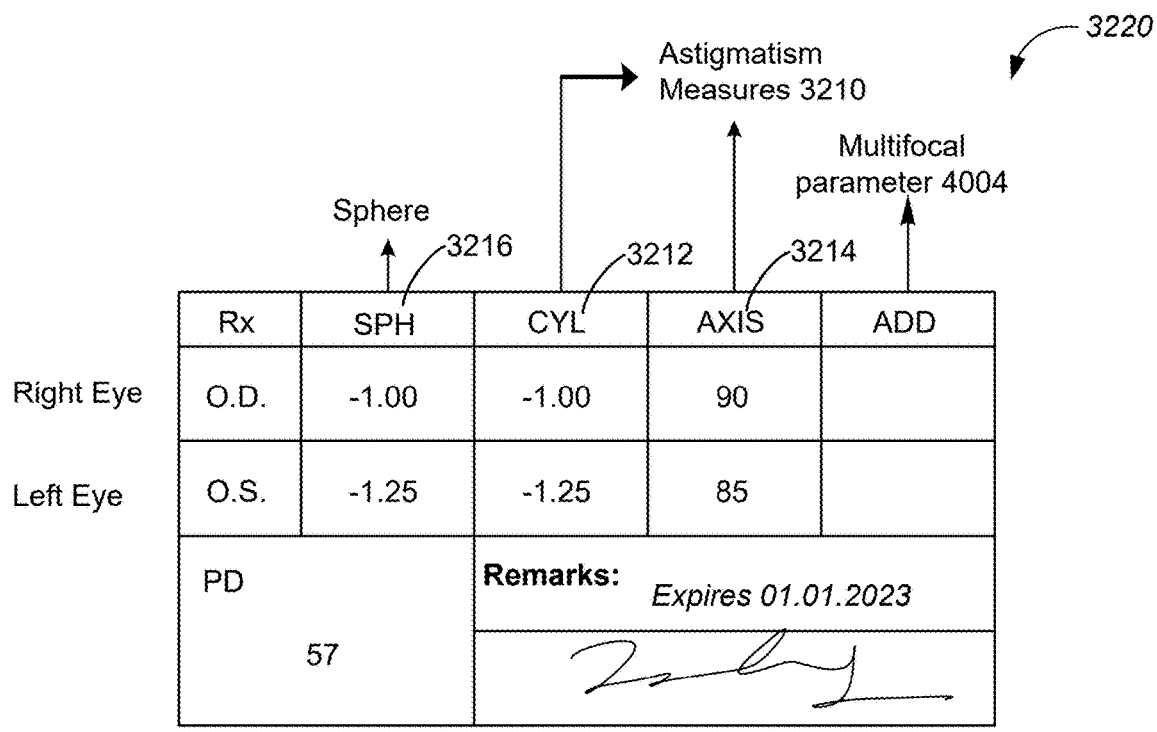

FIG. 32 is a cross sectional view of an example human eye ball 3200 and an associated prescription 3220, in accordance with some embodiments. The human eye ball 3200 includes a focal line 3202 connecting a center 3204 of a pupil and a focal point 3206 on a retina, and light entering the pupil from the center 3204 may propagate along the focal line 3202 until it hits the focal point 3206. A meridian surface is defined to include the center 3204 of the pupil and the focal line 3202, and light propagating on each meridian surface is focused at a respective focal point (e.g., point 3208) that may be in front of, on, or behind the retina. When the respective focal point does not land on the retina, the light propagating on the respective meridian surface may scatter on the retina. For example, the focal line 3202 extends along a y-axis of a coordinate system, and light propagating on a horizontal meridian surface defined by an x-axis and the y-axis may be focused at the focal point 3206 on the retina. Light propagating on a surface defined by a z-axis and the x-axis may be focused at the focal point 3208 in front of the retina and scattered when the light arrives at the retina. A cornea of the eye ball 3200 may not be regular, causing an astigmatism condition in which the light propagating on different meridian surfaces is focused at different focal points that may not overlap and could spread in front of, on, or behind the retina.

The astigmatism condition may be quantitatively assessed using astigmatism measures 3210 of each of the two eyes. For each eye, the astigmatism measures 3210 include a respective cylinder indicator 3212 (CYL) measuring a lens power for correcting astigmatism and a respective axis indicator 3214 measuring an orientation of astigmatism correction in degrees (e.g., 90 degrees, 85 degrees).

Figure 33:
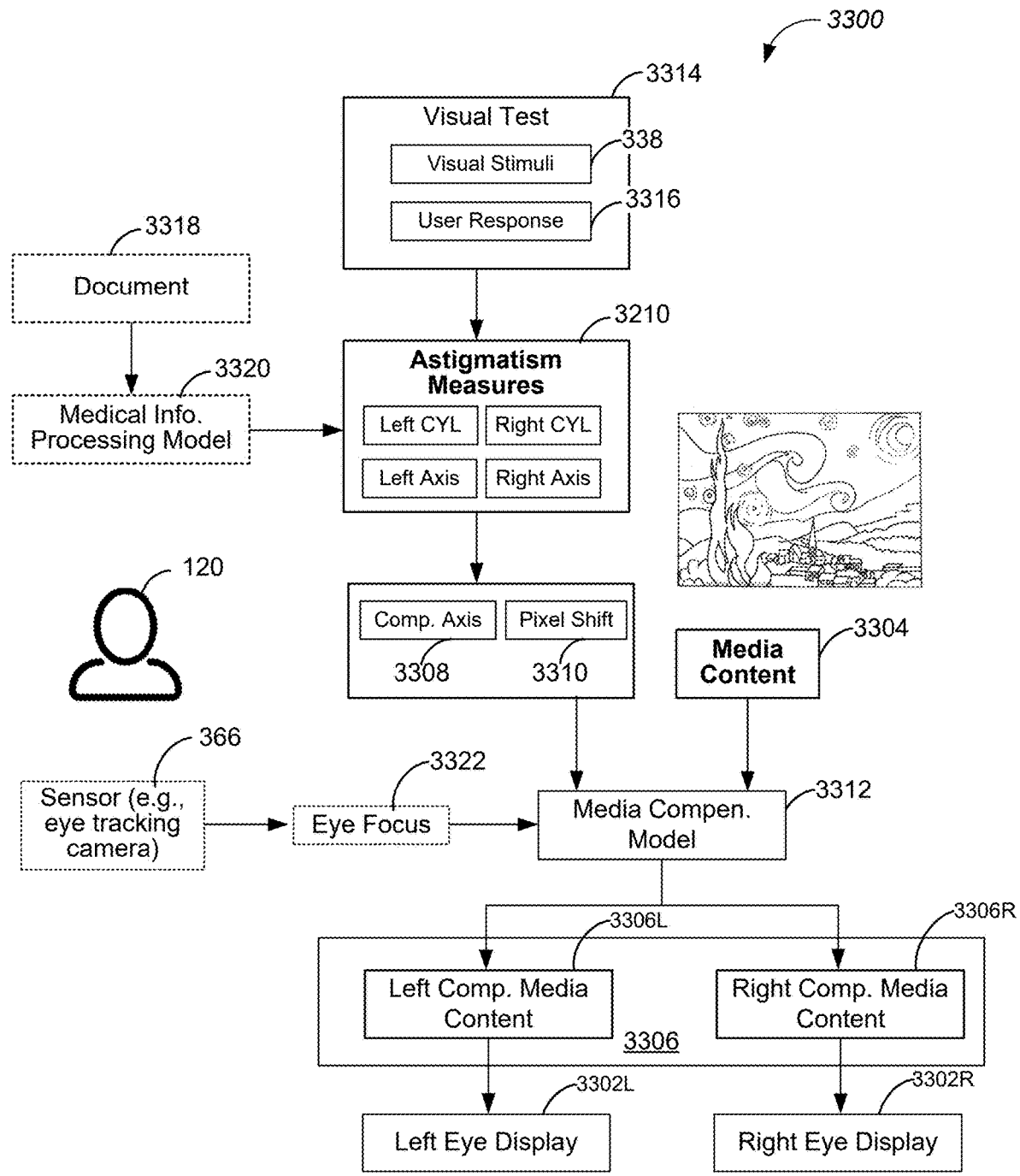
FIG. 33 is a flow diagram of an example process of compensating media content based on astigmatism measures, in accordance with some embodiments.

FIG. 33 is a flow diagram of an example process 3300 of compensating media content based on astigmatism measures 3210, in accordance with some embodiments. The process 3300 may be implemented by a computer device 104 (e.g., headset device 104D) including one or more processors 302 and memory 306 storing instructions to be implemented by the processor(s) 302. The computer device 104 may include an HMD 312A, and the HMD 312A includes two displays 3302L and 3302R for two eyes of a user 120 associated with the HMD 312A. A user application (e.g., a media play application) may be executed on the computer device 104 to generate a user interface (e.g., a VR user interface) corresponding to a 3D virtual environment. The computer device 104 may obtain media content 3304 to be rendered on the HMD 312A and astigmatism measures 3210 of the two eyes of the user 120. For each respective eye of the user 120, the media content 3304 is compensated to generate respective compensated media content 3306 for a respective display 3202L or 3202R based on the respective astigmatism measures 3210 of the respective eye. Specifically, compensated media content 3306L may be generated for a left display 3202L, and compensated media content 3306R may be generated for a right display 3202R. The compensated media content 3306L and 3306R may be rendered on the two displays 3202L and 3202R of the HMD 312A in synchronization with each other, thereby creating the 3D virtual environment on the computer device 104. When the media content 3304 is compensated for display, the user 120 may not need to rely on alternative eyewear to review the media content 3304, making user experience with the computer device 104 (e.g., the headset device 104D) pleasant.

In some embodiments, the computer device 104 may determine a compensation axis 3308 based on the respective axis indicator 3214 of one of the two eyes of the user 120 and adjust the media content 3304 along a direction parallel to the compensation axis of the one of the two eyes based on the respective cylinder indicator 3212. Pixels of an image frame corresponding to the media content 3304 are adjusted based on the compensation axis 3214. For example, the computer device 104 may move positions of a set of pixels along, or parallel to, the compensation axis 3308 by respective pixel shifts 3310. The computer device 104 may delete a set of pixels along, or parallel to, the compensation axis 3308. The computer device 104 may add a set of pixels along, or parallel to, the compensation axis 3308. Stated another way, in some embodiments, the image frame corresponding to the media content 3304 may be stretched or compressed based on the compensation axis 3308 to compensate for the user's astigmatism condition. Further, in some embodiments, a media compensation model 3312 may be trained and applied to stretch or compress the image frame based on the compensation axis 3308. Alternatively, in some embodiments, an astigmatism-correcting filter may mimic astigmatism-correcting eyewear lenses defined by the astigmatism measures 3210, and be applied to stretch or compress the image frame based on the compensation axis 3308. The media compensation model 3312 and the astigmatism-correcting filter may not require accurate identification of the compensation axis 3308, thereby providing accurate media compensation in a timely manner (e.g., without an excessive latency).

In some embodiments, the computer device 104 may execute a visual assessment application 328 (FIG. 3) to determine the astigmatism measures 3210 of the two eyes. The computer device 104 may enable one or more virtual vision tests 3314 via its user interface. A sequence of visual stimuli 338 (FIG. 3) may correspond to the one or more virtual vision tests 3314 and be displayed on the user interface successively. Each virtual vision test 3314 may include a subset of respective visual stimuli 338. The computer device 104 may obtain a plurality of user responses 3316 to the sequence of visual stimuli 338 and determine the astigmatism measures 3210 of the two eyes based on the plurality of user responses 3316.

In some embodiments, the computer device 104 may obtain a document 3318 including a medical history of the user 120, and the astigmatism measures 3210 of the two eyes are extracted from the document 3318. In some embodiments, the document 3318 is written in natural language. The document 3318 may be entered by typing or scanned based on content recorded on a paper. The computer device 104 may apply a medical information processing model 3320 to process the medical history and determine a respective cylinder indicator 3212 and a respective axis indicator 3214 of each of the two eyes of the user 120. Additionally, in some embodiments, the medical information processing model 3320 may be provided by a server 102 (FIG. 1) associated with the computer device 104, after the medical information processing model 3320 is trained on the server 102.

In some embodiments, for each respective display 3302L or 3302R, the computer device 104 may apply the media compensation model 3312 to process the media content 3304 and the respective astigmatism measures 3210 of the respective eye and generate the respective compensated media content 3306. Further, in some embodiments, the media compensation model 3312 may be trained (e.g., at the server 102) using training data including an input test image, test stigmatism measures, and a ground truth image. More details on the media compensation model 3312 or the medical information processing model 3320 are discussed above with reference to FIGS. 4, 5A, and 5B.

In some embodiments, the computer device 104 may compensate the media content 3304 by adjusting one or more display parameters of: a resolution, a contrast level, a brightness level, and a refresh rate of the display 3202L or 3202R.

In some implementations of this application, a computer device 104 (e.g., a headset device 104D) includes an HMD 312A, one or more processors 302, and memory 306 (FIG. 3). The HMD 312A includes two displays 3302L and 3302R for two eyes of a user 120 associated with the HMD 312A. The computer device may obtain the media content 3304 to be rendered on the HMD 312A and astigmatism measures 3210 of an eye. The computer device 104 may track an eye focus 3322 of the eye and generate the respective compensated media content 3306 dynamically by applying a media compensation model 3312 to process the media content 3304, the astigmatism measures 3210 of the eye, and the eye focus 3322. The compensated media content 3306 may be rendered on a display 3302L or 3302R of the HMD 312 associated with the eye for the user 120.

In some embodiments, the computer device 104 may determine a compensation axis 3308 based on the respective axis indicator 3214 of the eye associated with the display 3302L or 3302R, and the compensation axis 3308 is associated with (e.g., passes) the eye focus 3322. An image frame corresponding to the media content 3304 may be stretched or compressed based on the compensation axis 3308 and with respect to the eye focus 3322 to compensate for the user's astigmatism condition. In some embodiments, while the computer device 104 presents the visual stimuli 338, in real time, an eye-tracking camera 366 (FIG. 3) of the computer device 104 may capture a stream of image data. Each respective visual stimulus 338 corresponds to a subset of image data. The computer device 104 may determine eye positions, pupil dilation information, or retinal responses from the stream of image data, and the eye focus 3322 may be determined based on the eye positions, pupil dilation information, or retinal responses.

In some embodiments, the media compensation model 3312 is provided and trained by a server 102 (FIG. 1). The server 102 may obtain an input test image, and apply a reverse astigmatism filter on the input test image to generate a ground truth test image including a reverse astigmatism effect. The input test image and the ground truth test image may be applied to train the media compensation model. In other words, the server 102 may obtain an image captured by a camera and augment the image to create a plurality of ground truth test images for training based on different astigmatism measures 3210.

Figure 34:
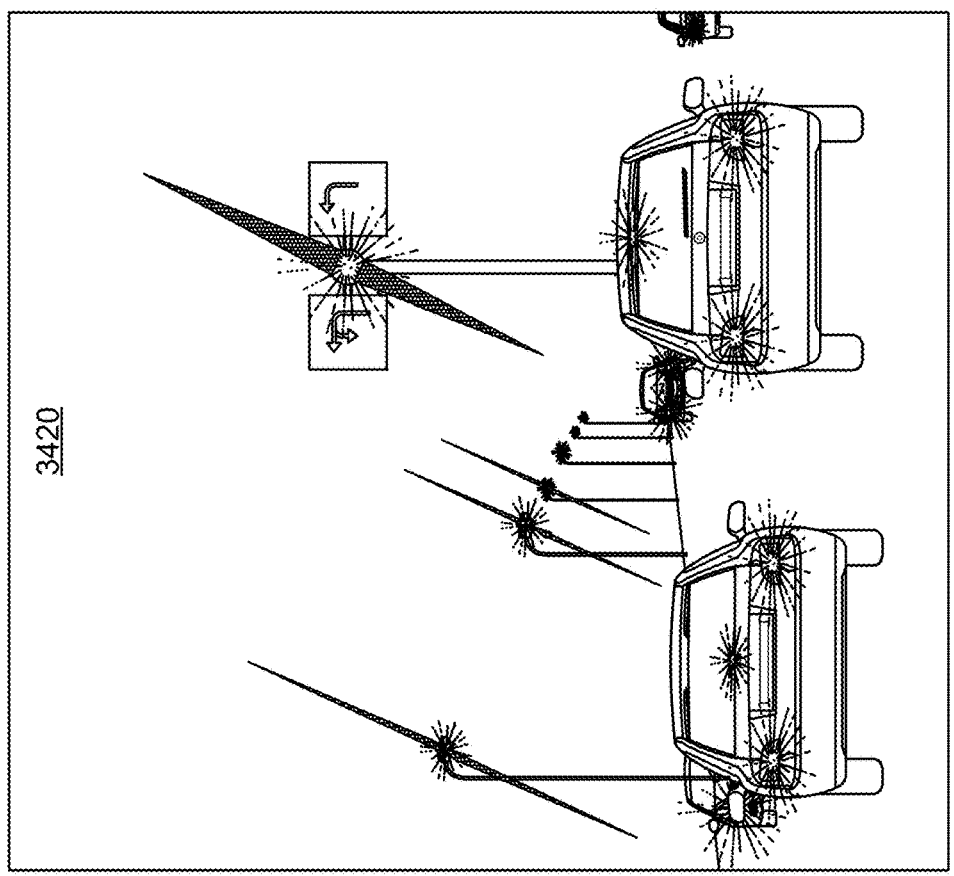
FIG. 34 is a comparison of an original image frame and an uncompensated image frame perceived by a user, in accordance with some embodiments.
Figure 34:
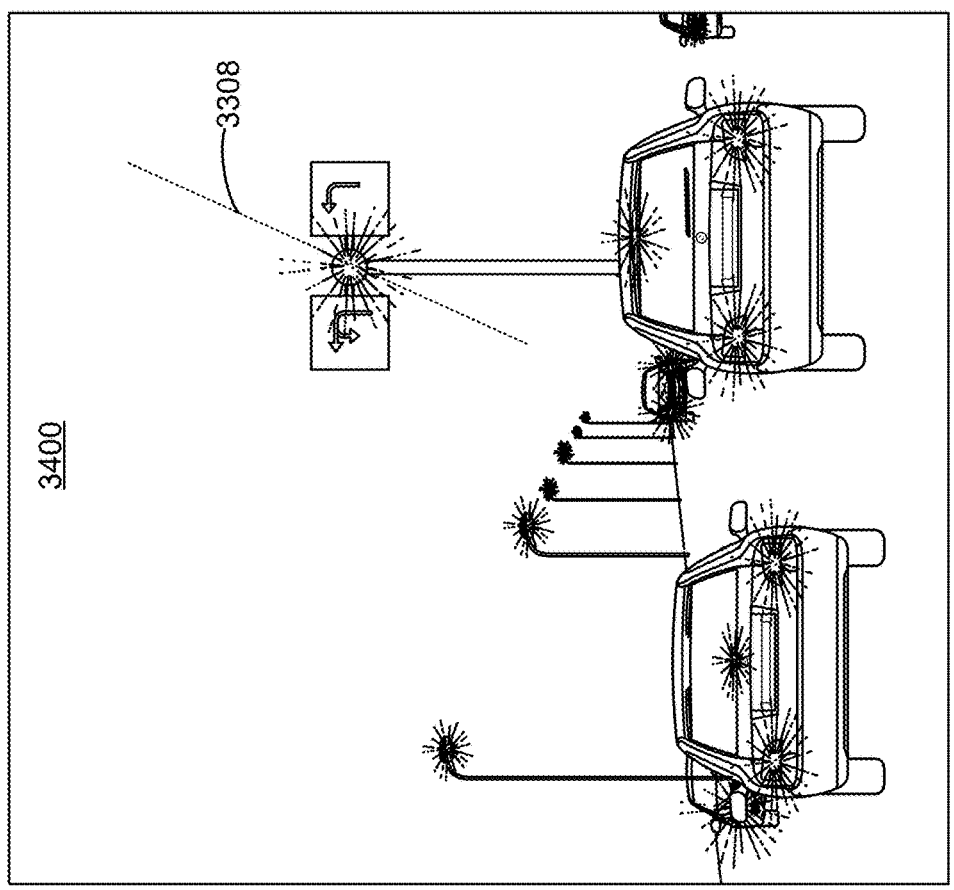

FIG. 34 is a comparison of an original image frame 3400 and an uncompensated image frame 3420 perceived by a user 120, in accordance with some embodiments. The user 120 perceives the uncompensated image frame 3420 due to an astigmatism condition. The astigmatism condition is quantitatively measured based on astigmatism measures 3210 including a respective axis indicator 3214 and a respective cylinder indicator 3212 of a corresponding eye of the user 120.

The computer device 104 may determine a compensation axis 3308 based on the respective axis indicator 3214 of the eye of the user 120 and adjust the media content 3304 along a direction parallel to the compensation axis of the eye based on the respective cylinder indicator 3212. The compensation axis 3308 and an axis defined by the respective axis indicator 3214 form an angle (e.g., equal to 0, 30, 60, or 90 degrees). For each of a plurality of first pixels of an image frame 3400 of the media content 3304, the computer device 104 determines a respective pixel shift 3310 based on the compensation axis 3308 of the eye, and updates a pixel position of the respective first pixel based on the respective pixel shift 3310. In some embodiments, the respective pixel shift 3310 is measured with reference to a respective eye focus 3322. In an example, in accordance with a determination the respective cylinder indicator 3212 is positive, each of the plurality of first pixels is moved towards from the respective eye focus 3322, along the direction parallel to the compensation axis 3308 of the eye, and based on a displacement defined by the respective pixel shift 3310. Alternatively, in another example, in accordance with a determination the respective cylinder indicator 3212 is negative, each of the plurality of first pixels is moved towards the respective eye focus 3322, along the direction perpendicular to the compensation axis 3308 of the eye, and based on a displacement defined by the respective pixel shift 3310. The compensation axes 3308 of the two eyes of the user 120 may be different from each other, so may the pixel shifts 3310.

For the media content 3304 to be rendered in 2D, the eye focus 3322 may include an image point corresponding to a focal point 3206 (FIG. 32). A 2D image frame corresponding to the media content 3304 may be stretched or compressed based on the compensation axis 3308 and with respect to the eye focus 3322 to compensate for the user's astigmatism condition. For the media content 3304 to be rendered in 3D, the eye focus 3322 may correspond to extension of a focal line 3202 (FIG. 32). The 3D virtual environment corresponding to the media content 3304 may be stretched or compressed based on the compensation axis 3308 and with respect to the extension of the focal line 3202 to compensate for the user's astigmatism condition.

In some embodiments, the computer device 104 may compensate the media content 3304 for one of the two eyes by, for each of a plurality of pixels of an image frame of the media content 3304, updating a pixel position of the respective pixel based on the astigmatism measures 3210 of the one of the two eyes, without changing color characteristics of the respective pixel. Alternatively, in some embodiments, the computer device 104 may change the color characteristics of the respective pixel.

In some embodiments, the computer device 104 may compensate the media content 3304 for one of the two eyes by adding an alternative pixel. Color characteristics of the alternative pixel may be interpolated from original pixels of the media content 3304. In some embodiments, the computer device 104 may compensate the media content 3304 for one of the two eyes by removing a redundant pixel. A shifted pixel may be rendered in place of the redundant pixel.

Personalized Eyewear Manufacturing

Some implementations of this application may enable a customized VR entry experience designed to adapt vision testing based on preliminary user inputs, thereby providing a tailored and efficient diagnostic process. This system may leverage a virtual reality headset device 104D equipped with high-resolution displays and one or more sensors (e.g., a camera), which may gather preliminary data such as age, medical history, and initial visual responses through a user-friendly interface. Upon entering a 3D virtual environment, a user may be prompted to provide these preliminary inputs, which may be processed by an AI-driven system. This system may analyze user inputs to customize the sequence and parameters of subsequent vision tests, ensuring they are optimally suited to the user's specific visual profile and needs. Customization may extend to adjusting the difficulty level, the type of tests presented, and the visual stimuli used, thereby enhancing both the accuracy and user experience of the vision testing process.

The VR headset device 104D may include an intuitive user interface that prompts users to input essential preliminary information, such as age, medical history, current vision issues, and initial responses to basic visual stimuli. This interface is designed to be accessible and easy to navigate, ensuring that users can provide accurate information without difficulty.

A data processing module 330 of the headset device 104D (FIG. 3) may process the user inputs using machine learning models 350 to generate a customized vision testing plan. This involves analyzing the data to determine the user's specific needs and tailoring the vision tests accordingly. For instance, the data processing module 330 may decide to focus more on color vision tests if the user inputs indicate potential color blindness. In another example, the difficulty level of visual acuity tests may be adjusted based on the user's initial responses.

The vision tests within the 3D virtual environment may be dynamically adjusted in real-time based on the user's interactions and responses. This includes modifying the type, sequence, and complexity of tests, as well as the visual stimuli presented. The system ensures that each test is appropriately challenging and relevant to the user's specific visual profile, thereby improving diagnostic accuracy.

A system may integrate data from the user inputs and subsequent vision tests into a cloud-based platform, which may utilize machine learning algorithms to refine the customization process continuously. By learning from each user interaction, the data processing module 330 can enhance the accuracy and effectiveness of the vision tests over time. Additionally, this cloud-based approach allows healthcare professionals to access and analyze the data remotely, facilitating comprehensive diagnostics and follow-up care.

Figure 35:
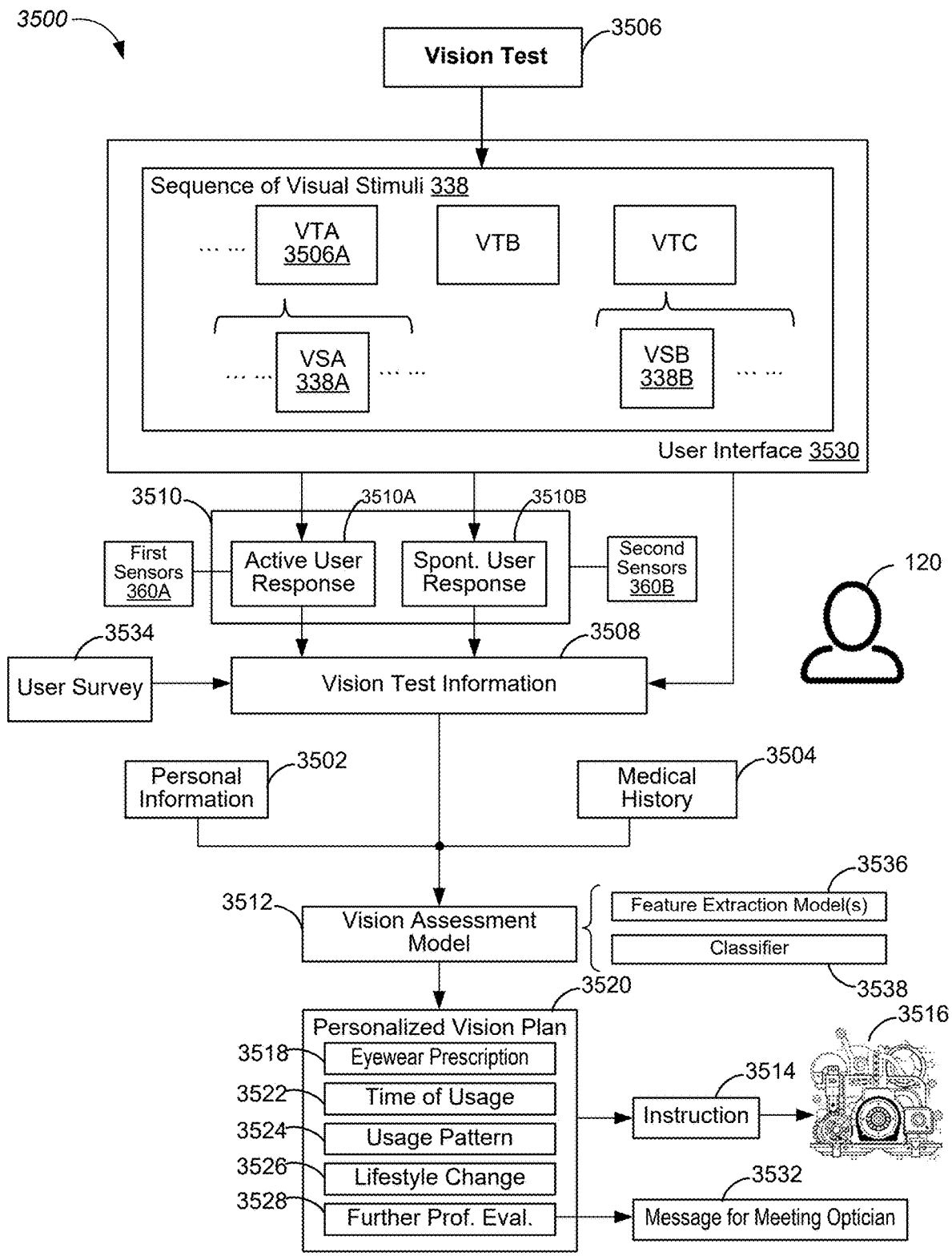
FIG. 35 is a flow diagram of an example process of preparing a personalized vision plan, in accordance with some embodiments.

FIG. 35 is a flow diagram of an example process 3500 of preparing a personalized vision plan 3520, in accordance with some embodiments. The process 3500 may be implemented by a computer device 104, which may include one or more processors 302 (FIG. 3) and memory 306 storing instructions to be implemented by the processor(s) 302. The computer device 104 may obtain personal information 3502 (e.g., age, sex, education, nationality, ethnicity, religion, and address) and medical history 3504 of a user 120, and collect information 3508 of a vision test 3506 including information of a sequence of visual stimuli 338 and user responses 3510 of a user 120 associated with an electronic device (e.g., a headset device 104D) having a head-mounted display 312A (HMD). The electronic device may be different from, or the same as, the computer device 104 implementing the process 3500. A vision assessment model 3512 may be applied to process the personal information 3502, the medical history 3504, and the information 3508 of the vision test 3506 and generate the personalized vision plan 3520.

The computer device 104 may generate an instruction 3514 based on the personalized vision plan 3520 and send the instruction 3514 to a machine 3516 for making an eyewear of the user 120. For example, the personalized vision plan 3520 may include eyewear prescription 3518 (e.g., prescription 3220 in FIG. 32), specifying a lens power for each eye to correct vision issues such as myopia, hyperopia, astigmatism, or presbyopia. The machine 3516 may make the eyewear of the user 120 automatically based on the eye prescription 3518. The instruction 3514 may include a curvature, a thickness, and/or a material of a lens that are determined based on the lens power of each respective eye. The instruction 3514 may include a user preference or a doctor recommendation of a frame. In some embodiments, the machine 3516 may automatically select a lens blank, and cut and shape the lens blank according to the curvature and thickness specified in the instruction 3514. Further, in accordance with the instruction 3514, the lenses are further treated by the machine 3516 with coatings to enhance durability, reduce glare, and protect against UV rays. The lenses are further fitted into the chosen frames, which come in various styles and materials to match personal preferences. In some embodiments, the personalized vision plan 3520 is translated to the instruction 3514, which include the coatings, the user's preferences, or both, allowing the machine 3516 to be controlled to make the eyewear at least partially automatically.

In some embodiments, a user application (e.g., a visual assessment application 328) may be executed to generate a VR or AR user interface 3530 corresponding to a 3D virtual environment and enable one or more virtual vision tests 3506 via the user interface 3530. A sequence of visual stimuli 338 may correspond to the one or more virtual vision tests 3506 and be displayed on the user interface 3530 successively. Each virtual vision test 3506 may include a subset of respective visual stimuli 338. For example, a first vision test 3506A includes a first visual stimulus 338A and a second visual stimulus 338B. The electronic device having the HMD 312A may obtain the user responses 3510 to the sequence of visual stimuli 338. In some embodiments, while displaying the first visual stimulus 338A, the electronic device may dynamically adjust one or more visual stimuli 338 (e.g., the second visual stimulus 338B) to be displayed after the first visual stimulus based on a first user response to the first visual stimulus 338A. The vision assessment model 3512 is applied after the vision test 3506 is completed.

In some embodiments, the personalized vision plan 3520 may include one or more of: a time of usage 3522 (e.g., less than 8-hour computer use each day), a usage pattern 3524 (e.g., taking a five minute break every one hour computer use), a lifestyle change 3526 (e.g., a suggestion of not reading outdoor), and further professional evaluation 3528. In an example, the computer device 104 may automatically generate a message 3532 including the personalized vision plan 3520 to request a follow-up meeting with an optician. In another example, the personalized vision plan 3520 corresponds to two or more of a pair of reading glasses, a pair of computer glasses, a pair of driving glasses, a pair of sunglasses, and a pair of sports glasses.

In some embodiments, the user responses 3510 may include active user inputs 3510A captured by one or more first sensors 360A of the computer device 104, and the active user inputs 3510A are associated with the sequence of visual stimuli 338. The one or more first sensors 360A include a forward facing camera 378 (FIG. 3) for detecting a hand gesture and a microphone 380 (FIG. 3) for collecting an audio response. In some embodiments, the user responses 3510 may include a spontaneous user response 3510B monitored by one or more second sensors 360B of the electronic device, and the one or more second sensors 360B include one or more of: an eye tracking camera 366, a heart rate sensor, a body temperature sensor, a blood oxygen level, a Galvanic skin response sensor, a hand gesture camera (e.g., camera 378), a body gesture camera (e.g., camera 378), a microphone 380, a motion sensor 376, and a set of one or more brain activity electrodes 362. Gestures captured by the hand gesture camera and the body gesture camera may correspond to the spontaneous user response 3510B, e.g., indicating a focus level of the user 120 or whether the user 120 can recognize the corresponding visual stimuli 338.

In some embodiments, the information 3508 of the vision test 3506 may further include a user survey 3534 filled by the user 120 before the vision test 3506.

In some embodiments, the information 3508 of the vision test 3506 may further include a response rate, a success rate of the vision test 3506, and a plurality of confidence scores. The response rate, the success rate, and the plurality of confidence scores of the vision test 3506 are determined based on the user responses 3510 to the sequence of visual stimuli 338. Each confidence score may correspond to a respective visual stimulus 338.

In some embodiments, training data may include personal information, medical history, vision test information, and personalized vision plans of a plurality of historical users. User feedback is collected on the personalized vision plans to rate the personalized vision plans. Ground truth information is determined based on the user feedback, e.g., to include only the personalized vision plans having rates above a rate threshold. The vision assessment model 3512 is trained based on the training data and the ground truth information. In some embodiments, a server 102 (FIG. 1) may collect the training data and train the vision assessment model 3512, before applying the vision assessment model 3512 to the computer device 104. More details on the vision assessment model 3512 are discussed above with reference to at least FIGS. 4, 5A, and 5B.

In some embodiments, the vision assessment model 3512 may further include a plurality of feature extraction models 3536 and a classifier 3538. The plurality of feature extraction models 3536 may be applied to process the personal information 3502, the medical history 3504, and the information 3508 of the vision test 3506 and generate a plurality of feature vectors. The classifier 3538 is applied to process the plurality of feature vectors and determine the personalized vision plan 3520 (e.g., select one of a plurality of predefined vision plans as the personalized vision plan 3520).

Figure 36:
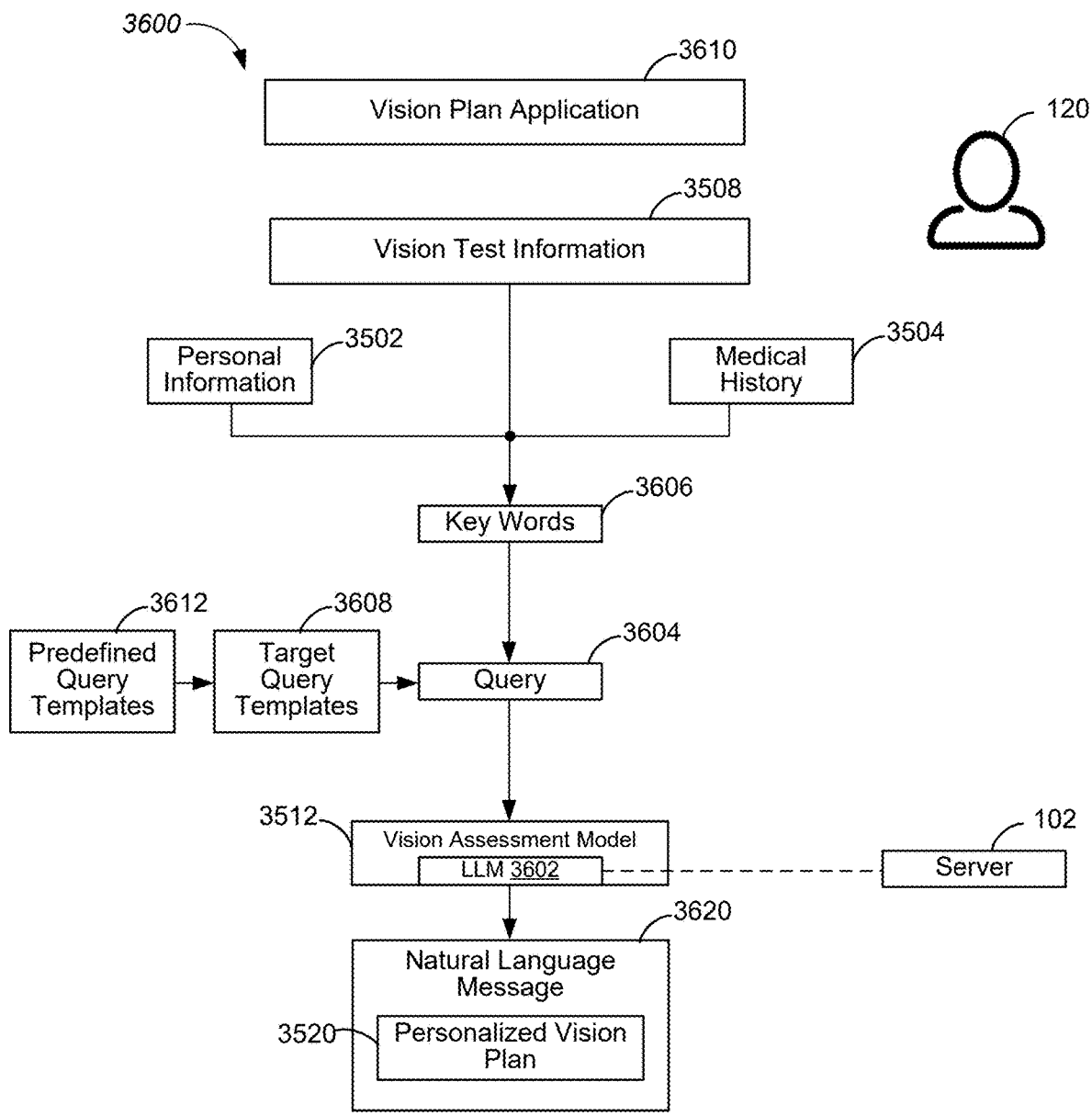
FIG. 36 is a flow diagram of an example process of preparing a personalized vision plan based on a large language model (LLM), in accordance with some embodiments.

FIG. 36 is a flow diagram of an example process 3600 of preparing a personalized vision plan 3520 based on an LLM 3602, in accordance with some embodiments. A vision assessment model 3512 (FIG. 35) may include the LLM 3602 and be applied to generate the personalized vision plan 3520. A computer system (e.g., a laptop computer 104A, a headset device 104D) may obtain personal information 3502 and medical history 3504 of a user 120. Information 3508 of a vision test may be collected and include information of a sequence of visual stimuli 338 and user responses 3510 of the user, when the user 120 is associated with an electronic device having an HMD (e.g., takes the vision test using the electronic device). The computer system applies the vision assessment model 3512 including the LLM 3602 to process the personal information 3502, the medical history 3504, and the information 3508 of the vision test 3506 and generate the personalized vision plan 3520. The personalized vision plan 3520 may be presented on a display of a computer device 104.

In some embodiments, the computer system may execute a vision plan application 3610. The vision plan application 3610 may generate a query 3604 including a subset of the personal information 3502, the medical history 3504, and the information 3508 of the vision test 3506, and sends the query 3604 to a third party server 102 hosting the LLM 3602. The LLM 3602 may return a natural language message 3620 including the personalized vision plan 3520. Further, in some embodiments, the vision plan application 3610 may extract a plurality of key words 3606 from the subset of the personal information 3502, the medical history 3504, and the information 3508 of the vision test 3506, and combines the plurality of key words 3606 with a target query template 3608 (e.g., selected from a plurality of predefined query templates 3612) to generate the query 3604. An example of the target query template 3608 is: "Please write a proposal to recommend actions to overcome an eye condition related to a list of key words."

Some implementations of this application may include a VR system designed to provide comprehensive offboarding explanations post-vision test, detailing results and recommendations to the user. This system may utilize a virtual reality headset equipped with high-resolution displays and advanced optical sensors that conduct a series of vision tests, including visual acuity, color vision, depth perception, and contrast sensitivity. Following the completion of these tests, the VR-based computer system may employ an AI-driven module to analyze the collected data and generate detailed explanations of the test results. The offboarding process may involve a virtual guide, displayed in the VR environment, who provides users with a clear and personalized breakdown of their vision test outcomes, highlighting any detected issues and offering tailored recommendations for further action or treatment. This method can ensure user fully understand their vision health status and are informed about potential next steps, such as scheduling an appointment with an eye care professional or making lifestyle adjustments.

In some embodiments, the electronic device having the HMD may be equipped with sensors 360 (e.g., cameras 366) to accurately capture detailed data on the user's vision during the tests. This includes metrics like visual acuity, color differentiation, depth perception, and contrast sensitivity. The AI module may process this data, using machine learning algorithms to assess the user's vision health comprehensively. The analysis may identify any abnormalities or areas of concern, ensuring a thorough understanding of the user's visual capabilities.

In some embodiments, an electronic device includes an HMD and one or more sensors. The HMD may have a resolution greater than a resolution threshold. For example, the resolution of the HMD is 8K (e.g., 7680×4320). In some embodiments, the electronic device may have an optical sensor (e.g., a camera 366 in FIG. 3) configured for capturing eye images having ocular metrics. These sensors may provide real-time data on eye movement, pupil dilation, and retinal responses, and the real-time data may be applied to adjust visual stimuli presented during the vision test.

In some embodiments, after the vision tests, the VR-based computer system may employ an AI-driven virtual guide that appears within the VR environment. This guide can provide a personalized and detailed explanation of the test results, using natural language processing (NLP) to ensure clarity and comprehension. The explanations may cover each aspect of the vision tests, elucidating the meaning of the results and the significance of any deviations from the norm. This approach may help users grasp their vision health status without requiring extensive medical knowledge.

In some embodiments, based on the vision test results, the AI module may generate specific recommendations for the user. These may include suggestions for corrective lenses, lifestyle changes to improve eye health, or advice on seeking further professional evaluation for detected issues. The recommendations may be presented by the virtual guide in a user-friendly manner, ensuring that users are well-informed about the next steps to take for maintaining or improving their vision health.

In some embodiments, the VR-based computer system can be optionally integrated with healthcare platforms, allowing the data and recommendations to be shared with eye care professionals. This feature may facilitate follow-up care, enabling professionals to review the results and provide further guidance or treatment. The integration also supports remote consultations, expanding access to vision care for users in underserved areas.

Vision Tests In Virtual Reality And Augmented Reality

Some implementations of a VR-based user interface may be augmented with AR components to add layers of complexity in vision tests, providing a comprehensive and immersive vision test environment. An electronic device having an HMD may leverage combined capabilities of VR and AR to create a multi-dimensional vision test experience that can assess a wide range of vision parameters.

In some embodiments, an electronic device may include an HMD 312A and one or more sensors 360 (FIG. 3). The HMD 312A may have a resolution greater than a resolution threshold. For example, the resolution of the HMD is 8K (e.g., 7680×4320). In some embodiments, the electronic device has an optical sensor (e.g., a camera 366 in FIG. 3) configured for capturing eye images having ocular metrics. These sensors may provide real-time data on eye movement, pupil dilation, and retinal responses, and the real-time data may be applied to adjust visual stimuli presented during the vision test.

In some embodiments, the AR components may introduce dynamic, interactive elements into the virtual environment, such as overlaying virtual objects onto real-world backgrounds or adding variable light conditions and moving targets. This integration enhances testing scenarios and allows assessment of visual acuity, depth perception, peripheral vision, and reaction times under diverse and realistic conditions.

In some embodiments, the HMD of the electronic device is integrated with AR capabilities, and may feature displays and sensors that can overlay digital information onto the real world. This dual-functionality allows the HMD of the electronic device to switch seamlessly between fully immersive VR experiences and AR enhancements, and provides a versatile platform for comprehensive vision tests.

In some embodiments, an electronic device includes an HMD and one or more sensors. The HMD 312A may have a resolution greater than a resolution threshold. For example, the resolution of the HMD 312A is 8K (e.g., 7680×4320). In some embodiments, the electronic device has an optical sensor (e.g., a camera 366 in FIG. 3) configured for capturing eye images having ocular metrics. These sensors may provide real-time data on eye movement, pupil dilation, and retinal responses, and the real-time data may be applied to adjust background views and visual stimuli presented thereon during the vision tests. Eye-tracking capabilities of the electronic device may be further applied to ensure that the visual stimuli are responsive to the user's gaze and movements, making the vision tests more accurate and reflective of real-world visual challenges.

In some embodiments, the electronic device includes a data processing module 330 (FIG. 3) that may apply one or more machine learning models 350 to process data collected by one or more sensors 360 and adjust AR components of a sequence of vision tests accordingly. For example, if the electronic device detects that the user struggles with tracking a moving object, the data processing module 330 can modify a speed or a complexity level of an object's movement, such that the user's capabilities can be assessed accurately. This adaptive approach ensures that each test is customized based on the user response to visual stimuli, thereby enhancing the accuracy and diagnostic value of the vision test results.

In some embodiments, integration of AR may allow for creation of complex testing scenarios that combine virtual and real-world elements. These scenarios can include tasks like identifying objects in varying light conditions, tracking multiple moving targets simultaneously, or navigating through a virtual environment with real-world obstacles. These multi-dimensional tests may provide a deeper understanding of the user's vision under diverse and realistic conditions, which is critical for diagnosing and managing a wide range of visual impairments.

Figure 37:
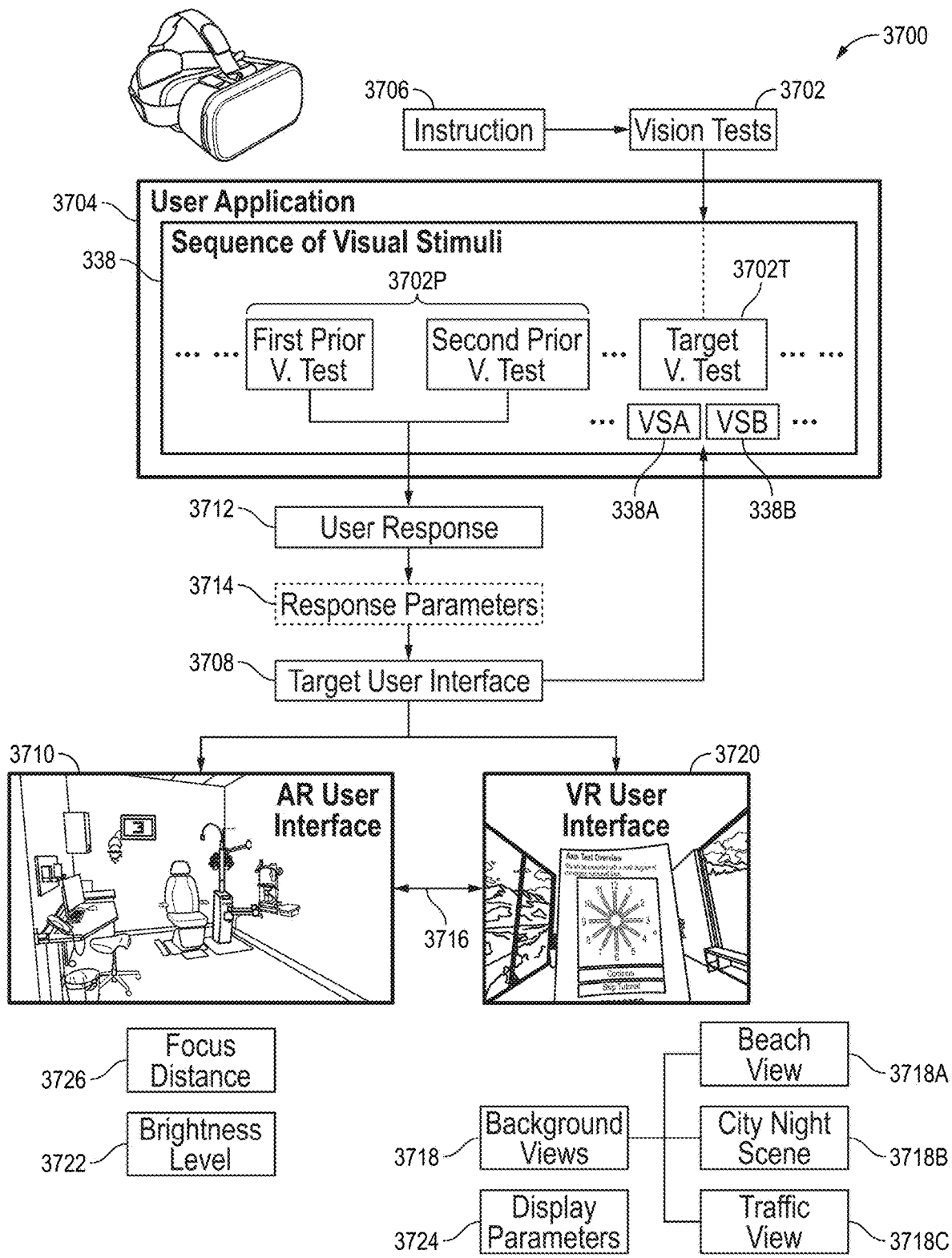
FIG. 37 is a flow diagram of an example process of selecting one of an AR user interface and a VR user interface to implement a vision test, in accordance with some embodiments.

FIG. 37 is a flow diagram of an example process 3700 of selecting one of an AR user interface 3710 and a VR user interface 3720 to implement a vision test 3702, in accordance with some embodiments. The process 3700 may be implemented using a computer device 104 (e.g., headset device 104D), which may include an HMD 312A, one or more processors 302, and memory 306 (FIG. 3) storing instructions to be implemented by the processor(s) 302. The computer device 104 may execute a user application 3704 (e.g., a visual assessment application 328) configured to generate a target user interface 3708 corresponding to a 3D virtual environment and enable one or more virtual vision tests 3702 via the target user interface 3708. A sequence of visual stimuli 338 may correspond to the one or more virtual vision tests 3702 and be displayed on the target user interface 3708 successively. Each virtual vision test 3702 may include a subset of respective visual stimuli 338. More specifically, the computer device 104 may obtain an instruction 3706 to implement the target vision test 3702T, and select the target user interface 3708 for the target vision test 3702T between a VR user interface 3720 corresponding to a 3D VR environment and an AR user interface 3710 corresponding to a 3D AR environment. The target vision test 3702T on the target user interface 3708.

Figure 38:
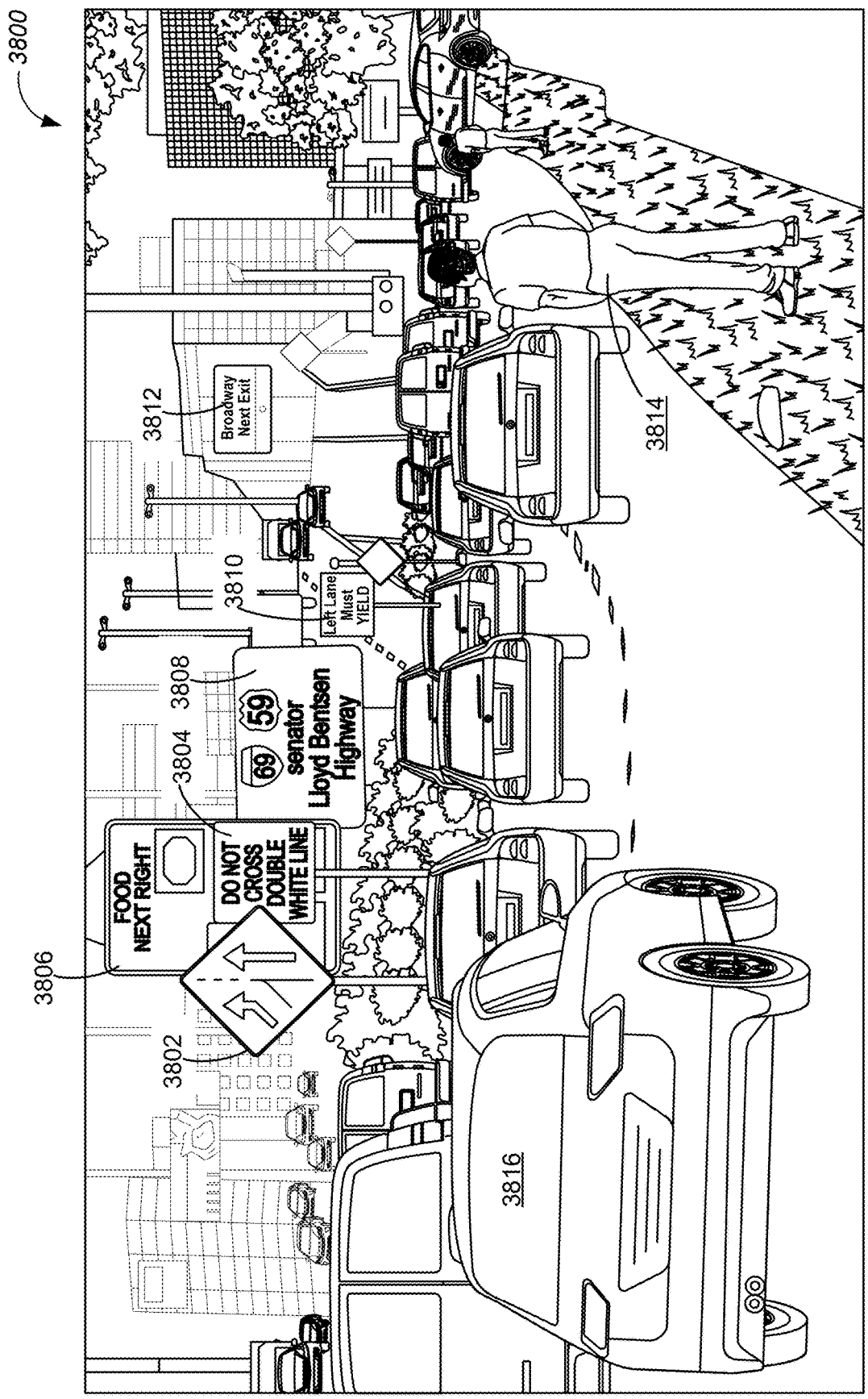
FIG. 38 is an example traffic scene enabled in a virtual environment for one or more vision tests, in accordance with some embodiments.

The VR user interface 3720 may provide an immersive environment that completely replaces the real world, transporting a user 120 wearing the HMD 312A to a simulated, interactive 3D VR environment (e.g., a traffic scene 3800 in FIG. 38). The computer device 104 may include the HMD 312A, hand controllers, and sensors 360 to track body movements. The user 120 may navigate through menus, interact with objects, and control the 3D VR environment using gestures, head movements, or handheld devices. The VR user interface 3720 may prioritize creating a seamless and engaging experience, with intuitive controls that make the 3D VR environment feel tangible and responsive. An AR user interface 3710 may overlay digital virtual elements onto the real world, enhancing the user's perception of a physical environment (e.g., a doctor's office). The AR user interface 3710 can be experienced through smartphones 104C, tablets 104B, or headset device 104D. The user 120 may interact with digital information and objects superimposed on their surroundings using touch screens, voice commands, or gestures. Digital virtual elements may be integrated smoothly with the real world, making information easily accessible and interactive without losing the context of the physical environment. This blend of the real and virtual worlds may aim to enrich the user's interaction with their surroundings, providing contextual information and enhancing real-world tasks.

In some embodiments, a sequence of vision tests 3702 may include the target vision test 3702T and one or more prior vision tests 3702P implemented prior to the target vision test 3702T. The computer device 104 may monitor user responses associated with the one or more prior vision tests 3702P. The target user interface 3708 may be automatically selected between the VR user interface 3720 and the AR user interface 3710 based on the user responses 3712. In some embodiments, the user response 3712 may include a user input captured by a forward facing camera 378 (FIG. 3) for detecting a hand gesture and/or a microphone 380 (FIG. 3) for collecting an audio response. In some embodiments, the user response 3712 may include a spontaneous user response (e.g., a pupil size) monitored by one or more of: an eye tracking camera 366, a heart rate sensor, a body temperature sensor, a blood oxygen level, a Galvanic skin response sensor, a hand gesture camera (e.g., camera 378), a body gesture camera (e.g., camera 378), a microphone 380, a motion sensor 376, and a set of one or more brain activity electrodes 362.

Further, in some embodiments, the computer device 104 may determine one of a plurality of response parameters 3714 (e.g., a response rate, a success rate, and a confidence score) based on the user responses 3712 associated with the one or more vision tests, and the target user interface 3708 is automatically selected based on the one of the plurality of response parameters 3714. Additionally, in some embodiments, in accordance with a determination that one of the response rate, the success rate, and the confidence score is lower than a respective threshold, the computer device 104 may switch (operation 3716) from one of the VR user interface 3720 and the AR user interface 3710 to the other one of the VR user interface 3720 and the AR user interface 3710 (e.g., from the VR user interface 3720 to the AR user interface 3710, from the AR user interface 3710 and the VR user interface 3720).

In some embodiments, the VR user interface 3720 is selected, and a set of one or more first visual stimuli 338A on the VR user interface 3720 in the 3D virtual environment. Further, in some embodiments, the computer device 104 may select a background view 3718, render a stream of video data associated with the background view 3718 on the AR user interface, and overlay each first stimulus 338A on a set of respective image frames in the stream of video data associated with the background view 3718. The background view 3718 may be selected in response to receiving a user selection of the background view 3718 from a plurality of background options. In some embodiments, a sequence of vision tests includes the target vision test 3702T and one or more prior vision tests 3702P implemented prior to the target vision test 3702T. The computer device 104 may monitor user responses 3712 associated with the one or more prior vision tests, and the background view 3718 may be automatically selected from a plurality of virtual background options based on the user responses 3712. In some embodiments, the background view 3718 may be one of: a static beach view 3718A, a static city night scene 3718B, and a dynamic traffic view 3718C.

In some embodiments, the AR user interface 3710 may be selected, and a set of one or more second visual stimuli 338B are displayed on the AR user interface 3710 in the 3D AR environment. Further, in some embodiments, the computer device 104 may set the HMD 312A to be transparent and seen through to show a field of view, and each second stimulus 338B may be overlaid on the field of view. Alternatively, in some embodiments, a forward facing camera 378 (FIG. 3) of the computer device 104 may capture a stream of video data of a field of view. The stream of video data is rendered on the AR user interface 3710 in real time. Each second stimulus 338B may be overlaid on a set of respective image frames in the stream of video data. Additionally, in some embodiments, for each second visual stimulus 338B, the computer device 104 may determine a focus distance 3726 associated with the respective second visual stimulus 338B, and the respective second visual stimulus 338B is rendered at the focus distance 3726 on the AR user interface 3710. In some embodiments, the computer device 104 may adjust a brightness level 3722 of the AR user interface 3710, thereby testing the user's visual capability under different light conditions.

FIG. 38 is an example traffic scene 3800 enabled in a virtual environment for one or more vision tests 3702, in accordance with some embodiments. A computer device 104 includes an HMD 312A, one or more processors 302, and memory 306 (FIG. 3). The computer device 104 may execute a user application 3704 configured to enable the one or more vision tests 3702. For example, one or more vision tests 3702 are set in the traffic scene 3800, and the user application 3704 is configured to execute the vision test 3702 and facilitate issuance or update of a driver license. The computer device 104 may obtain an instruction 3706 to implement a target vision test 3702T. In accordance with a determination that the target vision test 3702T corresponds to a driver license issuing requirement, loading a VR user interface 3720 to create a 3D VR environment. The VR user interface 3720 includes the virtual traffic scene 3800, displaying a plurality of traffic signs 3802-3812 at a plurality of distances.

In some embodiments, the computer device 104 may display a plurality of traffic related objects in the virtual traffic scene 3800, the traffic related objects including one or more of: a traffic light, a pedestrian 3814, and a car 3816. At least one of the traffic related objects may be moving in the virtual traffic scene. When a user associated with the HMD 312A takes the target vision test 3702T, his or her visual capabilities (e.g., visual acuity, red and green traffic light recognition, visual response time) are tested in a dynamic traffic environment, allowing a government agency (e.g., Department of Motor Vehicle (DMV)) to issue driver licenses in a more reliable manner.

Referring to FIG. 38, in an example, the traffic signs 3802, 3804, 3806, 3808, 3810, and 3812 are arranged at increasing distances. Each traffic sign is displayed with a set of respective display parameters 3724 (FIG. 37), such as a font size, a foreground color, a brightness level, and a background style. The user associated with the HMD 312A takes the target vision test 3702T may be prompted to identify what is displayed on each traffic sign. In some embodiments, a light condition of the virtual traffic scene 3800 is adjusted to test whether the user may still recognize what is displayed on each traffic sign. For example, the light condition may correspond to a sunset time, and the user may be prompted to recognize what is displayed on each traffic sign. In some embodiments, the user having green-red color blindness may be prompted to indicate whether a color of a traffic light is green or red at a sunset time. Based on the user's responses, it may be determined whether the user's color blindness level reaches a severity level that may cause a traffic accident.

Multifocal Media Content Compensation

3.

Some implementations of a VR-based computer system may employ age-based algorithms to adjust vision tests specifically for geriatric patients, providing a customized and accurate assessment of their visual capabilities. This system may utilize a VR headset device 104D equipped with high-resolution displays and advanced optical sensors to conduct a variety of vision tests, such as visual acuity, contrast sensitivity, depth perception, and color vision. Age-based algorithms may be integrated within the headset device 104D, which may analyze demographic data and typical age-related visual impairments to tailor the vision tests to the specific needs of elderly users. These algorithms may consider factors such as presbyopia, reduced contrast sensitivity, and slower reaction times, adjusting the test parameters accordingly to ensure they are appropriately challenging and relevant for geriatric patients. The VR-based computer system may provide accurate diagnosis of age-related vision issues, enabling management and treatment plans for this demographic group.

In some embodiments, an electronic device may include an HMD 312A and one or more sensors. The HMD 312A may have a resolution greater than a resolution threshold. For example, the resolution of the HMD 312A is 8K (e.g., 7680×4320). In some embodiments, the electronic device may have an optical sensor (e.g., a camera 366 in FIG. 3) configured for capturing eye images having ocular metrics. These sensors may provide real-time data on eye movement, pupil dilation, and retinal responses, and the real-time data may be used (e.g., jointly with age information) in vision tests to determine multifocal eye prescription.

In some embodiments, an electronic device may integrate age-based algorithms that use demographic data and known patterns of age-related visual decline to adjust the vision tests. The electronic device may analyze the preliminary inputs provided by the user, such as age and medical history, and customize the vision tests by adjusting parameters like font size, contrast levels, test duration, and complexity of visual stimuli. For example, the electronic device may increase font sizes and contrast for reading tests or slow down moving targets to accommodate slower reaction times typical of geriatric patients.

In some embodiments, an electronic device may dynamically adjust the vision tests in real-time based on the user responses to visual stimuli. If the sensors detect difficulty in completing a specific task, the algorithms can further modify the test parameters to ensure they are suitable for the user's capabilities. This real-time feedback mechanism may ensure that the tests remain relevant and accurately assess the user's vision without causing undue strain or frustration.

In some embodiments, upon completion of the vision tests, the VR-based computer system may generate a detailed report that includes the results of each test, highlighting any detected age-related visual impairments. The report may be designed to be easily understandable for both the patient and healthcare providers, facilitating effective communication and follow-up care. Additionally, the data can be stored and analyzed over time to track changes in the patient's vision, providing valuable insights for long-term management of their visual health.

Figure 39:
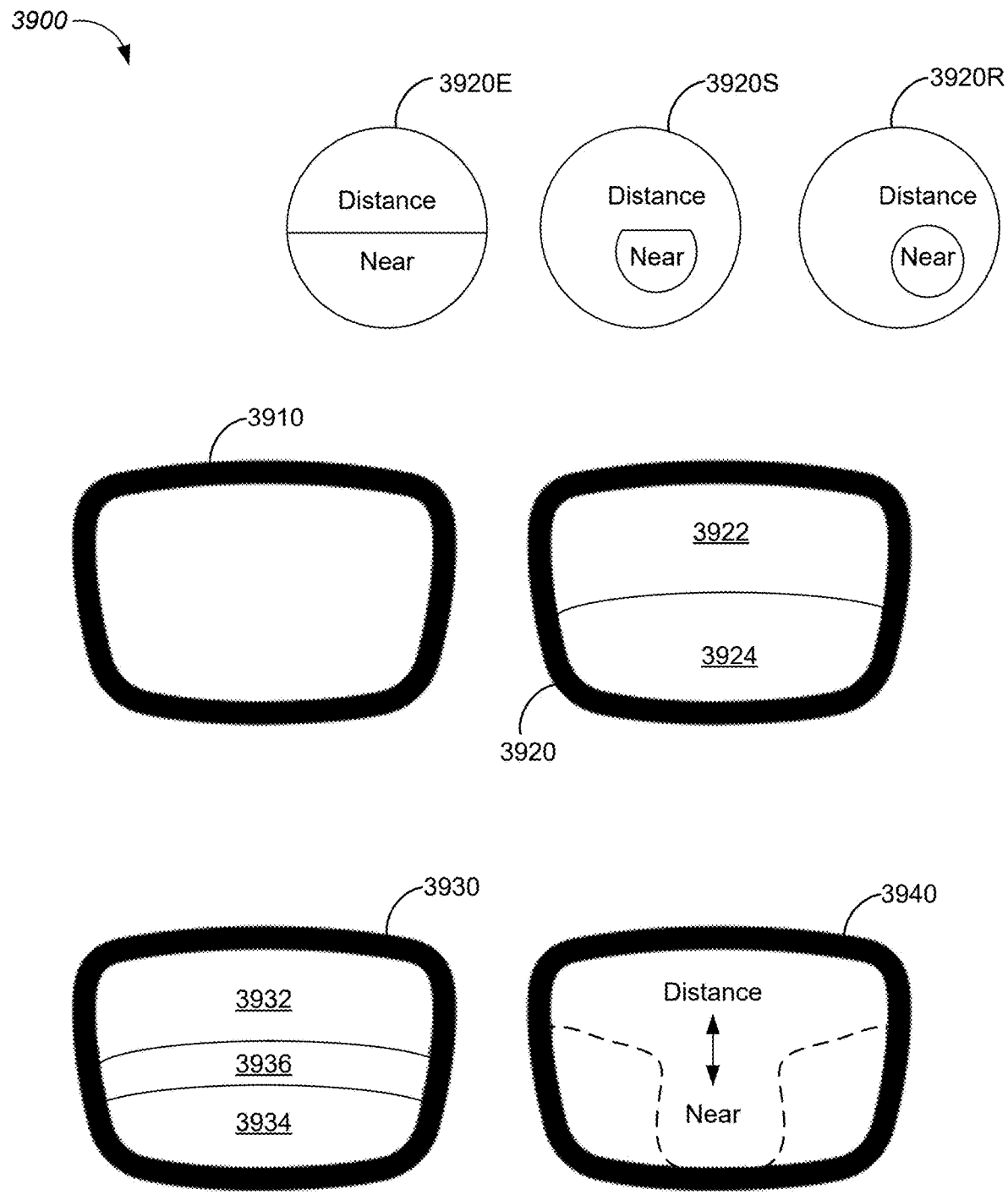
FIG. 39 is a set of example lenses including one or more focal lengths, in accordance with some embodiments.

FIG. 39 is a set of example lenses 3900 including one or more focal lengths, in accordance with some embodiments. The set of lenses 3900 include a single vision lens 3910, a bifocal lens 3920, a trifocal lens 3930, and a progressive lens 3940. A single vision lens 3910 may have a single focal length and correct vision at a distance, whether it be near, intermediate, or far. The single vision lens 3910 may be prescribed for individuals with myopia (nearsightedness) or hyperopia (farsightedness) who need vision correction only for one range of distance. In contrast, the bifocal lens 3920, the trifocal lens 3930, and the progressive lens 3940 are collectively called multifocal lenses having more than one focal length.

The bifocal lens 3920 may have two distinct optical powers within the same lens: a first segment 3922 for distance vision and a separate second segment 3924 for near vision. The first segment 3922 and the second segment 3924 may be marked by a visible line 3926 separating the two segments 3922 and 3924. The bifocal lens 3920 may be used by individuals with presbyopia, which affects a user's ability to focus on close objects as they age. In some embodiments, each of the first segment 3922 and the second segment 3924 occupies a respective half of an executive bifocal lens 3920E. In some embodiments, the second segment 3924 is smaller than, and fully enclosed by, a lower portion of the first segment 3922 in a straight top bifocal lens 3920S or a round bifocal lens 3920R. The second segment 3924 has a flat top edge in the straight top bifocal lens 3920S and a round shape in the round bifocal lens 3920R.

The trifocal lens 3930 adds an intermediate vision correction segment 3936 between a distance segment 3932 and a near vision segment 3934, providing a more comprehensive range of vision correction. The trifocal lens 3930 may be beneficial for those who require sharp vision at multiple distances. The progressive lens 3940 (also called a no-line multifocal lens) may offer a seamless gradient of varying lens powers for distance, intermediate, and near vision correction. The progressive lens 3940 may allow for a smooth transition between different focal lengths, eliminating the visible lines found in bifocal and trifocal lenses, and providing a more natural visual experience for a wearer.

In some implementations, a multifocal lens may include a plurality of segments and have more than one focal length. The multifocal lens may be distinct from the bifocal lens 3920, the trifocal lens 3930, and the progressive lens 3940.

Figure 40:
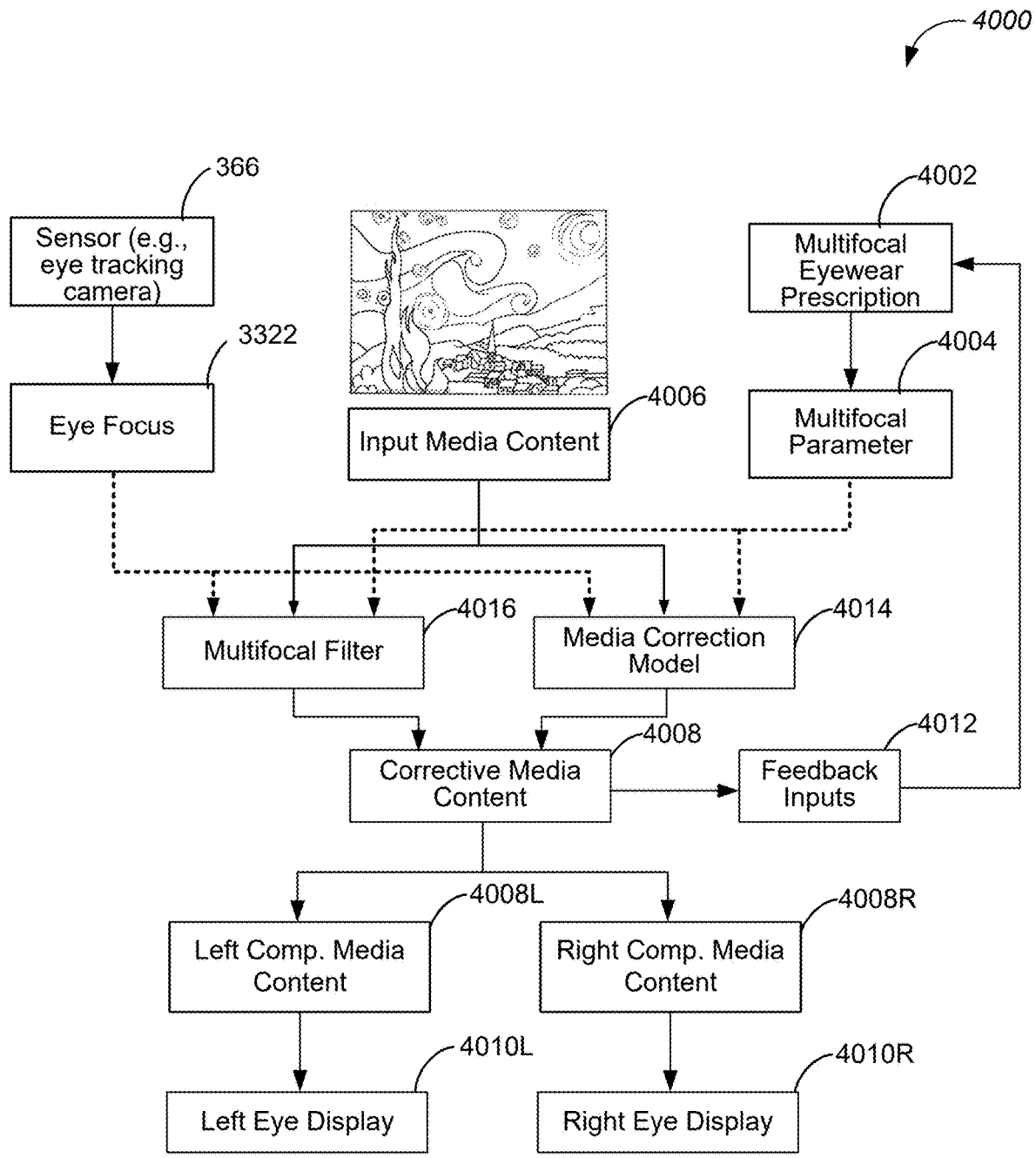
FIG. 40 a flow diagram of an example process of displaying media content based on a plurality of focal lengths, in accordance with some embodiments.

FIG. 40 a flow diagram of an example process 4000 of displaying media content based on a plurality of focal lengths, in accordance with some embodiments. The process 4000 may be implemented by a computer device 104 (e.g., headset device 104D) including one or more processors 302 and memory 306 storing instructions to be implemented by the processor(s) 302. The computer device 104 may include an HMD 312A, and the HMD 312A includes two displays 3302L and 3302R for two eyes of a user 120 associated with the HMD 312A. A user application (e.g., a media play application) may be executed on the computer device 104 to generate a user interface (e.g., a VR user interface) corresponding to a 3D virtual environment. The computer device 104 may determine a multifocal eyewear prescription 4002 of a user 120 associated with the computer device 104. The computer device 104 may obtain input media content 4006, and convert the input media content 4006 to corrective media content 4008 based on the multifocal eyewear prescription 4002 of the user 120. The corrective media content 4008 is rendered for displayed on the HMD, e.g., on a user interface of the user application.

The multifocal eyewear prescription 4002 may include a multifocal parameter 4004 for at least a lens (e.g., a lens for left or right eye) having a plurality of focal lengths. In an example (e.g., associated with FIG. 32), the lens includes a bifocal lens 3920, and an prescription 3220 includes the multifocal parameter 4004 in addition to spherical parameters 3216 and astigmatism measures 3210. In some embodiments not shown, the multifocal parameter 4004 of the multifocal eyewear prescription 4002 includes a number of segments, segment arrangement, and lens powers of a plurality of segments of the lens.

The lens may correspond to a left eye display 4010L or a right eye display 4010R of the HMD 312A. The display 4010L or 4010R is configured to render the input media content 4006 or the corrective media content 4008 for display to a respective eye of the user 120. The corrective media content 4008 my include left corrective media content 4008L for display on the left eye display 4010L and right corrective media content 4008R for display on the right eye display 4010R. The left corrective media content 4008L and the right corrective media content 4008R may be different from each other, but are rendered on the displays 4010L and 4010R in in synchronization with each other. A 3D effect may be created for the user 120, when the user 120 use both of the eyes to review the corrective media content 4008.

When the input media content 4406 is corrected or compensated for display based on the multifocal prescription 4002 of the user 120, the user 120 may not need to rely on alternative eyewear to review the input media content 4006, making user experience with the computer device 104 (e.g., the headset device 104D) pleasant. In some embodiments, the computer device 104 may convert a plurality of image regions of the input media content 4006 based on a plurality of segments defined by the multifocal prescription 4402. In some embodiments, the computer device 104 may track an eye focus 3322 of the eye, and determine a focal point based on the eye focus 3322. The computer device 104 may dynamically select a subset of the input media content 4006 near the focal point and convert the subset of the input media content 4006 based on the multifocal prescription 4402, while keeping a remainder of the input media content 4006 the same. For example, at a first time, the focal point (e.g., at an open book or a computer screen) may be close within an arm length, and the input media content 4006 may be compensated to facilitate reading content around the focal point by the user 120. At a second time, the focal point (e.g., at a remote passing car) is distant from the user 120, and the input media content 4006 is compensated to facilitate viewing an area near the focal point at a distance by the user 120.

In some embodiments, while the computer device 104 presents the corrective media content 4008, in real time, an eye-tracking camera 366 (FIG. 3) of the computer device 104 may capture a stream of image data. The computer device 104 may determine eye positions, pupil dilation information, or retinal responses from the stream of image data, and the eye focus 3322 may be determined based on the eye positions, pupil dilation information, or retinal responses.

In some embodiments, the computer device 104 may receive user input of the multifocal eyewear prescription 4002 to determine the multifocal eyewear prescription 4002. In some implementations, the lens may be a first lens for a left eye or a right eye. The computer device 104 may determine the multifocal eyewear prescription 4002 by determining a number of segments, segment arrangement, and/or lens powers of a plurality of first segments of the first lens. For example, the plurality of first segments are spatially arranged from a top edge to a bottom edge of the first lens. In some embodiments, the plurality of first segments may include more than 3 segments. Alternatively, in some embodiments, the plurality of first segments include 2 or 3 segments (e.g., associated with the bifocal lens 3920 or the trifocal lens 3930 in FIG. 39). Further, in some implementations, the multifocal eyewear prescription 4002 may include a multifocal parameter for a second lens having a plurality of second segments, and the multifocal eyewear prescription 4002 includes a multifocal parameter for the second lens. The plurality of second segments are spatially arranged from a top edge to a bottom edge of the second lens, and a first number of segments of the plurality of first segments is independent of a second number of segments of the plurality of second segments. Stated another way, the left eye and the right eye may have distinct prescription parameters, and associated media content may be corrected independently of each other.

In some embodiments, a display 4010L or 4010R is associated with one of two eyes and corresponds to the lens. The computer device 104 may divide an image frame of the input media content 4006 into a plurality of image regions based on the plurality of segments, and convert the plurality of image regions of the input media content based on the plurality of focal lengths to generate the corrective media content 4008. Alternatively, in some embodiments, an image frame of the input media content 4006 includes a plurality of objects that are located at a plurality of object distances. The computer device 104 may divide the image frame of the input media content 4006 into a plurality of image regions, and convert the plurality of image regions of the input media content 4006 based on the plurality of object distances.

In some embodiments, a forward facing camera 378 of the computer device 104 may capture a stream of video data associated with a field of view of the forward facing camera 378, and apply the stream of video data as the input media content 4006.

In some embodiments, the input media content 4006 may include one or more of a static image of a distant scene, a book page disposed in a close distance, a television screen, a computer screen view, and a mobile phone screen.

In some embodiments, in response to rendering the corrective media content 4008, the computer device 104 may obtain feedback inputs 4012 and adjust the multifocal eyewear prescription 4002 based on the feedback inputs 4012. Further, in some embodiments, 4. the lens has a plurality of lens segments, and the multifocal eyewear prescription 4002 may be adjusted to add an additional segments between two of a plurality of lens segments (e.g., change from a bifocal lens to a trifocal lens). Alternatively, the multifocal eyewear prescription 4002 may be adjusted to remove a redundant segment between two of the plurality of lens segments (e.g., change from a trifocal lens to a bifocal lens).

Some implementations of this application are directed to media compensation based on multifocal eye conditions. A computer device 104D may obtain input media content 4006 to be rendered on the HMD 312A, and the HMD 312A includes two displays 4010L and 4010R for two eyes of a user 120 associated with the HMD 312A. The computer device 104D may determine a multifocal parameter 4004 corresponding to a plurality of focal lengths, and apply a media correction model 4014 to process the input media content 4006 and the multifocal parameter 4004 and generate corrective media content 4008. The corrective media content 4008 is rendered on the HMD 312A for at least one of the two eyes (e.g., a left or right eye). In some embodiments, the computer device 104 may obtain the media compensation model 4014 from a server 102 (FIG. 1), and the media compensation model 4014 is trained by the server 102. For example, the server 106 may obtain an original test image of a field of view and a ground truth test image, of the field of view, captured through a multifocal lens. The server 106 may apply the original test image and the ground truth test image to train the media correction model 4014.

Alternatively, the computer device 104D may determine a multifocal parameter 4004 corresponding to a plurality of focal lengths, and construct a multifocal filter 4016 based on the multifocal parameter 4004. The computer device 104D may apply the filter 4016 to process the input media content 4006 and the multifocal parameter 4004 and generate corrective media content 4008. The corrective media content 4008 is rendered on the HMD 312A for at least one of the two eyes (e.g., a left or right eye).

In some embodiments, the computer device 104 may track an eye focus 3322 of the eye, and determine a focal point based on the eye focus 3322. The media correction model 4014 or the multifocal filter may dynamically select a subset of the input media content 4006 near the focal point and convert the subset of the input media content 4006 based on the multifocal prescription 4002, without correcting a remainder of the input media content 4006. For example, at a first time, the focal point (e.g., landing at an open book or a computer screen) may be close within an arm length, and the input media content 4006 may be compensated to facilitate reading content around the focal point by the user 120. At a second time, the focal point (e.g., at a remote passing car) is distant from the user 120, and the input media content 4006 is compensated to facilitate viewing an area near the focal point at a distance by the user 120.

Figure 41:
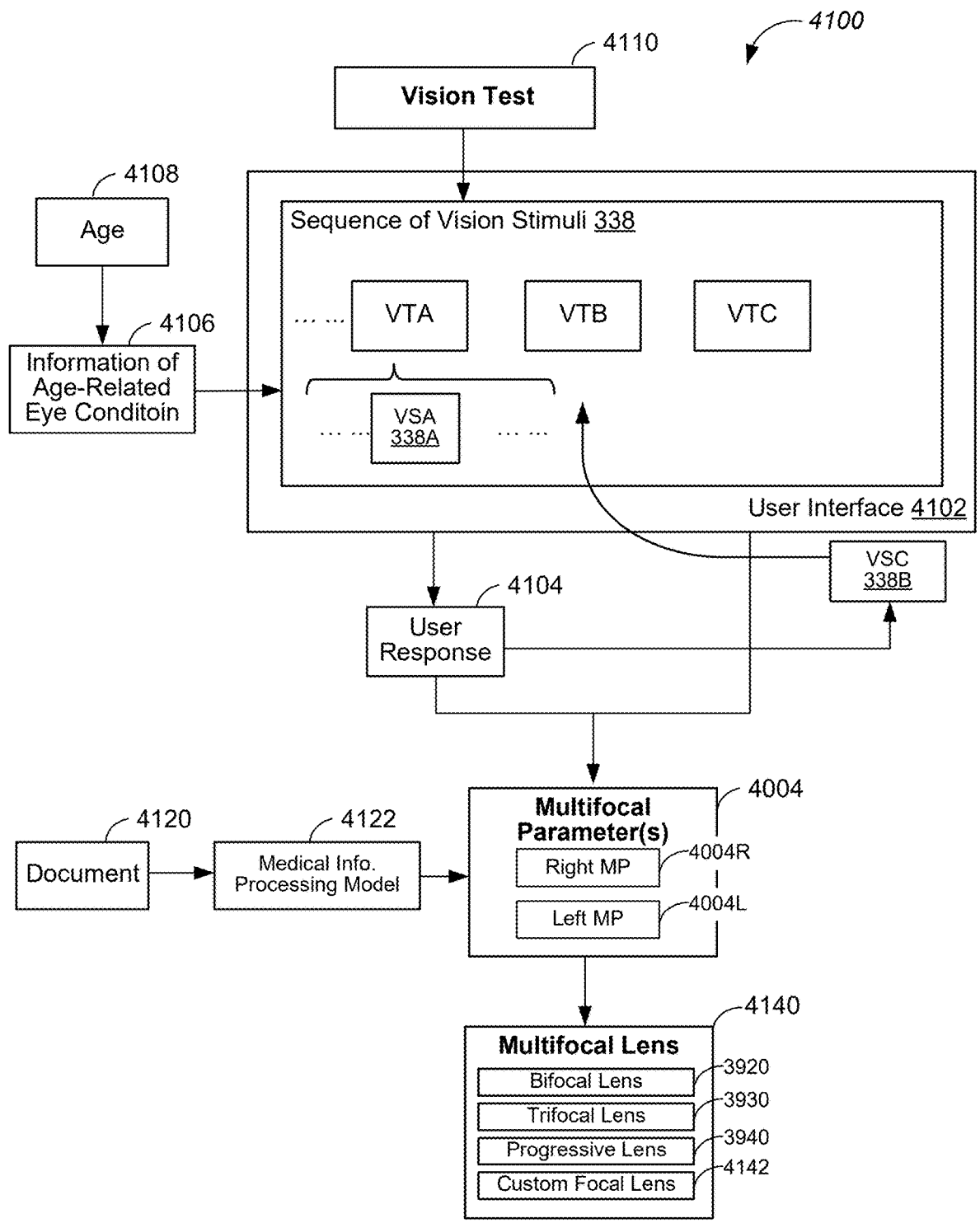
FIG. 41 is a flow diagram of an example process of determining a plurality of focal lengths of a lens configured to correct a user's vision, in accordance with some embodiments.

FIG. 41 is a flow diagram of an example process 4100 of determining a plurality of focal lengths of a lens configured to correct a user's vision, in accordance with some embodiments. The lens having a plurality of focal lengths may correspond to a multifocal parameter 4004 of a multifocal eyewear prescription 4002. The multifocal parameter 4004 of the multifocal eyewear prescription 4002 may include a left eye multifocal parameter 4004L, a right eye multifocal parameter 4004R, or both. The multifocal parameter 4004 of the multifocal eyewear prescription 4002 may correspond to a multifocal lens 4140 as a bifocal lens 3920 (FIG. 39), a trifocal lens 3930 (FIG. 39), a progressive lens 3940 (FIG. 39), or a custom focal lens 4142 distinct from the lens 3920, 3930, or 3940. For example, the multifocal parameter 4004 may include a number of segments, segment arrangement, and lens powers of a plurality of segments of the multifocal lens. In some embodiments, the computer device 104 may obtain a document 4120 including the multifocal eyewear prescription 4002 and extract the multifocal eyewear prescription 4002 of the user 120 from the document 4120, e.g., sing a medical information processing model 4122. Alternatively, in some embodiments, the computer device 104 may implement a vision test 4110 to determine the multifocal eyewear prescription 4002 of the user 120. Once the multifocal eyewear prescription 4002 (e.g., the multifocal parameter 4004) is determined, the computer device 104 may reproduce the effect of the multifocal lens 4140.

In some embodiments, the computer device 104 may render a sequence of visual stimuli 338 on a user interface 4102 of a visual assessment application 328 (FIG. 3), and obtain a plurality of user responses 4104 to the sequence of visual stimuli 338. The multifocal eyewear prescription 4002 may be determined based on the sequence of visual stimuli 338 and the plurality of user responses 4104. Further, in some embodiments, the computer device 104 may obtain information of an age-related eye condition 4106 of the user 120 associated with the HMD 312A of the computer device 104 used for the vision test 4110, and determine the sequence of visual stimuli 338 based on the information of the age-related eye condition 4106. In an example, the information of the age-related eye condition 4106 includes age information 4108 of the user 120.

In some embodiments, the computer device 104 may obtains age information 4108 from personal information of the user, and identify a plurality of known age-related eye conditions 4106 based on the age information. The sequence of visual stimuli 338 used to determine the multifocal eyewear prescription 4002 may be determined based at least partially on the plurality of known age-related eye conditions 4106. Further, in some embodiments, during the vision test 4110, while displaying a first visual stimulus 338A, the computer device 104 dynamically adjusts one or more visual stimuli 338B to be displayed after the first visual stimulus 338A based on a user response 4104 to the first visual stimulus 338A.

Illustration of the Subject Technology as Clauses

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Clause 1. A method of implementing a virtual vision test, comprising: at an electronic device including a display, one or more sensors, and a speaker, while presenting on the display a temporal sequence of visual stimuli, in real time: obtaining a stream of sensor data captured by the one or more sensors, each respective visual stimulus corresponding to a subset of sensor data indicating a user's response to the respective visual stimulus; generating a plurality of vision features based on the temporal sequence of visual stimuli and the stream of sensor data; adaptively generating a sequence of audio instructions based on the plurality of vision features, each respective audio instruction corresponding to a subset of respective vision features; and playing, by the speaker, the sequence of audio instructions successively to guide the user in the virtual vision test.

Clause 2. The method of Clause 1, further comprising: obtaining user information of the user; and extracting a user information feature from the user information, wherein the sequence of audio instructions is generated based on the user information feature.

Clause 3. The method of Clause 2, wherein generating the sequence of audio instructions further comprises: generating each respective audio instruction based on the subset of respective vision features and the user information feature.

Clause 4. The method of any of Clauses 1-3, wherein generating the sequence of audio instructions further comprises, for each respective audio instruction: providing the subset of respective vision features to an instruction synthesis model; and applying the instruction synthesis model to process the subset of respective vision features and generate the respective audio instruction.

Clause 5. The method of Clause 4, further comprising: obtaining user information of the user, the user information including age, education level, and language preference, wherein the user information is provided to, and processed by, the instruction synthesis model to generate the respective audio instruction.

Clause 6. The method of Clause 4, wherein the instruction synthesis model includes a textual instruction model and a text-to-speech conversion model, and generating the respective audio instruction further comprises: applying the textual instruction model to process the subset of respective vision features and generate a respective textual instruction; and converting the respective textual instruction to the audio instruction.

Clause 7. The method of any of Clauses 1-6, wherein each respective visual stimulus has a stimulus type and is displayed with a plurality of display parameters, and generating the plurality of vision features further comprises, for each respective visual stimulus: applying the vison feature extraction model to process the stimulus type, the plurality of display parameters, and the subset of sensor data, generating a subset of one or more vision features.

Clause 8. The method of any of Clauses 1-7, wherein generating the plurality of vision features further comprises, for each respective visual stimulus: applying a user response model to process the subset of sensor data and generate a set of one or more response features, wherein the plurality of vision features include the set of one or more response features.

Clause 9. The method of any of Clauses 1-8, wherein the plurality of vision features further indicate a stimulus type and a plurality of display parameters associated with each respective visual stimulus.

Clause 10. The method of any of Clauses 1-9, wherein each respective audio instruction has a respective language type, a respective speech rate, and a respective complexity level.

Clause 11. The method of any of Clauses 1-10, wherein the temporal sequence of visual stimuli includes a first visual stimulus, and in response to the first visual stimulus, the respective audio instruction is generated with an instruction to apply a predefined action to a controller of the electronic device.

Clause 12. The method of any of Clauses 1-11, wherein: the temporal sequence of visual stimuli has a stimulus refresh rate; each of the one or more sensors correspond to a sensor sampling rate; the plurality of vision features are generated at a feature extraction rate that is less than the sensor sampling rate, the feature extraction rate being equal to or greater than the stimulus refresh rate; and the sequence of audio instructions are generated at an instruction generation rate that is less than or equal to the feature extraction rate.

Clause 13. The method of any of Clauses 1-12, wherein the sequence of audio instructions are generated at an instruction generation rate, the method further comprising: adaptively adjusting the instruction generation rate based on the user's response to a corresponding visual stimulus.

Clause 14. The method of any of Clauses 1-13, wherein the one or more sensors include one or more of: an eye tracking camera, a heart rate sensor, a body temperature sensor, a blood oxygen level, a Galvanic skin response sensor, a hand gesture camera, a body gesture camera, a microphone, a motion sensor, and a set of one or more brain activity electrodes.

Clause 15. The method of any of Clauses 1-14, wherein the plurality of vision features includes a first subset of vision features associated with a first visual stimulus, and a second visual stimulus is subsequent to the first visual stimulus, the method further comprising: while generating a first audio instruction associated with the first visual stimulus based on the first subset of vision features, determining the second visual stimulus based on the first subset of vision features.

Clause 16. The method of any of Clauses 1-15, wherein the stream of sensor data includes a stream of image data captured by an eye-tracking camera, each respective visual stimulus corresponding to a subset of image data indicating a user's spontaneous response to the respective visual stimulus.

Clause 17. The method of Clause 16, further comprising: extracting eye positions, pupil dilation information, and retinal responses from the stream of image data; and determining a focus level of a user taking the virtual vision test, wherein a first audio instruction is generated based on the focus level of the user.

Clause 18. A method of implementing a virtual vision test, comprising: at an electronic device including a display, one or more sensors, and a speaker, while presenting on the display a temporal sequence of visual stimuli, in real time; obtaining a stream of image data captured by an eye-tracking camera, each respective visual stimulus corresponding to a subset of image data indicating a user's spontaneous response to the respective visual stimulus; adaptively generating a first audio instruction based on the stream of image data; and playing, by the speaker, the first audio instruction to guide the user in the virtual vision test.

Clause 19. The method of Clause 18, wherein adaptively generating a first audio instruction further comprises: determining content, a language type, a complexity level, a tone style, a speech rate, and a volume of the first audio instruction.

Clause 20. The method of Clause 18 or 19, further comprising: extracting eye positions, pupil dilation information, and retinal responses from the stream of image data; and determining a focus level of a user taking the virtual vision test, wherein the first audio instruction is generated based on the focus level of the user.

Clause 21. The method of any of Clauses 18-20, further comprising any of the features of Clauses 2-17.

Clause 22. A method of implementing a virtual vision test, comprising: at an electronic device including an HMD: executing a user application configured to enable the virtual vision test; generating a user interface corresponding to a three-dimensional (3D) virtual environment; obtaining user information of a user associated with the electronic device; and concurrently displaying an avatar and a sequence of visual stimuli on the user interface, including while displaying each respective visual stimulus: determining avatar characteristics based on the user information and the respective visual stimulus, wherein the avatar characteristics including a location of the avatar in the 3D virtual environment; and adjusting display of the avatar based on the avatar characteristics.

Clause 23. The method of Clause 22, wherein the avatar characteristics includes parameters associated with one or more of: avatar appearance, body movement, head movement, facial expression, eye movement, and lip movement of the avatar.

Clause 24. The method of Clause 22 or 23, further comprising playing an audio message while displaying a first visual stimulus and the avatar concurrently, wherein the first visual stimulus and the avatar are displayed in synchronization with the audio message.

Clause 25. The method of any of Clauses 22-24, wherein the user information of the user further includes one or more of: user preferences, medical history, pre-visit survey, and user feedback associated previous visits.

Clause 26. The method of any of Clauses 22-25, further comprising: applying an optician avatar model to analyze the user information of the user to determine the avatar characteristics.

Clause 27. The method of any of Clauses 22-26, further comprising, while displaying each respective visual stimulus, in real time: monitoring a user response to the respective visual stimulus, wherein the avatar characteristics of the avatar are determined based on the user response, and the avatar is rendered on the user interface in synchronization with the user response.

Clause 28. The method of Clause 27, wherein the user response includes a user input captured by one or more first sensors of the electronic device, and the one or more first sensors include a forward facing camera for detecting a hand gesture and a microphone for collecting an audio response.

Clause 29. The method of Clause 27 or 28, wherein the user response includes a spontaneous user response monitored by one or more second sensors of the electronic device, and the one or more second sensors include one or more of: an eye tracking camera, a heart rate sensor, a body temperature sensor, a blood oxygen level, a Galvanic skin response sensor, a hand gesture camera, a body gesture camera, a microphone, a motion sensor, and a set of one or more brain activity electrodes.

Clause 30. The method of Clause 29, further comprising: determining a response time of the user response associated with a second visual stimulus; and determining a current success rate for a subset of visual stimuli displayed prior to the second visual stimulus; in accordance with a determination that the response time is greater than a response threshold and that the current success rate is lower than a failure threshold, enabling display of the avatar taking an avatar reminder action based on the avatar characteristics.

Clause 31. The method of Clause 30, wherein the avatar reminder action includes an avatar gesture pointing to the second visual stimulus.

Clause 32. The method of Clause 39 or 31, wherein the avatar reminder action includes a set of lip movement, body movement, and hand gestures that are orchestrated in synchronized with an audio message played by a speaker.

Clause 33. The method of an of Clauses 29-32, further comprising determining a confidence score based on the spontaneous user response and adjusting an avatar motion speed.

Clause 34. The method of any of Clauses 22-33, further comprising: setting the HMD to be transparent and seen through to show a field of view; overlaying each visual stimulus on the field of view.

Clause 35. The method of any of Clauses 22-34, further comprising: capturing by a forward facing camera a stream of video data of a field of view; rendering the stream of video data on the user interface in real time; and overlaying each visual stimulus on a set of respective image frames in the stream of video data.

Clause 36. The method of any of Clauses 22-35, wherein the user interface includes a VR user interface or an AR user interface.

Clause 37. A method of implementing a virtual vision test, comprising: at an electronic device including an HMD: executing a user application configured to enable the virtual vision test; generating a user interface corresponding to a three-dimensional (3D) virtual environment; while displaying a sequence of visual stimuli, collecting a spontaneous user response monitored by one or more second sensors of the electronic device; determining a confidence score based on the spontaneous user response; determining avatar characteristics based on the confidence score; and concurrently displaying an avatar and a sequence of visual stimuli on the VR user interface based on the avatar characteristics.

Clause 38. The method of Clause 37, wherein the avatar characteristics include an avatar motion speed, an avatar speech rate, and an avatar gesture type.

Clause 39. The method of Clause 37 or 38, further comprising any of the features of Clauses 23-35.

Clause 40. A method for displaying media content, comprising: at an electronic device including an HMD, one or more processors, and memory: obtaining the media content to be rendered on the HMD, wherein the HMD includes two displays for two eyes of a user associated with the HMD; obtaining astigmatism measures of the two eyes; for each respective eye of the user, compensating the media content to generate respective compensated media content for a respective display based on the respective astigmatism of the respective eye; and rendering the compensated media content on the two displays of the HMD for the user.

Clause 41. The method of Clause 40, wherein the astigmatism measures of each of the two eyes include a respective cylinder indicator (CYL) measuring a lens power for correcting astigmatism and a respective axis indicator measuring an orientation of astigmatism correction in degrees.

Clause 42. The method of Clause 41, wherein compensating the media content for one of the two eyes further comprises: determining a compensation axis based on the respective axis indicator of the one of the two eyes; and adjusting the media content along a direction parallel to the compensation axis of the one of the two eyes based on the respective cylinder indicator.

Clause 43. The method of Clause 42, wherein adjusting the media content for one of the two eyes further comprises, for each of a plurality of first pixels of an image frame of the media content: determining a respective pixel shift based on the compensation axis of the one of the two eyes; and updating a pixel position of the respective first pixel based on the respective pixel shift.

Clause 44. The method of Clause 43, wherein for the one of the two eyes: the respective pixel shift is measured with reference to a respective eye focus; in accordance with a determination the respective cylinder indicator is positive, each of the plurality of first pixels is moved towards from the respective eye focus, along the direction parallel to the compensation axis of the one of the two eyes, and based on a displacement defined by the respective pixel shift.

Clause 45. The method of Clause 43 or 44, wherein for the one of the two eyes: the respective pixel shift is measured with reference to a respective eye focus; in accordance with a determination the respective cylinder indicator is negative, each of the plurality of first pixels is moved towards the respective eye focus, along the direction perpendicular to the compensation axis of the one of the two eyes, and based on a displacement defined by the respective pixel shift.

Clause 46. The method of any of Clauses 40-45, wherein compensating the media content for one of the two eyes further comprises, for each of a plurality of pixels of an image frame of the media content, updating a pixel position of the respective pixel based on the astigmatism measures of the one of the two eyes, without changing color characteristics of the respective pixel.

Clause 47. The method of any of Clauses 40-46, wherein compensating the media content for one of the two eyes further comprises one of: adding an alternative pixel by interpolating color characteristics of the alternative pixel from original pixels of the media content; and removing a redundant pixel by rendering a shifted pixel in place of the redundant pixel.

Clause 48. The method of any of Clauses 40-47, wherein obtaining the astigmatism measures of the two eyes further comprises: executing a virtual assessment application to determine the astigmatism measures of the two eyes.

Clause 49. The method of any of Clauses 40-48, wherein obtaining the astigmatism measures of the two eyes further comprises: rendering a sequence of visual stimuli on a user interface; obtaining a plurality of user responses to the sequence of visual stimuli; and determining the astigmatism measures of the two eyes based on the plurality of user responses.

Clause 50. The method of any of Clauses 40-49, wherein obtaining the astigmatism measures of the two eyes further comprises: obtaining a document including a medical history of the user; and extracting the astigmatism measures of the two eyes from the document.

Clause 51. The method of Clause 50, wherein extracting the astigmatism measures of the two eyes further comprises applying a medical information processing model to process the medical history and determine a respective cylinder indicator (CYL) and a respective axis indicator of each of the two eyes of the user.

Clause 52. The method of Clause 51, further comprising: obtaining the medical information processing model from a server associated with the computer device, after the medical information processing model is trained on the server.

Clause 53. The method of any of Clauses 40-52, wherein compensating the media content further comprises, for each respective display, applying a media compensation model to process the media content and the respective astigmatism measures of the respective eye and generate the respective compensated media content.

Clause 54. The method of Clause 53, further comprising: training the media compensation model using training data, training data including an input test image, test stigmatism measures, and a ground truth image.

Clause 55. The method of any of Clauses 40-54, wherein compensating the media content further comprises adjusting one or more display parameters of: a resolution, a contrast level, a brightness level, and a refresh rate of at least one of the two displays.

Clause 56. The method of any of Clauses 40-55, wherein a user interface comprises a VR user interface corresponding to a three-dimensional (3D) virtual environment, and the compensated media content is rendered on the user interface and in the 3D virtual environment.

Clause 57. A method for displaying media content, comprising: at an electronic device including an HMD, one or more processors, and memory: obtaining the media content to be rendered on the HMD, wherein the HMD includes two displays for two eyes of a user associated with the HMD; obtaining astigmatism measures of an eye; tracking an eye focus of the eye; generating the respective compensated media content dynamically by applying a media compensation model to process the media content, the astigmatism measures of the eye, and the eye focus; and rendering the compensated media content on a display of the HMD associated with the eye for the user.

Clause 58. The method of Clause 57, further comprising obtaining the media compensation model from a server, wherein the media compensation model is trained by the server.

Clause 59. The method of Clause 58, further comprising training the media compensation model, including: obtaining a ground truth test image; applying a reverse astigmatism filter on the ground truth test image to generate an input test image including an astigmatism effect; and applying the input test image and the ground truth test image to train the media compensation model.

Clause 60. The method of any of Clauses 57-59, further comprising any of the features of Clauses 41-56.

Clause 61. A method for making eyewear, comprising: at a computer system comprising one or more processors and memory: obtaining personal information and medical history of a user; collecting information of a vision test including information of a sequence of visual stimuli and user responses of a user associated with an electronic device having an HMD; applying a vision assessment model to process the personal information, the medical history, and the information of the vision test and generate a personalized vision plan; and sending an instruction to a machine for making an eyewear of the user based on the personalized vision plan.

Clause 62. The method of Clause 61, wherein the personalized vision plan includes eyewear prescription of the user.

Clause 63. The method of Clause 62, wherein the personalized vision plan further includes one or more of: a time of usage, a usage pattern, a lifestyle change, and further professional evaluation.

Clause 64. The method of Clause 63, further comprising: automatically generating a message including the personalized vision plan to request a follow-up meeting with an optician.

Clause 65. The method of any of Clauses 61-64, further comprising implementing the vision test for the user at the electronic device having the HMD, including: rendering the sequence of visual stimuli on a user interface; and obtaining the user responses to the sequence of visual stimuli.

Clause 66. The method of Clause 65, wherein the vision assessment model is applied after the vision test is completed.

Clause 67. The method of Clause 65 or 66, wherein implementing the vision test further comprises: while displaying a first visual stimulus, dynamically adjusting one or more visual stimuli to be displayed after the first visual stimulus based on a first user response to the first visual stimulus.

Clause 68. The method of any of Clauses 61-67, wherein the user responses include active user inputs captured by one or more first sensors of the electronic device, the active user inputs associated with the sequence of visual stimuli, and the one or more first sensors include a forward facing camera for detecting a hand gesture and a microphone for collecting an audio response.

Clause 69. The method of any of Clauses 61-68, wherein the user responses include spontaneous user response monitored by one or more second sensors of the electronic device, and the one or more second sensors include one or more of: an eye tracking camera, a heart rate sensor, a body temperature sensor, a blood oxygen level, a Galvanic skin response sensor, a hand gesture camera, a body gesture camera, a microphone, a motion sensor, and a set of one or more brain activity electrodes.

Clause 70. The method of any of Clauses 61-69, wherein the information of the vision test further includes a user survey filled by the user before the vision test.

Clause 71. The method of any of Clauses 61-70, wherein the information of the vision test further includes a response rate, a success rate of the vision test, and a plurality of confidence scores, the method further comprising: determining the response rate, the success rate, and the plurality of confidence scores of the vision test based on the user responses to the sequence of visual stimuli, each confidence score corresponding to a respective visual stimuli.

Clause 72. The method of any of Clauses 61-71, further comprising: collecting training data including personal information, medical history, vision test information, and personalized vision plans of a plurality of historical users; collecting user feedback on the personalized vision plans; generating ground truth information based on the user feedback; and training the vision assessment model based on the training data and the ground truth information.

Clause 73. The method of any of Clauses 61-72, wherein the vision assessment model further includes a plurality of feature extraction models and a classifier, the method further comprising: applying the plurality of feature extraction models to process the personal information, the medical history, and the information of the vision test and generate a plurality of feature vectors; and applying the classifier to process the plurality of feature vectors and select one of a plurality of predefined vision plans as the personalized vision plan.

Clause 74. The method of any of Clauses 61-73, wherein the personal information of the user includes one or more of: age, sex, education, nationality, ethnicity, religion, and address.

Clause 75. A method for implementing a vision test, comprising: at a computer system comprising one or more processors and memory: obtaining personal information and medical history of a user; collecting information of the vision test including information of a sequence of visual stimuli and user responses of a user associated with an electronic device having an HMD; applying a vision assessment model including an LLM to process the personal information, the medical history, and the information of the vision test and generate a personalized vision plan; and enabling presentation of the personalized vision plan on a display.

Clause 76. The method of Clause 75, wherein applying the vision assessment model further comprises, executing a vision plan application by automatically: generating a query including a subset of the personal information, the medical history, and the information of the vision test; sending the query to a third party server hosting the LLM; and receiving from the LLM a natural language message including the personalized vision plan.

Clause 77. The method of Clause 76, wherein generating the query further comprises: extracting a plurality of key words from the subset of the personal information, the medical history, and the information of the vision test; and combining the plurality of key words with one of a plurality of predefined query templates to generate the query.

Clause 78. The method of any of Clauses 75-77, further comprising any of the features of Clauses 62-74.

Clause 79. A method for implementing a vision test, comprising: at an electronic device including an HMD, one or more processors, and memory: executing a user application configured to enable the vision test; obtaining an instruction to implement a target vision test; selecting a target user interface for the target vision test between a VR user interface corresponding to a three-dimensional (3D) virtual environment and an AR user interface corresponding to a 3D AR environment; and implementing the target vision test on the target user interface.

Clause 80. The method of Clause 79, wherein a sequence of vision tests includes the target vision test and one or more prior vision tests implemented prior to the target vision test, the method further comprising: monitoring user responses associated with the one or more vision tests, wherein the target user interface is automatically selected between the VR user interface and the AR user interface based on the user responses.

Clause 81. The method of Clause 80, further comprising: determining one of a response rate, a success rate, and a confidence score based on the user responses associated with the one or more vision tests, and the target user interface is automatically selected based on the one of the response rate, the success rate, and the confidence score.

Clause 82. The method of Clause 81, further comprising: in accordance with a determination that the one of the response rate, the success rate, and the confidence score is lower than a respective threshold, switching from one of the VR user interface and the AR user interface to the other one of the VR user interface and the AR user interface.

Clause 83. The method of any of Clauses 80-82, wherein each of the user responses is captured by one or more of: an eye tracking camera, a heart rate sensor, a body temperature sensor, a blood oxygen level, a Galvanic skin response sensor, a hand gesture camera, a body gesture camera, a microphone, a motion sensor, and a set of one or more brain activity electrodes.

Clause 84. The method of any of Clauses 79-83, wherein the VR user interface is selected, and implementing the target vision test further comprises: displaying a set of one or more first visual stimuli on the VR user interface in the 3D virtual environment.

Clause 85. The method of Clause 84, further comprising: selecting a background view; rendering a stream of video data associated with the background view on the AR user interface; and overlaying each first stimulus on a set of respective image frames in the stream of video data associated with the background view.

Clause 86. The method of Clause 85, wherein selecting the background view further comprises receiving a user selection of the background view from a plurality of background options.

Clause 87. The method of Clause 85 or 86, wherein a sequence of vision tests includes the target vision test and one or more prior vision tests implemented prior to the target vision test, the method further comprising: monitoring user responses associated with the one or more vision tests, wherein the background view is automatically selected from a plurality of virtual background options based on the user responses.

Clause 88. The method of any of Clauses 85-87, wherein the background view is one of: a static beach view, a static city night scene, and a dynamic traffic view.

Clause 89. The method of any of Clauses 79-88, wherein the AR user interface is selected, and implementing the target vision test further comprises: displaying a set of one or more second visual stimuli on the AR user interface in the 3D AR environment.

Clause 90. The method of Clause 89, further comprising: setting the HMD to be transparent and seen through to show a field of view; overlaying each second stimulus on the field of view.

Clause 91. The method of Clause 89 or 90, further comprising: capturing by a forward facing camera a stream of video data of a field of view; rendering the stream of video data on the AR user interface in real time; and overlaying each second stimulus on a set of respective image frames in the stream of video data.

Clause 92. The method of Clause 92, further comprising, for each second visual stimulus: determining a focus distance associated with the respective second visual stimulus, wherein the respective second visual stimulus is rendered at the focus distance on the AR user interface.

Clause 93. A method for a vision test, comprising: at an electronic device including an HMD, one or more processors, and memory: executing a user application configured to enable the vision test; obtaining an instruction to implement a target vision test; in accordance with a determination that the target vision test corresponds to a driver license issuing requirement: loading a VR user interface to create a 3D VR environment; and displaying a plurality of traffic signs at a plurality of distances on a virtual traffic scene.

Clause 94. The method of Clause 93, wherein each traffic sign is displayed with a set of display parameters.

Clause 95. The method of Clause 93 or 94, further comprising: displaying a plurality of traffic related objects in the virtual traffic scene, the traffic related objects including one or more of: a traffic light, a pedestrian, and a car, wherein at least one of the traffic related objects is moving in the virtual traffic scene.

Clause 96. The method of any of Clauses 93-95, further comprising any of the features of Clauses 80-92.

Clause 97. A method of presenting media data, comprising: at an electronic device comprising an HMD, one or more processors and memory: determining a multifocal eyewear prescription of a user associated with the electronic device, wherein the multifocal eyewear prescription includes a multifocal parameter for a lens having a plurality of focal lengths; obtaining input media content; converting the input media content to corrective media content based on the multifocal eyewear prescription of the user; and rendering, on the HMD, the corrective media content.

Clause 98. The method of Clause 97, wherein determining the multifocal eyewear prescription further comprises: rendering a sequence of visual stimuli on the user interface; obtaining a plurality of user responses to the sequence of visual stimuli, wherein the multifocal eyewear prescription is determined based on the sequence of visual stimuli and the plurality of user responses.

Clause 99. The method of Clause 98, wherein determining the multifocal eyewear prescription further comprises: obtaining information of an age-related eye condition of the user; and determining the sequence of visual stimuli based on the information of the age-related eye condition.

Clause 100. The method of Clause 98 or 99, wherein determining the multifocal eyewear prescription further comprises: obtaining age information from personal information of the user; identifying a plurality of known age-related eye conditions based on the age information; and determining the sequence of visual stimuli based on the plurality of known age-related eye conditions.

Clause 101. The method of any of Clauses 98-100, wherein rendering the sequence of visual stimuli further comprises: while displaying a first visual stimulus, dynamically adjusting one or more visual stimuli to be displayed after the first visual stimulus based on a first user response to the first visual stimulus.

Clause 102. The method of any of Clauses 97-101, wherein determining the multifocal eyewear prescription further comprises: obtaining a document including the progress eyewear prescription; and extracting the multifocal eyewear prescription of the user from the document.

Clause 103. The method of any of Clauses 97-102, wherein determining the multifocal eyewear prescription further comprises: receiving user input of the multifocal eyewear prescription.

Clause 104. The method of any of Clauses 97-103, wherein the lens includes a first lens, and determining the multifocal eyewear prescription further comprises determining a number of segments, segment arrangement, or lens powers of a plurality of first segments of the first lens.

Clause 105. The method of Clause 104, wherein the plurality of first segments are spatially arranged from a top edge to a bottom edge of the first lens.

Clause 106. The method of Clause 105, wherein the plurality of first segments include more than 3 segments.

Clause 107. The method of Clause 105, wherein the plurality of first segments include 2 or 3 segments.

Clause 108. The method of any of Clauses 104-107, wherein the multifocal eyewear prescription includes a multifocal parameter for a second lens having a plurality of second segments, and the multifocal eyewear prescription includes a multifocal parameter for the second lens, the plurality of second segments are spatially arranged from a top edge to a bottom edge of a second lens, and a first number of segments of the plurality of first segments is independent of a second number of segments of the plurality of second segments.

Clause 109. The method of any of Clauses 97-108, wherein the lens has a plurality of segments corresponding to the plurality of focal lengths, the method further comprising, for a display associated with one of two eyes and corresponding to the lens: dividing an image frame of the input media content into a plurality of regions based on the plurality of segments; and converting the plurality of regions of the input media content based on the plurality of focal lengths to generate the corrective media content.

Clause 110. The method of any of Clauses 97-109, further comprising, for a display associated with one of two eyes and corresponding to the lens: identifying a plurality of objects located at a plurality of object distances in an image frame of the input media content; dividing the image frame into a plurality of regions based on a plurality of objects; and converting the plurality of regions of the input media content based on the plurality of object distances to generate the corrective media content.

Clause 111. The method of any of Clauses 97-110, further comprising: capturing by a forward facing camera a stream of video data associated with a field of view of the forward facing camera; and applying the stream of video data as the input media content.

Clause 112. The method of any of Clauses 97-111, wherein the input media content includes one or more of a static image of a distant scene, a book page disposed in a close distance, a television screen, a computer screen view, and a mobile phone screen.

Clause 113. The method of any of Clauses 97-112, further comprising: in response to rendering, on the HMD, the corrective media content, obtaining feedback inputs; and adjusting the multifocal eyewear prescription based on the feedback inputs.

Clause 114. The method of Clause 113, wherein the lens having a plurality of lens segments, further comprising one of: adding an additional segments between two of a plurality of lens segments; and removing a redundant segment between two of the plurality of lens segments.

Clause 115. A method for presenting media data, comprising: at an electronic device including an HMD, one or more processors, and memory: obtaining input media content to be rendered on the HMD, wherein the HMD includes two displays for two eyes of a user associated with the HMD; determining a multifocal parameter corresponding to a plurality of focal lengths; applying a media correction model to process the input media content and the multifocal parameter and generate corrective media content; and rendering, on the HMD, the corrective media content for at least one of the two eyes.

Clause 116. The method of Clause 115, further comprising obtaining the media compensation model from a server, wherein the media compensation model is trained by the server.

Clause 117. The method of Clause 116, further comprising training the media correction model, including: obtaining an original test image of a field of view; obtaining a ground truth test image, of the field of view, captured through a multifocal lens; and applying the original test image and the ground truth test image to train the media correction model.

Clause 118. The method of any of Clauses 115-117, further comprising any of the features of Clauses 98-114.

Clause 119. An interactive virtual-reality method for performing a virtual vision test and displaying media, as discussed in any of Clauses 1-118.

Clause 120. A non-transitory computer readable storage medium, storing one or more programs for execution by one or more processors of a computer system, the one or more programs including instructions for implementing a method in any of Clauses 1-118.

Clause 121. A computer system, comprising: one or more processors; and memory for storing one or more programs for execution by the one or more processors, the one or more programs including instructions for implementing a method in any of Clauses 1-118.

In some embodiments, any of the above clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

Further Considerations

As used herein, the word "module" refers to logic embodied in hardware or firmware, or to a collection of software instructions, possibly having entry and exit points, written in a programming language, such as, for example C++. A software module may be compiled and linked into an executable program, installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM or EEPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

It is contemplated that the modules may be integrated into a fewer number of modules. One module may also be separated into multiple modules. The described modules may be implemented as hardware, software, firmware or any combination thereof. Additionally, the described modules may reside at different locations connected through a wired or wireless network, or the Internet.

In general, it will be appreciated that the processors can include, by way of example, computers, program logic, or other substrate configurations representing data and instructions, which operate as described herein. In other embodiments, the processors can include controller circuitry, processor circuitry, processors, general purpose single-chip or multi-chip microprocessors, digital signal processors, embedded microprocessors, microcontrollers and the like.

Furthermore, it will be appreciated that in one embodiment, the program logic may advantageously be implemented as one or more components. The components may advantageously be configured to execute on one or more processors. The components include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

As used herein, the term "about" is relative to the actual value stated, as will be appreciated by those of skill in the art, and allows for approximations, inaccuracies and limits of measurement under the relevant circumstances. In one or more aspects, the terms "about," "substantially," and "approximately" may provide an industry-accepted tolerance for their corresponding terms and/or relativity between items.

As used herein, the term "comprising" indicates the presence of the specified integer(s), but allows for the possibility of other integers, unspecified. This term does not imply any particular proportion of the specified integers. Variations of the word "comprising," such as "comprise" and "comprises," have correspondingly similar meanings.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the detailed description contains many specifics, these should not be construed as limiting the scope of the subject technology but merely as illustrating different examples and aspects of the subject technology. It should be appreciated that the scope of the subject technology includes other embodiments not discussed in detail above. Various other modifications, changes and variations may be made in the arrangement, operation and details of the method and apparatus of the subject technology disclosed herein without departing from the scope. In addition, it is not necessary for a device or method to address every problem that is solvable (or possess every advantage that is achievable) by different embodiments of the disclosure in order to be encompassed within the scope of the disclosure. The use herein of "can" and derivatives thereof shall be understood in the sense of "possibly" or "optionally" as opposed to an affirmative capability.

We claim:

1. A method for displaying media content, comprising:
at an electronic device including a head-mounted display (HMD), one or more processors, and memory:
obtaining the media content to be rendered on the HMD, wherein the HMD includes two displays for two eyes of a user associated with the HMD;
obtaining astigmatism measures of the two eyes;
for each respective eye of the user, compensating the media content to generate respective compensated media content for a respective one of the two display based on a respective astigmatism measure of the respective eye, wherein compensating the media content for one of the two eyes further includes, for each of a plurality of pixels of an image frame of the media content, updating a pixel position of the respective pixel based on the astigmatism measures of the one of the two eyes, without changing color characteristics of the respective pixel; and
rendering the compensated media content on the two displays of the HMD for the user.

2. The method of claim 1, wherein the astigmatism measures of each of the two eyes include a respective cylinder indicator (CYL) measuring a lens power for correcting astigmatism and a respective axis indicator measuring an orientation of astigmatism correction in degrees.

3. The method of claim 2, wherein compensating the media content for one of the two eyes further comprises:
determining a compensation axis based on the respective axis indicator of the one of the two eyes; and
adjusting the media content along a direction parallel to the compensation axis of the one of the two eyes based on the respective cylinder indicator.

4. The method of claim 3, wherein adjusting the media content for one of the two eyes further comprises, for each of a plurality of first pixels of an image frame of the media content:
determining a respective pixel shift based on the compensation axis of the one of the two eyes; and
updating a pixel position of the respective first pixel based on the respective pixel shift.

5. The method of claim 4, wherein for the one of the two eyes:
the respective pixel shift is measured with reference to a respective eye focus;
in accordance with a determination the respective cylinder indicator is positive, each of the plurality of first pixels is moved towards from the respective eye focus, along the direction parallel to the compensation axis of the one of the two eyes, and based on a displacement defined by the respective pixel shift.

6. The method of claim 4, wherein for the one of the two eyes:
the respective pixel shift is measured with reference to a respective eye focus;
in accordance with a determination the respective cylinder indicator is negative, each of the plurality of first pixels is moved towards the respective eye focus, along the direction perpendicular to the compensation axis of the one of the two eyes, and based on a displacement defined by the respective pixel shift.

7. The method of claim 1, wherein compensating the media content for one of the two eyes further comprises one of:
adding an alternative pixel by interpolating color characteristics of the alternative pixel from original pixels of the media content; and
removing a redundant pixel by rendering a shifted pixel in place of the redundant pixel.

8. The method of claim 1, wherein obtaining the astigmatism measures of the two eyes further comprises:
rendering a sequence of visual stimuli on a user interface;
obtaining a plurality of user responses to the sequence of visual stimuli; and
determining the astigmatism measures of the two eyes based on the plurality of user responses.

9. The method of claim 1, wherein compensating the media content further comprises, for each respective display, applying a media compensation model to process the media content and the respective astigmatism measures of the respective eye and generate the respective compensated media content.

10. The method of claim 1, wherein compensating the media content further comprises, for each respective display, applying a media compensation model to process the media content and the respective astigmatism measures of the respective eye and generate the respective compensated media content.

11. An electronic device, comprising:
a head-mounted display (HMD);
one or more processors; and
memory for storing one or more programs for execution by the one or more processors, the one or more programs including instructions for:
obtaining the media content to be rendered on the HMD, wherein the HMD includes two displays for two eyes of a user associated with the HMD;
obtaining astigmatism measures of the two eyes, including executing a virtual assessment application to determine the astigmatism measures of the two eyes;
for each respective eye of the user, compensating the media content to generate respective compensated media content for a respective one of the two displays based on a respective astigmatism measure of the respective eye; and
rendering the compensated media content on the two displays of the HMD for the user.

12. The electronic device of claim 11, wherein obtaining the astigmatism measures of the two eyes further comprises:
obtaining a document including a medical history of the user; and
extracting the astigmatism measures of the two eyes from the document.

13. The electronic device of claim 12, wherein extracting the astigmatism measures of the two eyes further comprises applying a medical information processing model to process the medical history and determine a respective cylinder indicator (CYL) and a respective axis indicator of each of the two eyes of the user.

14. The electronic device of claim 13, the one or more programs further comprising instructions for:
obtaining the medical information processing model from a server associated with the computer device, after the medical information processing model is trained on the server.

15. The electronic device of claim 11, wherein the astigmatism measures of each of the two eyes include a respective cylinder indicator (CYL) measuring a lens power for correcting astigmatism and a respective axis indicator measuring an orientation of astigmatism correction in degrees.

16. A non-transitory computer readable storage medium, storing one or more programs for execution by one or more processors of an electronic device, the one or more programs including instructions for:
at the electronic device, wherein the electronic device including a head-mounted display (HMD):
obtaining the media content to be rendered on the HMD, wherein the HMD includes two displays for two eyes of a user associated with the HMD;
obtaining astigmatism measures of the two eyes;
for each respective eye of the user, compensating the media content to generate respective compensated media content for a respective one of the two displays based on a respective astigmatism measure of the respective eye, wherein compensating the media content further includes adjusting one or more display parameters of: a resolution, a contrast level, a brightness level, and a refresh rate of at least one of the two displays; and rendering the compensated media content on the two displays of the HMD for the user.

17. The non-transitory computer readable storage medium of claim 16, wherein compensating the media content further comprises, for each respective display, applying a media compensation model to process the media content and the respective astigmatism measures of the respective eye and generate the respective compensated media content.

18. The non-transitory computer readable storage medium of claim 17, the one or more programs further comprising instructions for:

training the media compensation model using training data, training data including an input test image, test stigmatism measures, and a ground truth image.

19. The non-transitory computer readable storage medium of claim 16, wherein a user interface comprises a virtual reality (VR) user interface corresponding to a three-dimensional (3D) virtual environment, and the compensated media content is rendered on the user interface and in the 3D virtual environment.

20. The non-transitory computer readable storage medium of claim 16, wherein the astigmatism measures of each of the two eyes include a respective cylinder indicator (CYL) measuring a lens power for correcting astigmatism and a respective axis indicator measuring an orientation of astigmatism correction in degrees.

* * * * *